United States Patent
Zhu et al.

(10) Patent No.: US 12,224,831 B2
(45) Date of Patent: Feb. 11, 2025

(54) METHOD AND APPARATUS OF GROUP-BASED BEAM REPORTING

(71) Applicant: Samsung Electronics Co., Ltd., Suwon-si (KR)

(72) Inventors: Dalin Zhu, Richardson, TX (US); Eko Onggosanusi, Coppell, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 356 days.

(21) Appl. No.: 17/649,790

(22) Filed: Feb. 2, 2022

(65) Prior Publication Data

US 2022/0263558 A1  Aug. 18, 2022

Related U.S. Application Data

(60) Provisional application No. 63/196,427, filed on Jun. 3, 2021, provisional application No. 63/146,507, filed on Feb. 5, 2021.

(51) Int. Cl.
*H04B 7/06* (2006.01)
*H04B 17/336* (2015.01)
(Continued)

(52) U.S. Cl.
CPC ......... *H04B 7/0626* (2013.01); *H04B 7/0617* (2013.01); *H04B 17/336* (2015.01); *H04L 5/0051* (2013.01); *H04W 24/10* (2013.01)

(58) Field of Classification Search
CPC .. H04B 7/0626; H04B 7/0617; H04B 17/336; H04B 17/318; H04B 7/06952;
(Continued)

(56) References Cited

U.S. PATENT DOCUMENTS

2019/0356398 A1   11/2019   Kim et al.
2020/0059290 A1   2/2020   Pan et al.
(Continued)

FOREIGN PATENT DOCUMENTS

WO   2018232090 A1   12/2018

OTHER PUBLICATIONS

3GPP TSG RAN WG1 Meeting #104-e ; R1-2100292 ; Source: ZTE; Title: Further details on Multi-beam and Multi-TRP operation; e-Meeting, Jan. 25-Feb. 5, 2020 (Year: 2020).*
(Continued)

*Primary Examiner* — Mohammed S Chowdhury

(57) ABSTRACT

Methods and apparatuses for beam measurement and reporting in a wireless communication system. A method of operating a user equipment (UE) includes identifying an indication for reporting, in a channel state information (CSI) report, at least a first group of two resource indicators and corresponding beam metrics associated with a first entity identity (ID) and a second entity ID, respectively, and transmitting, in the CSI report, the first group of two resource indicators and the corresponding beam metrics. The first or second entity IDs correspond to at least one of: a physical cell identity (PCI) corresponding to a serving cell PCI or a PCI different from the serving cell PCI; and a PCI index pointing to a PCI corresponding to the serving cell PCI or a PCI different from the serving cell PCI in a list of PCIs that are higher layer configured to the UE.

17 Claims, 25 Drawing Sheets

(51) Int. Cl.
*H04L 5/00* (2006.01)
*H04W 24/10* (2009.01)

(58) Field of Classification Search
CPC ... H04B 17/328; H04L 5/0051; H04L 5/0094; H04L 5/0048; H04W 24/10; H04W 24/08; H04W 72/21
See application file for complete search history.

(56) References Cited

U.S. PATENT DOCUMENTS

| | | | |
|---|---|---|---|
| 2020/0177357 A1 | 6/2020 | Zhou et al. | |
| 2020/0336188 A1 | 10/2020 | Wang et al. | |
| 2020/0389875 A1 | 12/2020 | Guo et al. | |
| 2021/0028843 A1 | 1/2021 | Zhou et al. | |
| 2023/0189046 A1* | 6/2023 | Liu | H04W 24/10 370/329 |
| 2023/0199517 A1* | 6/2023 | Laddu | H04B 7/022 370/329 |
| 2023/0216650 A1* | 7/2023 | Kwak | H04W 72/23 370/329 |
| 2023/0246697 A1* | 8/2023 | Yuk | H04B 7/0691 375/267 |
| 2023/0344490 A1* | 10/2023 | Kang | H04B 17/318 |

OTHER PUBLICATIONS

3GPP TSG RAN WG1 Meeting #104-e; R1-2100285; Source: ZTE; Title: Enhancements on Multi-beam Operation; e-Meeting, Jan. 25-Feb. 5, 2021. (Year: 2021).*
3GPP TSG RAN WG1 #104-e ; R1-2100618; Source: LG Electronics; Title: Enhancements on Multi-beam Operation; e-Meeting, Jan. 25-Feb. 5, 2021 (Year: 2021).*
"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)", 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
International Search Report and Written Opinion issued May 3, 2022 regarding Application No. PCT/KR2022/001856, 7 pages.
Extended European Search Report issued Oct. 21, 2024 regarding Application No. 22750082.4, 9 pages.
Ericsson, "On beam management enhancements for simultaneous multi-TRP transmission with multi-panel reception", 3GPP TSG-RAN WG1 Meeting #103-e, R1-2009225, Oct. 2020, 6 pages.

* cited by examiner

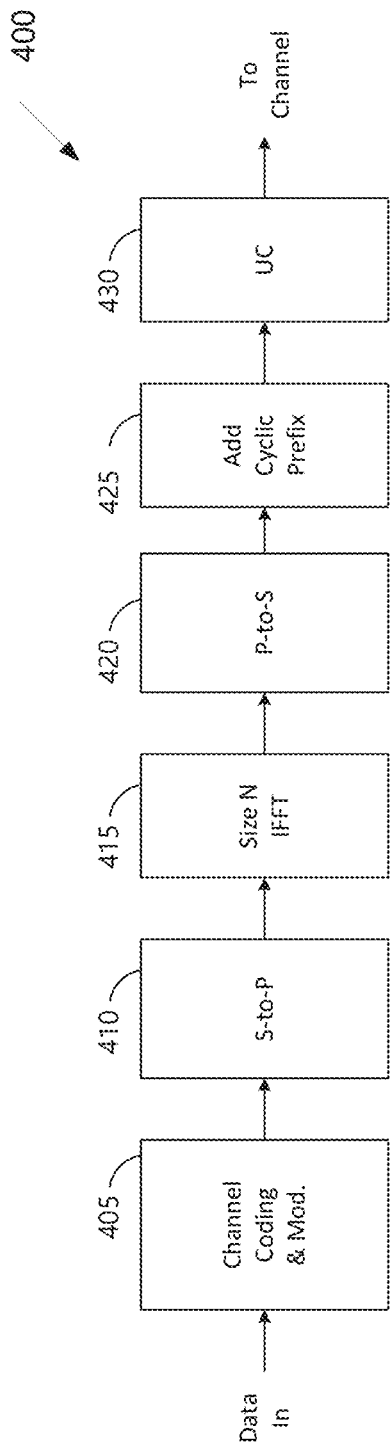
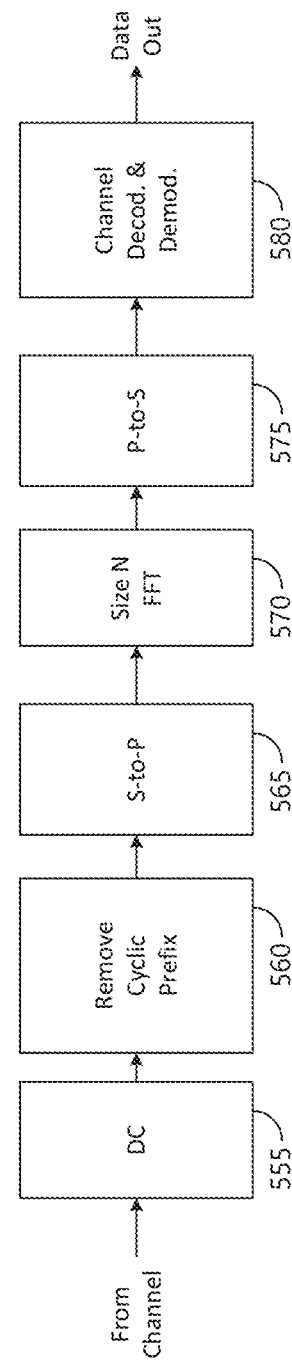
FIG. 4
FIG. 5

METHOD AND APPARATUS OF GROUP-BASED BEAM REPORTING

CROSS-REFERENCE TO RELATED APPLICATIONS AND CLAIM OF PRIORITY

The present application claims priority to U.S. Provisional Patent Application No. 63/146,507, filed on Feb. 5, 2021, and U.S. Provisional Patent Application No. 63/196,427, filed on Jun. 3, 2021. The content of the above-identified patent document is incorporated herein by reference.

TECHNICAL FIELD

The present disclosure relates generally to wireless communication systems and, more specifically, the present disclosure relates to beam measurement and reporting in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to beam measurement and reporting in a wireless communication system.

In one embodiment, a user equipment (UE) is provided. The UE includes a processor configured to identify an indication for reporting, in a channel state information (CSI) report, at least a first group of two resource indicators and corresponding beam metrics associated with a first entity identity (ID) and a second entity ID, respectively and a transceiver operably coupled to the processor. The transceiver configured to transmit, in the CSI report, the first group of two resource indicators and the corresponding beam metrics. The resource indicators are synchronization signal block (SSB) resource indicators (SSBRIs) or CSI reference signal (CSI-RS) resource indicators (CRIs) and the corresponding beam metrics are layer-1 reference signal received powers (L1-RSRPs) or layer-1 signal to interference and noise ratios (L1-SINRs). The first or second entity IDs correspond to at least one of: a physical cell identity (PCI) corresponding to a serving cell PCI or a PCI different from the serving cell PCI; and a PCI index pointing to a PCI corresponding to the serving cell PCI or a PCI different from the serving cell PCI in a list of PCIs that are higher layer configured to the UE.

In another embodiment, a base station (BS) is provided. A processor configured to identify an indication for reporting, in a CSI report, at least a first group of two resource indicators and corresponding beam metrics associated with a first entity ID and a second entity ID, respectively and a transceiver operably coupled to the processor. The transceiver configured to transmit the indication and receive, in the CSI report, the first group of two resource indicators and the corresponding beam metrics. The resource indicators are SSBRIs or CRIs and the corresponding beam metrics are L1-RSRPs or L1-SINRs. The first or second entity IDs correspond to at least one of: a PCI corresponding to a serving cell PCI or a PCI different from the serving cell PCI; and a PCI index pointing to a PCI corresponding to the serving cell PCI or a PCI different from the serving cell PCI in a list of PCIs that are higher layer configured.

In yet another embodiment, a method of operating a UE is provided. The method includes identifying an indication for reporting, in a CSI report, at least a first group of two resource indicators and corresponding beam metrics associated with a first entity ID and a second entity ID, respectively, and transmitting, in the CSI report, the first group of two resource indicators and the corresponding beam metrics. The resource indicators are SSBRIs or CRIs and the corresponding beam metrics are L1-RSRPs or L1-SINRs. The first or second entity IDs correspond to at least one of: a PCI corresponding to a serving cell PCI or a PCI different from the serving cell PCI; and a PCI index pointing to a PCI corresponding to the serving cell PCI or a PCI different from the serving cell PCI in a list of PCIs that are higher layer configured to the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4 and 5 illustrate example of wireless transmit and receive paths according to this disclosure;

DETAILED DESCRIPTION

FIG. 1 through FIG. 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

Figure 1:
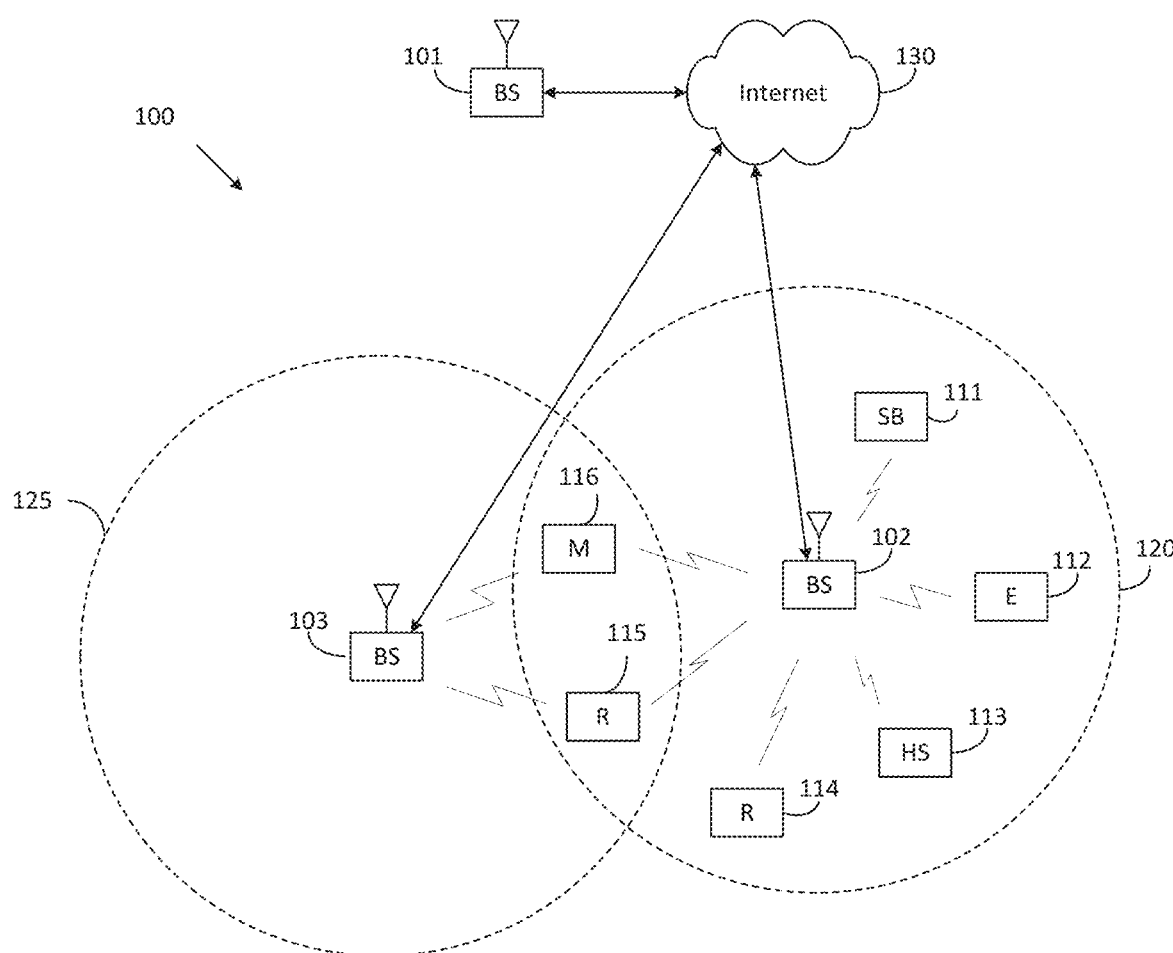
FIG. 1 illustrates an example of wireless network according to embodiments of the present disclosure.
Figure 2:
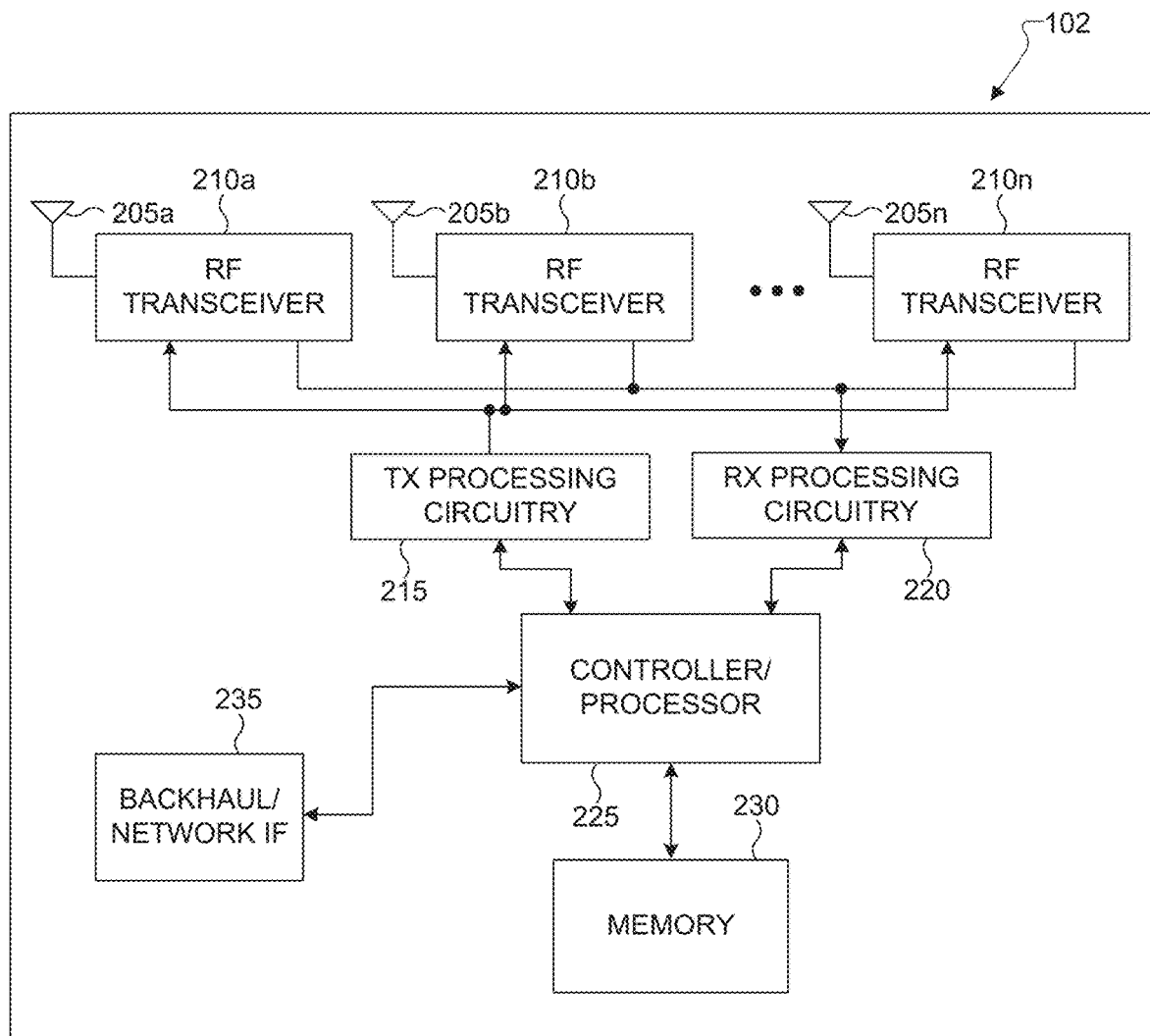
FIG. 2 illustrates an example of gNB according to embodiments of the present disclosure.
Figure 3:
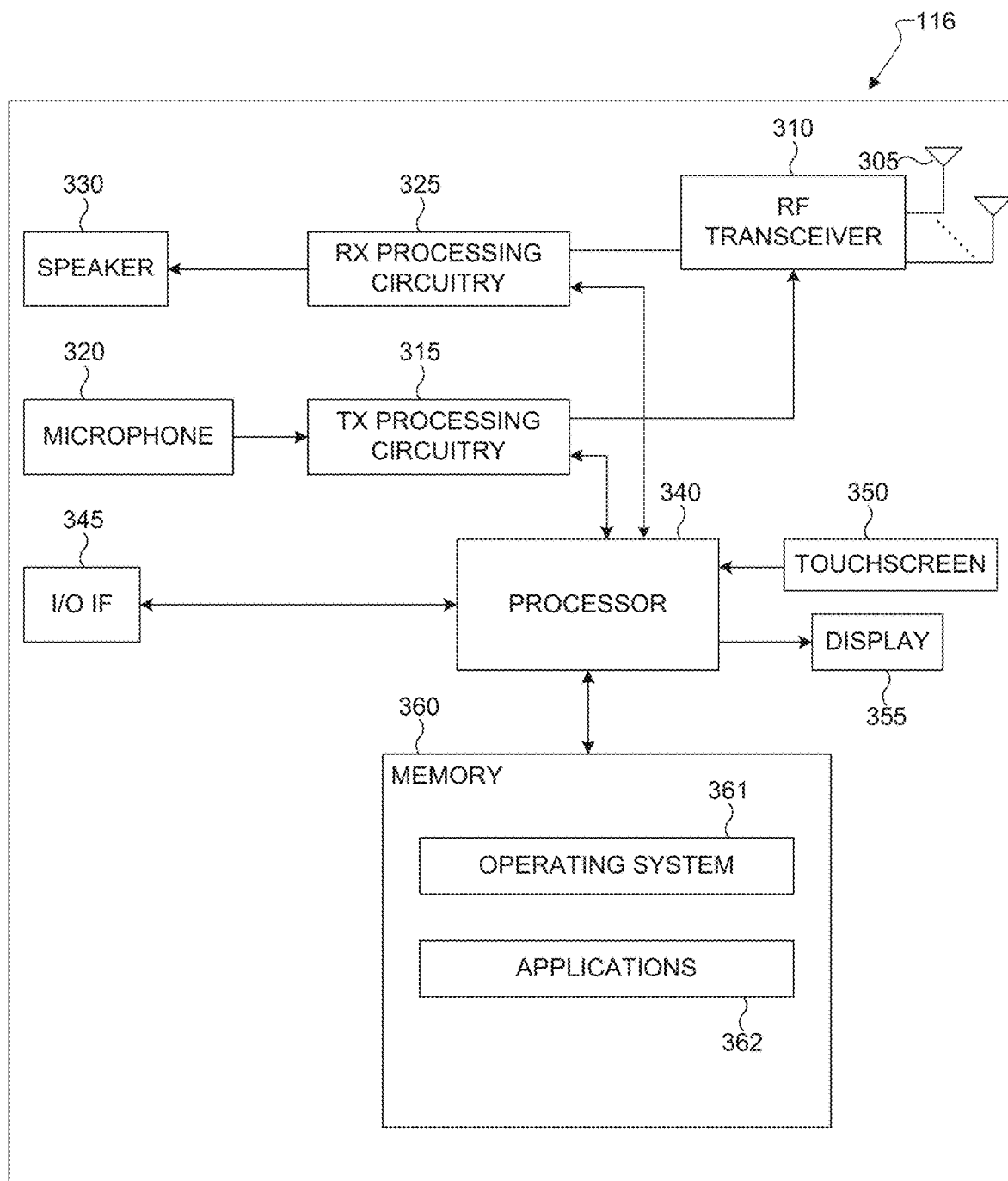
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103.

The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a group-based beam reporting in a wireless communication system. In certain embodiments, and one or more of the gNBs 101-103 includes circuitry, programing, or a combination thereof, for a group-based beam reporting in a wireless communication system.

Although FIG. 1 illustrates one example of a wireless network, various changes may be made to FIG. 1. For example, the wireless network could include any number of gNBs and any number of UEs in any suitable arrangement.

Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) signals and the transmission of downlink (DL) signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support a group-based beam reporting in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL signals and the transmission of UL signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for a group-based beam reporting in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a DL that refers to transmissions from a base station or one or more transmission points to UEs and a UL that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
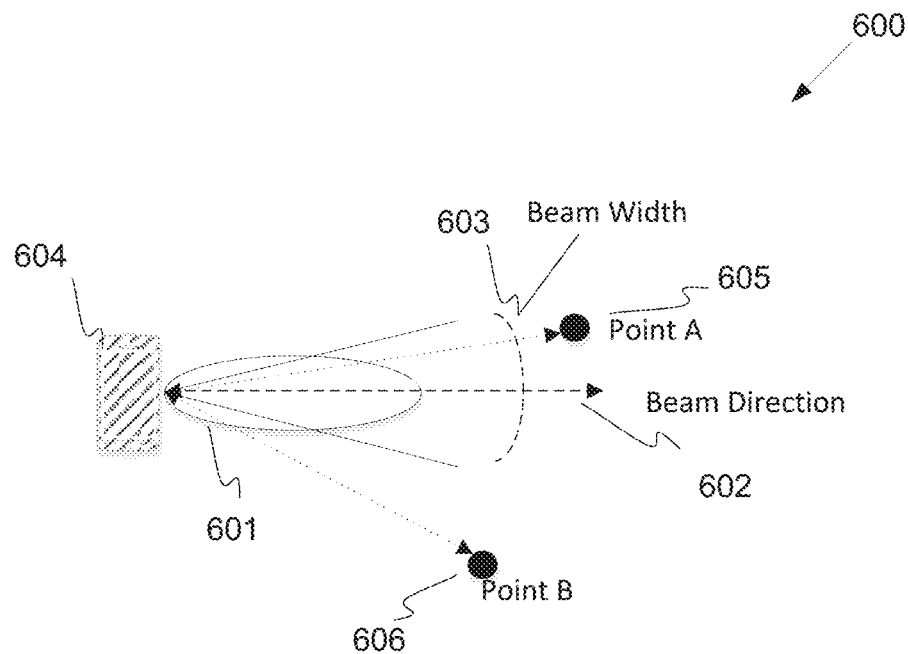
FIG. 6A illustrate an example of wireless system beam according to embodiments of the present disclosure.

FIG. 6A illustrate an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as point A is within a beam width of a beam traveling in a beam direction and coming from the device 604.

As illustrated in FIG. 6A, a device at point B 606 cannot receive from and transmit to the device 604 as point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
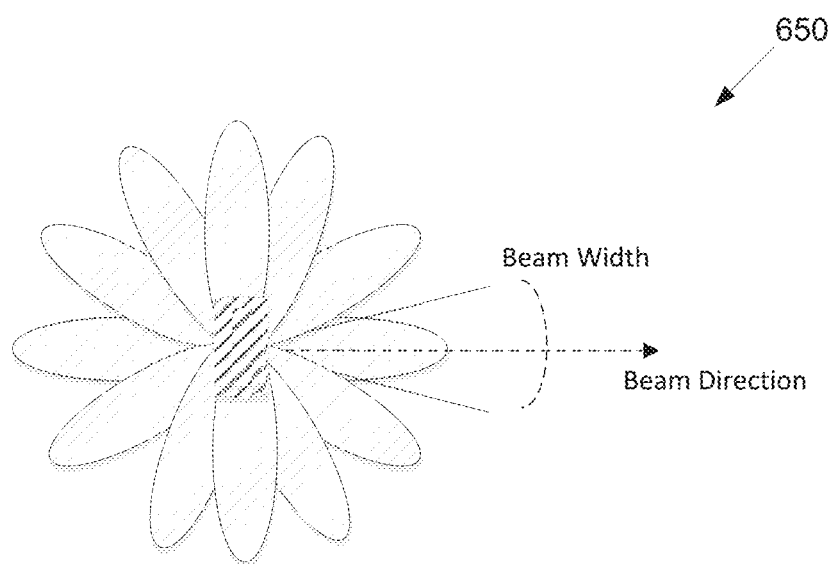
FIG. 6B illustrate an example of multi-beam operation according to embodiments of the present disclosure.

FIG. 6B illustrate an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
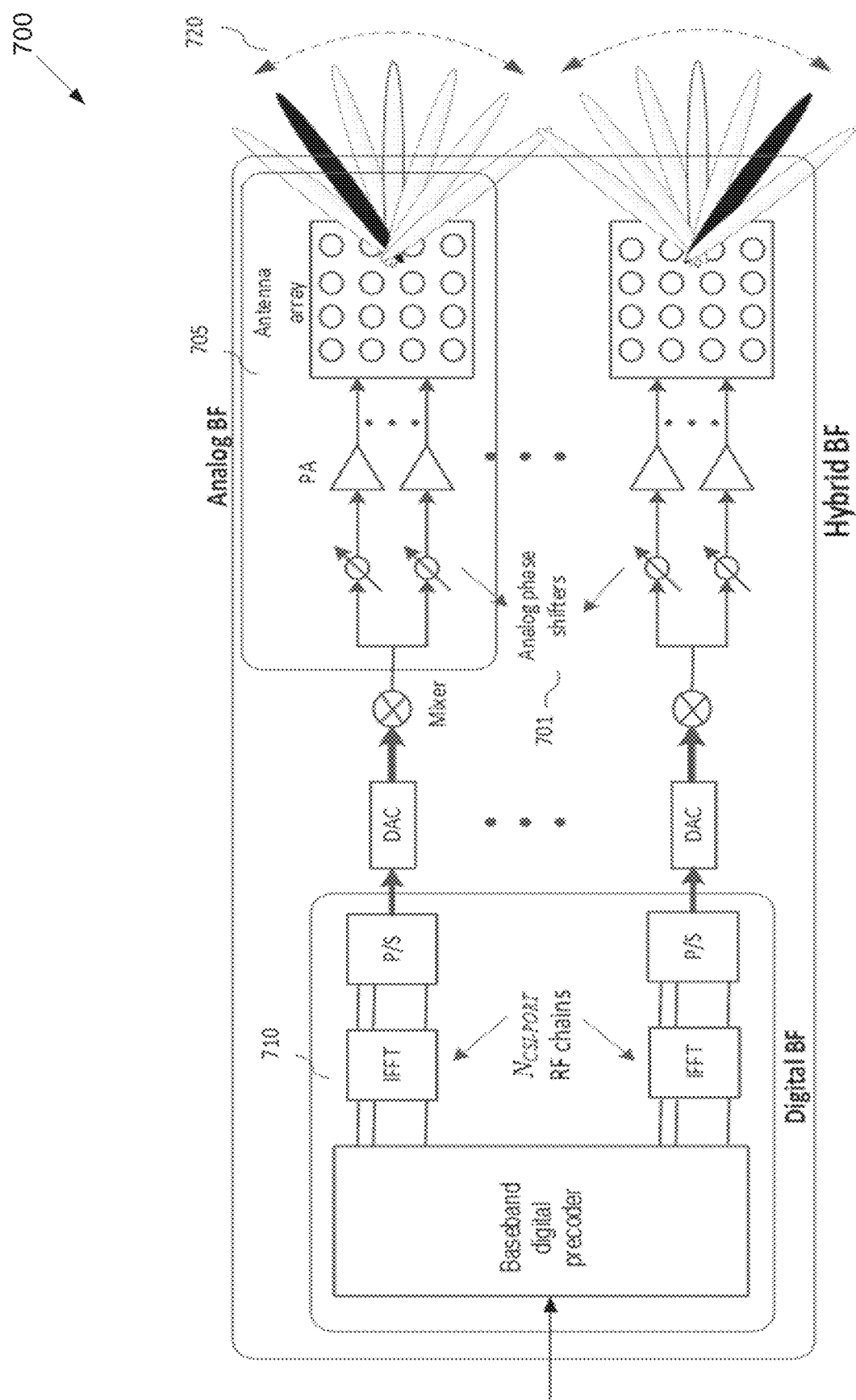
FIG. 7 illustrate an example of antenna structure according to embodiments of the present disclosure.

FIG. 7 illustrate an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam.

The aforementioned system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

In a wireless communications system, a UE could simultaneously transmit/receive one or more RSs/channels to/from multiple (more than one) transmission-reception points (TRPs). In the present disclosure, a TRP can represent a collection of measurement antenna ports, measurement RS resources and/or control resource sets (CORESETs). For example, a TRP could be associated with one or more of: (1) a plurality of CSI-RS resources; (2) a plurality of CRIs (CSI-RS resource indices/indicators); (3) a measurement RS resource set, for example, a CSI-RS resource set along with its indicator; (4) a plurality of CORESETs associated with a CORESETPoolIndex; and (5) a plurality of CORESETs associated with a TRP-specific index/indicator/identity.

Different TRPs in the multi-TRP system could be placed at different locations (i.e., physically non-co-located) and connected through ideal/non-ideal backhauls. Each TRP can include at least one antenna panel comprising of multiple antenna elements. The multiple communication links established between the TRPs and the UE can increase the system throughput and/or improve the system diversity gain/reliability.

Different TRPs in the multi-TRP system could share/ broadcast the same physical cell identity (PCI) or have/ broadcast different PCIs. In the present disclosure, the non-serving cell(s) or the non-serving cell TRP(s) could have/broadcast different physical cell IDs (PCIs) and/or other higher layer signaling index values from that of the serving cell or the serving cell TRP (i.e., the serving cell PCI).

In one example, the serving cell or the serving cell TRP could be associated with the serving cell ID (SCI) and/or the serving cell PCI. That is, for the inter-cell operation considered in the present disclosure, different cells/TRPs could broadcast different PCIs and/or one or more cells/TRPs (referred to/defined as non-serving cells/TRPs in the present disclosure) could broadcast different PCIs from that of the serving cell/TRP (i.e., the serving cell PCI) and/or one or more cells/TRPs are not associated with valid SCI (e.g., provided by the higher layer parameter ServCellIndex). In the present disclosure, a non-serving cell PCI can also be referred to as an additional PCI, another PCI or a different PCI (with respect to the serving cell PCI).

The present disclosure considers various design options of beam reporting format(s)/mechanisms(s) for a multi-TRP system comprising of multiple TRPs (broadcast the same PCI or different PCIs). The UE could report in a single reporting instance one or more groups/pairs of resource indicators along with their corresponding beam metrics for the multi-TRP operation. The beam report could include two parts, and the first part could indicate the payload size of the second part. Several triggering conditions/configuration methods corresponding to various beam reporting formats/mechanisms are also specified in this disclosure.

Figure 8:
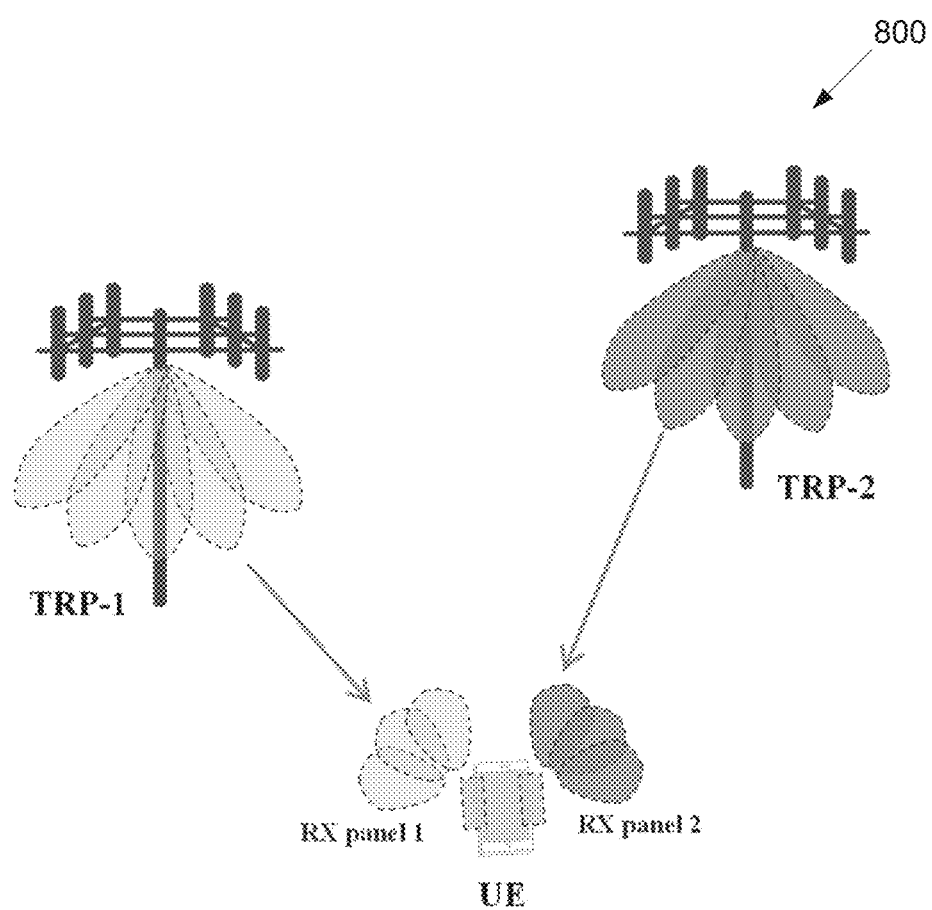
FIG. 8 illustrates an example of multi-TRP system according to embodiments of the present disclosure.

FIG. 8 illustrates an example of multi-TRP system 800 according to embodiments of the present disclosure. An embodiment of the multi-TRP system 800 shown in FIG. 8 is for illustration only.

A multi-TRP system comprising of two TRPs, TRP-1 and TRP-2, is depicted in FIG. 8, in which the UE could simultaneously receive multiple DL RSs/channels from the two TRPs, which could be physically non-co-located. As discussed above, TRP-1 and TRP-2 could broadcast the same PCI (e.g., the serving cell PCI or PCI different from the serving cell PCI) or different PCIs (e.g., the serving cell PCI and PCI(s) different from the serving cell PCI). A group-based beam reporting format/mechanism could be enabled such that the UE could report in a single reporting instance one or more groups/pairs of resource indicators such as SSB resource indicators (SSBRIs) and/or CSI-RS resource indicators (CRIs) along with their corresponding beam metrics such as L1-RSRPs/L1-SINRs for one or more TRPs in the multi-TRP system. Below, two group-based beam reporting strategies (Option-1 and Option-2) are presented. The group-based beam report could include two parts, and the first part could indicate the payload size of the second part. Furthermore, throughout the present disclosure, a reporting instance is equivalent to a CSI reporting instance or a CSI report.

In the present disclosure, a design option (Option-1) for group-based beam reporting for multi-TRP/inter-cell operation is provided.

The UE reports to the network in a single reporting instance N (N≥1, e.g., N=1, 2, 3 or 4) groups of resource indicators (such as SSBRIs and/or CRIs) with each group of resource indicators including M (M>1, e.g., M=2) resource indicators.

Each resource indicator in a given group of resource indicators could correspond to a different TRP in the multi-TRP system. The UE could be indicated/configured by the network the association rule(s)/mapping relationship(s) between the resource indicators in each group of resource indicators and the TRPs (and therefore, the corresponding TRP-specific index/ID values such as PCI values, TRP ID values and CORESETPoolIndex values, or/and the corresponding resource settings/resource sets).

In one example-I, the UE could be indicated by the network the mapping relationship(s)/association rule(s) between the TRP-specific index/ID values such as PCI values, TRP ID values and etc. and the resource indicators in a group of resource indicators. For example, the UE could be first higher layer configured by the network a list/set/pool of TRP-specific index/ID values such as PCI values, TRP ID values and etc. The first resource indicator in the reported group of resource indicators could be associated with/mapped to/linked to the first entry in the list/set/pool of TRP-specific index/ID values, the second resource indicator in the reported group of resource indicators could be associated with/mapped to/linked to the second entry in the list/set/pool of TRP-specific index/ID values, and so on, and the last resource indicator in the reported group of resource indicators could be associated with/mapped to/linked to the last entry in the list/set/pool of TRP-specific index/ID values.

For another example, the first resource indicator in the reported group of resource indicators could be associated with/mapped to/linked to the lowest (or the highest) TRP-specific index/ID value such as the lowest (or the highest) PCI value, the second resource indicator in the reported group of resource indicators could be associated with/mapped to/linked to the second lowest (or the second highest) TRP-specific index/ID value such as the second lowest (or the second highest) PCI value, and so on, and the last resource indicator in the reported group of resource indicators could be associated with/mapped to/linked to the highest (or the lowest) TRP-specific index/ID value such as the highest (or the lowest) PCI value.

In one example-II, the UE could be indicated by the network the mapping relationship(s)/association rule(s) between the resource settings/resource sets and the resource indicators in a group of resource indicators. For example, the UE could be configured by the network M>1 SSB/CSI-RS resource sets in a single CSI resource setting each for a different TRP (e.g., for M=2, the first SSB/CSI-RS resource set could be for TRP-1 and the second SSB/CSI-RS resource set could be for TRP-2).

Furthermore, the UE could be configured by the network that the first resource indicator in the reported group of resource indicators is from/linked to/mapped to/associated with the first SSB/CSI-RS resource set or the SSB/CSI-RS resource set with the lowest (or the highest) resource set index/ID value, the second resource indicator in the reported group of resource indicators is from/linked to/mapped to/associated with the second SSB/CSI-RS resource set or the SSB/CSI-RS resource set with the second lowest (or the second highest) resource set index/ID value, and so on, and the last resource indicator in the reported group of resource indicators is from/linked to/mapped to/associated with the last SSB/CSI-RS resource set or the SSB/CSI-RS resource set with the highest (or the lowest) resource set index/ID value.

That is, for M=2, the UE would report the first resource indicator in the group of resource indicators selected/determined from the first CSI resource set or the CSI resource set with the lowest (or the highest) resource set ID/index value for TRP-1, and the second resource indicator in the group of resource indicators selected/determined from the second CSI resource set or the CSI resource set with the highest (or the lowest) resource set ID/index value for TRP-2.

In one example-III, if CORESETPoolIndex is configured (e.g., the UE is provided by PDCCH-Config two CORE- SETPoolIndex values—0 and 1—in CORESETs), the UE could be indicated/configured by the network the association rule(s)/mapping relationship(s) between the values of CORESETPoolIndex (i.e., either "0" or "1") and the resource indicators in a group of resource indicators. Alternatively, the UE could indicate to the network the association rule(s)/mapping relationship(s) between the values of CORESETPoolIndex and the resource indicators in a group of resource indicators.

The UE could also know the association rule(s)/mapping relationship(s) between the values of CORESETPoolIndex and the resource indicators in a group of resource indicators in an implicit manner. For example, the first resource indicator in the group of resource indicators could be associated with value 0 (or 1) of CORESETPoolIndex or one or more CORESETs with "CORESETPoolIndex=0 or 1" while the second resource indicator in the group of resource indicators could be associated with value 1 (or 0) of CORESETPoolIndex or one or more CORESETs with "CORESETPoolIndex=1 or 0".

The UE could simultaneously receive the downlink beams/RSs/channels corresponding to the resource indicators within the same reported group of resource indicators using either a single spatial domain receive filter or multiple (more than one) spatial domain receive filters.

Within the same reporting instance, the UE could also report to the network N (N≥1, e.g., N=1, 2, 3 or 4) groups of beam metrics (such as L1-RSRPs/L1-SINRs) with each group of beam metrics including M (M>1, e.g., M=2) beam metrics. The reported beam metrics could be one-to-one associated to the reported resource indicators. For instance, assuming N≥1 and M=2, the first beam metric in the first group of beam metrics could correspond to the first resource indicator in the first group of resource indicators, the second beam metric in the first group of beam metrics could correspond to the second resource indicator in the first group of resource indicators, the first beam metric in the second group of beam metrics could correspond to the first resource indicator in the second group of resource indicators, the second beam metric in the second group of beam metrics could correspond to the second resource indicator in the second group of resource indicators, and so on, and the first beam metric in the N-th group of beam metrics could correspond to the first resource indicator in the N-th group of resource indicators, and the second beam metric in the N-th group of beam metrics could correspond to the second resource indicator in the N-th group of resource indicators.

In TABLE 1, an example of the above described mapping order of CSI fields of one report for Option-1 based group-based beam reporting for the multi-TRP operation is presented for N=4 and M=2. The bitwidths for SSBRI, CRI, RSRP and differential RSRP in TABLE 1 are determined according to Table 6.3.1.1.2-6 in the 3GPP TS 38.212. As shown in TABLE 1, the beam metric of the first resource indicator in the first group of resource indicators corresponds to the largest measured value of L1-RSRP.

In addition, a resource set indicator could be incorporated/included in the CSI report as one CSI field. The resource set indicator could be a one-bit indicator, with value 0 or 1, indicating the first or second CSI resource set, from which the first resource indicator in the first group of resource indicators is selected/determined. Furthermore, the first resource indicator in each of the remaining (N−1) groups of resource indicator is selected/determined from the same CSI resource set used for determining the first resource indicator in the first group of resource indicators, and the second resource indicator in each of the remaining (N−1) groups of resource indicator is selected/determined from the same CSI resource set used for determining the second resource indicator in the first group of resource indicators.

TABLE 1

Mapping order of CSI fields of one report for Option-1 based group-based beam reporting

| CSI report number | CSI fields |
| --- | --- |
| CSI report #n | Resource set indicator<br>The first resource indicator (SSBRI/CRI) in the first reported group of resource indicators<br>The second resource indicator (SSBRI/CRI) in the first reported group of resource indicators<br>The first resource indicator (SSBRI/CRI) in the second reported group of resource indicators, if reported<br>The second resource indicator (SSBRI/CRI) in the second reported group of resource indicators, if reported<br>The first resource indicator (SSBRI/CRI) in the third reported group of resource indicators, if reported<br>The second resource indicator (SSBRI/CRI) in the third reported group of resource indicators, if reported<br>The first resource indicator (SSBRI/CRI) in the fourth reported group of resource indicators, if reported<br>The second resource indicator (SSBRI/CRI) in the fourth reported group of resource indicators, if reported<br>RSRP of the first resource indicator (SSBRI/CRI) in the first reported group of resource indicators<br>Differential RSRP of the second resource indicator (SSBRI/CRI) in the first reported group of resource indicators<br>Differential RSRP of the first resource indicator (SSBRI/CRI) in the second reported group of resource indicators, if reported<br>Differential RSRP of the second resource indicator (SSBRI/CRI) in the second reported group of resource indicators, if reported<br>Differential RSRP of the first resource indicator (SSBRI/CRI) in the third reported group of resource indicators, if reported<br>Differential RSRP of the second resource indicator (SSBRI/CRI) in the third reported group of resource indicators, if reported<br>Differential RSRP of the first resource indicator (SSBRI/CRI) in the fourth reported group of resource indicators, if reported<br>Differential RSRP of the second resource indicator (SSBRI/CRI) in the fourth reported group of resource indicators, if reported |

For an inter-cell system comprising the serving cell PCI and at least one PCI different from the serving cell PCI, resource configuration(s) for inter-cell beam measurement could be specified according to one or more of the following design examples.

In one example-A, the UE could be configured by the network M (M>1, e.g., M=2) CSI resource sets, e.g., SSB resource sets provided by CSI-SSB-ResourceSet or NZP CSI-RS resource sets provided by NZP-CSI-RS-ResourceSet, for channel measurement, wherein each configured SSB resource set could contain one or more SSB resources/indexes and each configured NZP CSI-RS resource set could contain one or more NZP CSI-RS resources/resource configuration indexes. Each configured CSI resource set could be associated with at least one PCI (i.e., either the serving cell PCI or a PCI different from the serving cell PCI).

For example, the first CSI resource set or the CSI resource set with the lowest (or the highest) resource set ID/index value could be associated with the serving cell PCI, the second CSI resource set or the CSI resource set with the second lowest (or the second highest) resource set ID/index value could be associated with the lowest (or the highest) PCI among the PCIs different from the serving cell PCI, the third CSI resource set or the CSI resource set with the third lowest (or the third highest) resource set ID/index value could be associated with the second lowest (or the second highest) PCI among the PCIs different from the serving cell PCI, and so on, and the last CSI resource set or the CSI resource set with the highest (or the lowest) resource set ID/index value could be associated with the highest (or the lowest) PCI among the PCIs different from the serving cell PCI.

For another example, the first CSI resource set or the CSI resource set with the lowest (or the highest) resource set ID/index value could be associated with the lowest (or the highest) PCI, the second CSI resource set or the CSI resource set with the second lowest (or the second highest) resource set ID/index value could be associated with the second lowest (or the second highest) PCI, and so on, and the last CSI resource set or the CSI resource set with the highest (or the lowest) resource set ID/index value could be associated with the highest (or the lowest) PCI.

In one example-B, the UE could be configured by the network M (M>1, e.g., M=2) CSI resource sets, e.g., SSB resource sets provided by CSI-SSB-ResourceSet or NZP CSI-RS resource sets provided by NZP-CSI-RS-ResourceSet, for channel measurement, wherein each configured SSB resource set could contain one or more SSB resources/indexes and each configured NZP CSI-RS resource set could contain one or more NZP CSI-RS resources/resource configuration indexes. Each configured CSI resource set could be associated with at least one PCI index corresponding/pointing to a PCI (i.e., either the serving cell PCI or a PCI different from the serving cell PCI) in a set/list/pool of PCIs that are higher layer configured to the UE.

For example, the first CSI resource set or the CSI resource set with the lowest (or the highest) resource set ID/index value could be associated with the PCI index corresponding/pointing to the serving cell PCI in the higher layer configured set/list/pool of PCIs, the second CSI resource set or the CSI resource set with the second lowest (or the second highest) resource set ID/index value could be associated with the lowest (or the highest) PCI index corresponding/pointing to a PCI different from the serving cell PCI in the higher layer configured set/list/pool of PCIs, the third CSI resource set or the CSI resource set with the third lowest (or the third highest) resource set ID/index value could be associated with the second lowest (or the second highest) PCI index corresponding/pointing to a PCI different from the serving cell PCI in the higher layer configured list/set/pool of PCIs, and so on, and the last CSI resource set or the CSI resource set with the highest (or the lowest) resource set ID/index value could be associated with the highest (or the lowest) PCI index corresponding/pointing to a PCI different from the serving cell PCI in the higher layer configured list/set/pool of PCIs.

For another example, the first CSI resource set or the CSI resource set with the lowest (or the highest) resource set ID/index value could be associated with the lowest (or the highest) PCI index, the second CSI resource set or the CSI resource set with the second lowest (or the second highest) resource set ID/index value could be associated with the second lowest (or the second highest) PCI index, and so on, and the last CSI resource set or the CSI resource set with the highest (or the lowest) resource set ID/index value could be associated with the highest (or the lowest) PCI index, wherein a PCI index corresponds/points to a PCI in the higher layer configured list/set/pool of PCIs.

Yet for another example, the first CSI resource set or the CSI resource set with the lowest (or the highest) resource set ID/index value could be associated with the PCI index corresponding/pointing to the serving cell PCI in the higher layer configured list/set/pool of PCIs, the second CSI resource set or the CSI resource set with the second lowest (or the second highest) resource set ID/index value could be associated with the PCI index corresponding/pointing to the lowest (or the highest) PCI among the PCIs different from the serving cell PCI in the higher layer configured list/set/pool of PCIs, and so on, and the last CSI resource set or the CSI resource set with the highest (or the lowest) resource set ID/index value could be associated with the PCI index corresponding/pointing to the highest (or the lowest) PCI among the PCIs different from the serving cell PCI in the higher layer configured list/set/pool of PCIs.

Yet for another example, the first CSI resource set or the CSI resource set with the lowest (or the highest) resource set ID/index value could be associated with the PCI index corresponding/pointing to the lowest (or the highest) PCI in the higher layer configured list/set/pool of PCIs, the second CSI resource set or the CSI resource set with the second lowest (or the second highest) resource set ID/index value could be associated with the PCI index corresponding/pointing to the second lowest (or the second highest) PCI in the higher layer configured list/set/pool of PCIs, and so on, and the last CSI resource set or the CSI resource set with the highest (or the lowest) resource set ID/index value could be associated with the PCI index corresponding/pointing to the highest (or the lowest) PCI in the higher layer configured list/set/pool of PCIs.

In one example-C, the UE could be configured by the network a CSI resource set (e.g., a SSB resource set provided by CSI-SSB-ResourceSet or a NZP CSI-RS resource set provided by NZP-CSI-RS-ResourceSet) for channel measurement. The CSI resource set contains one or more sets of at least M (M>1, e.g., M=2) SSB resources/indexes or NZP CSI-RS resources/resource configuration indexes. Each SSB resource/index or each NZP CSI-RS resource/resource configuration index configured in the CSI resource set could be associated with a PCI (e.g., either the serving cell PCI or a PCI different from the serving cell PCI) or a PCI index corresponding/pointing to a PCI (e.g., either the serving cell PCI or a PCI different from the serving cell PCI) in a list/set/pool of PCIs that are higher layer configured to the UE.

Given the above resource configurations for the inter-cell beam measurement, the corresponding Option-1 based group-based inter-cell beam reporting formats could be specified according to one or more of the following design examples.

In one example-D, the UE could report in a single CSI reporting instance N (e.g., N≥1, e.g., N=1, 2, 3, or 4) groups of resource indicators (such as SSBRIs and/or CRIs) with each group of resource indicators including M (M>1, e.g., M=2) resource indicators. Each resource indicator such as SSBRI/CRI in a reported group of resource indicators could be associated with a PCI (i.e., either the serving cell PCI or a PCI different from the serving cell PCI) or determined from a CSI resource set (e.g., configured according to the example-A or example-B in the present disclosure). The UE could simultaneously receive the SSB resources or CSI-RS resources corresponding to the SSBRIs or CRIs in the same reported group of resource indicators.

For example, the first resource indicator in each group of resource indicators could be determined from/associated with the first CSI resource set configured according to the example-A or example-B (and therefore, the corresponding/associated PCI), the second resource indicator in each group of resource indicators could be determined from/associated with the second CSI resource set configured according to the example-A or example-B (and therefore, the corresponding/associated PCI), and so on, and the last resource indicator in each group of resource indicators could be determined from/associated with the last CSI resource set configured according to the example-A or example-B (and therefore, the corresponding/associated PCI).

For another example, the first resource indicator in each group of resource indicators could be determined from/associated with the CSI resource set with the lowest (or the highest) resource set index/ID value configured according to the example-A or example-B (and therefore, the corresponding/associated PCI), the second resource indicator in each group of resource indicators could be determined from/associated with the CSI resource set with the second lowest (or the second highest) resource set index/ID value configured according to the example-A or example-B (and therefore, the corresponding/associated PCI), and so on, and the last resource indicator in each group of resource indicators could be determined from/associated with the CSI resource set with the highest (or the lowest) resource set index/ID value configured according to the example-A or example-B (and therefore, the corresponding/associated PCI).

Yet for another example, the first resource indicator in each group of resource indicators could be determined from/associated with the CSI resource set associated with the serving cell PCI/PCI index configured according to the example-A or example-B, the second resource indicator in each group of resource indicators could be determined from/associated with the CSI resource set associated with the lowest (or the highest) PCI/PCI index among the PCIs/PCI indexes different from the serving cell PCI/PCI index configured according to the example-A or example-B, and so on, and the last resource indicator in each group of resource indicators could be determined from/associated with the CSI resource set associated with the highest (or the lowest) PCI/PCI index among the PCIs/PCI indexes different from the serving cell PCI/PCI index configured according to the example-A or example-B.

Yet for another example, the first resource indicator in each group of resource indicators could be determined from/associated with the CSI resource set associated with the lowest (or the highest) PCI/PCI index configured according to the example-A or example-B, the second resource indicator in each group of resource indicators could be determined from/associated with the CSI resource set associated with the second lowest (or the second highest) PCI/PCI index configured according to the example-A or example-B, and so on, and the last resource indicator in each group of resource indicators could be determined from/associated with the CSI resource set associated with the highest (or the lowest) PCI/PCI index configured according to the example-A or example-B.

In one example-E, the UE could report in a single CSI reporting instance N (e.g., N≥1, e.g., N=1, 2, 3, or 4) groups of resource indicators (such as SSBRIs and/or CRIs) with each group of resource indicators including M (M>1, e.g., M=2) resource indicators. Each resource indicator such as SSBRI/CRI in a reported group of resource indicators could be determined from the CSI resource set configured according to the example-C and associated with a PCI (i.e., either the serving cell PCI or a PCI different from the serving cell PCI). The UE could simultaneously receive the SSB resources or CSI-RS resources corresponding to the SSBRIs or CRIs in the same reported group of resource indicators.

For instance, the first resource indicator in each group of resource indicators could be determined from one or more SSB/CSI-RS resources associated with the serving cell PCI/PCI index or the lowest (or the highest) PCI/PCI index in the CSI resource set configured according to the example-C, the second resource indicator in each group of resource indicators could be determined from one or more SSB/CSI-RS resources associated with the lowest (or the highest) PCI/PCI index among the PCIs/PCI indexes different from the serving cell PCI/PCI index or the second lowest (or the second highest) PCI/PCI index in the CSI resource set configured according to the example-C, and so on, and the last resource indicator in each group of resource indicators could be determined from one or more SSB/CSI-RS resources associated with the highest (or the lowest) PCI/PCI index among the PCIs/PCI indexes different from the serving cell PCI/PCI index or the highest (or the lowest) PCI/PCI index in the CSI resource set configured according to the example-C.

For another example, the UE could autonomously determine the order of the resource indicators in each reported group of resource indicators in one CSI report. For this case, the orders of the resource indicators could be the same or different across the N reported groups of resource indicators in one CSI report.

In one example-F, the UE could report in a single CSI reporting instance N (e.g., N≥1, e.g., N=1, 2, 3, or 4) groups of resource indicators (such as SSBRIs and/or CRIs) with each group of resource indicators including M (M>1, e.g., M=2) resource indicators. Each resource indicator such as SSBRI/CRI in a reported group of resource indicators could be associated with a PCI (i.e., either the serving cell PCI or a PCI different from the serving cell PCI) or determined from a CSI resource set (e.g., configured according to the example-A or example-B in the present disclosure).

For instance, the first resource indicator in the first group of resource indicators could be associated with the largest measured value of L1-RSRP (or L1-SINR), and the remaining (M−1) resource indicators in the first group of resource indicators could be determined from one or more CSI resource sets (and therefore, associated with one or more PCIs/PCI indexes) following those specified in the example-D—e.g., according to the order of the resource set indexes/IDs, PCIs/PCI indexes and etc.

Furthermore, the first resource indicator in each of the remaining (N−1) groups of resource indicators could be determined from the same CSI resource set (and therefore, associated with the same PCI/PCI index) as that used for determining the first resource indicator in the first group of resource indicators, the second resource indicator in each of the remaining (N−1) groups of resource indicators could be determined from the same CSI resource set (and therefore, associated with the same PCI/PCI index) as that used for determining the second resource indicator in the first group of resource indicators, and so on, and the last resource indicator in each of the remaining (N−1) groups of resource indicators could be determined from the same CSI resource set (and therefore, associated with the same PCI/PCI index) as that used for determining the last resource indicator in the first group of resource indicators.

For M=2, the first resource indicator in the first group of resource indicators could be associated with the largest measured value of L1-RSRP (or L1-SINR), and the second resource indicator in the first group of resource indicators could be determined from the CSI resource set different from that used for determining the first resource indicator in the first group of resource indicators. Furthermore, the first resource indicator in each of the remaining (N−1) groups of resource indicators could be determined from the same CSI resource set (and therefore, associated with the same PCI/PCI index) as that used for determining the first resource indicator in the first group of resource indicators, and the second resource indicator in each of the remaining (N−1) groups of resource indicators could be determined from the same CSI resource set (and therefore, associated with the same PCI/PCI index) as that used for determining the second resource indicator in the first group of resource indicators.

Alternatively, the resource indicators in the remaining (N−1) groups of resource indicators could be ordered according to those specified in the example-D—e.g., according to the order of the resource set indexes/IDs, PCIs/PCI indexes and etc.

In one example-G, the UE could report in a single CSI reporting instance N (e.g., N≥1, e.g., N=1, 2, 3, or 4) groups of resource indicators (such as SSBRIs and/or CRIs) with each group of resource indicators including M (M>1, e.g., M=2) resource indicators. Each resource indicator such as SSBRI/CRI in a reported group of resource indicators could be determined from the CSI resource set configured according to the example-C and associated with a PCI (i.e., either the serving cell PCI or a PCI different from the serving cell PCI). The UE could simultaneously receive the SSB resources or CSI-RS resources corresponding to the SSBRIs or CRIs in the same reported group of resource indicators.

For instance, the first resource indicator in the first group of resource indicators could be associated with the largest measured value of L1-RSRP (or L1-SINR), and the remaining (M−1) resource indicators in the first group of resource indicators could be determined from one or more SSB/CSI-RS resources (and therefore, associated with one or more PCIs/PCI indexes) configured in the CSI resource set following those specified in the example-E—e.g., according to the order of the associated PCIs/PCI indexes or autonomously determined by the UE.

Furthermore, the first resource indicator in each of the remaining (N−1) groups of resource indicators could be determined from the same SSB/CSI-RS resources associated with the same PCI/PCI index in the CSI resource set that are used for determining the first resource indicator in the first group of resource indicators, the second resource indicator in each of the remaining (N−1) groups of resource indicators could be determined from the same SSB/CSI-RS resources associated with the same PCI/PCI index in the CSI resource set that are used for determining the second resource indicator in the first group of resource indicators, and so on, and the last resource indicator in each of the remaining (N−1) groups of resource indicators could be determined from the same SSB/CSI-RS resources associated with the same PCI/PCI index in the CSI resource set that are used for determining the last resource indicator in the first group of resource indicators.

For M=2, the first resource indicator in the first group of resource indicators could be associated with the largest measured value of L1-RSRP (or L1-SINR), and the second resource indicator in the first group of resource indicators could be determined from the SSB/CSI-RS resources different from those in the CSI resource set used for determining the first resource indicator in the first group of resource indicators. Furthermore, the first resource indicator in each of the remaining (N−1) groups of resource indicators could be determined from the same SSB/CSI-RS resources associated with the same PCI/PCI index in the CSI resource set that are used for determining the first resource indicator in the first group of resource indicators, and the second resource indicator in each of the remaining (N−1) groups of resource indicators could be determined from the same SSB/CSI-RS resources associated with the same PCI/PCI index in the CSI resource set that are used for determining the second resource indicator in the first group of resource indicators.

Alternatively, the resource indicators in the remaining (N−1) groups of resource indicators could be ordered according to those specified in the example-E—e.g., according to the order of the associated PCIs/PCI indexes or autonomously determined by the UE.

For the example-D, example-E, example-F and example-G in the present disclosure, the UE could also report to the network in the same reporting instance as for the resource indicators N (N≥1, e.g., N=1, 2, 3 or 4) groups of beam metrics (such as L1-RSRPs/L1-SINRs) with each group of beam metrics including M (M>1, e.g., M=2) beam metrics. The reported beam metrics could be one-to-one associated to the reported resource indicators. For instance, assuming N≥1 and M=2, the first beam metric in the first group of beam metrics could correspond to the first resource indicator in the first group of resource indicators, the second beam metric in the first group of beam metrics could correspond to the second resource indicator in the first group of resource indicators, the first beam metric in the second group of beam metrics could correspond to the first resource indicator in the second group of resource indicators, the second beam metric in the second group of beam metrics could correspond to the second resource indicator in the second group of resource indicators, and so on, and the first beam metric in the N-th group of beam metrics could correspond to the first resource indicator in the N-th group of resource indicators, and the second beam metric in the N-th group of beam metrics could correspond to the second resource indicator in the N-th group of resource indicators.

Furthermore, for the example-D, example-E, example-F and example-G in the present disclosure: (1) for L1-RSRP reporting, the UE could use differential L1-RSRP based reporting, where the largest measured value of L1-RSRP is quantized to a 7-bit value in the range [−140, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance, and (2) for L1-SINR reporting, the UE could use differential L1-SINR based reporting, where the largest measured value of L1-SINR is quantized to a 7-bit value in the range [−23, −40] dBm with 0.5 dB step size, and the differential L1-SINR is quantized to a 4-bit value. The differential L1-SINR value is computed with 1 dB step size with a reference to the largest measured L1-SINR value which is part of the same L1-SINR reporting instance.

For the example-F in the present disclosure, as the first resource indicator in the first reported group of resource indicators is associated with the largest measured value of L1-RSRP (or equivalently, the first beam metric in the first reported group of beam metrics corresponds to the largest measured value of L1-RSRP), the UE may need to indicate to the network information related to the CSI resource set (and therefore, the associated PCI/PCI index), from which the first resource indicator in the first reported group of resource indicators is determined/selected.

In TABLE 2, an example of the above described mapping order of CSI fields of one report for Option-1 based group-based inter-cell beam reporting is presented for N=4 and M=2. The bitwidths for SSBRI, CRI, RSRP and differential RSRP are provide in Table 6.3.1.1.2-6 in the 3GPP TS 38.212. As shown in TABLE 2, an entity indicator could be incorporated/included in the CSI report as one CSI field.

In one example-i1, the entity indicator could correspond to the resource set ID/index/indicator of the CSI resource set (e.g., configured according to the example-A or example-B in the present disclosure), from which the first resource indicator in the first reported group of resource indicators is selected/determined. When M=2, the entity indicator could be a one-bit indicator with value 0 or 1 indicating the first CSI resource set or the second CSI resource set for channel measurement (configured according to the example-A or example-B in the present disclosure), respectively, from which the first resource indicator in the first reported group of resource indicators is selected/determined. The entity indicator is also associated with the PCI/PCI index via the association between the entity indicator and the corresponding CSI resource set as discussed above and the association between the PCI/PCI index and the corresponding CSI resource set as discussed in the example-A or example-B in the present disclosure.

In one example-i2, the entity indicator could correspond to a PCI or a PCI index corresponding/pointing to a PCI value in a list/set/pool of PCIs that are higher layer configured to the UE. The indicated PCI/PCI index could be either the serving cell PCI/PCI index or a PCI/PCI index different from the serving cell PCI/PCI index. For this case, the first resource indicator in the first reported group of resource indicators could be selected/determined from the CSI resource set associated with the indicated PCI/PCI index (according those specified in the example-A or example-B in the present disclosure).

TABLE 2

Mapping order of CSI fields of one report for Option-1 based group-based inter-cell beam reporting

| CSI report number | CSI fields |
|---|---|
| CSI report #n | An entity indicator |
| | The first resource indicator (SSBRI/CRI) in the first reported group of resource indicators |
| | The second resource indicator (SSBRI/CRI) in the first reported group of resource indicators |
| | The first resource indicator (SSBRI/CRI) in the second reported group of resource indicators, if reported |
| | The second resource indicator (SSBRI/CRI) in the second reported group of resource indicators, if reported |
| | The first resource indicator (SSBRI/CRI) in the third reported group of resource indicators, if reported |
| | The second resource indicator (SSBRI/CRI) in the third reported group of resource indicators, if reported |
| | The first resource indicator (SSBRI/CRI) in the fourth reported group of resource indicators, if reported |
| | The second resource indicator (SSBRI/CRI) in the fourth reported group of resource indicators, if reported |
| | RSRP of the first resource indicator (SSBRI/CRI) in the first reported group of resource indicators |
| | Differential RSRP of the second resource indicator (SSBRI/CRI) in the first reported group of resource indicators |

TABLE 2-continued

Mapping order of CSI fields of one report for Option-1 based group-based inter-cell beam reporting

| CSI report number | CSI fields |
|---|---|
| | Differential RSRP of the first resource indicator (SSBRI/CRI) in the second reported group of resource indicators, if reported |
| | Differential RSRP of the second resource indicator (SSBRI/CRI) in the second reported group of resource indicators, if reported |
| | Differential RSRP of the first resource indicator (SSBRI/CRI) in the third reported group of resource indicators, if reported |
| | Differential RSRP of the second resource indicator (SSBRI/CRI) in the third reported group of resource indicators, if reported |
| | Differential RSRP of the first resource indicator (SSBRI/CRI) in the fourth reported group of resource indicators, if reported |
| | Differential RSRP of the second resource indicator (SSBRI/CRI) in the fourth reported group of resource indicators, if reported |

For the example-D, example-E or example-G in the present disclosure, the entity indicator field in the CSI report shown in TABLE 2 could be absent. As discussed above, at least for the example-F, the resource indicators in the remaining (N−1) groups of resource indicators (if reported) could be ordered according to the resource indicators in the first reported group of resource indicators, wherein the first resource indicator in the first reported group of resource indicators is associated with the indicated entity indicator.

The UE could be configured/indicated by the network the exact values of N, i.e., the number of groups of resource indicators/beam metrics to be reported in a single reporting instance and/or M, i.e., the number of resource indicators/beam metrics in a given group of resource indicators/beam metrics; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For the value of N, in one example, the UE could be indicated by the network, e.g., via higher layer RRC signaling and/or MAC CE command and/or DCI based signaling, the exact value of N, i.e., the number of groups of resource indicators/beam metrics to be reported in a single reporting instance for Option-1 based group-based beam reporting. For instance, the exact value of N could be indicated/configured in the corresponding CSI reporting setting, e.g., via the higher layer parameter CSI-ReportConfig, which is presented in TABLE 3.

As can be seen from TABLE 3, the higher layer parameter groupBasedBeamReportingMTRP-Opt1, could be configured/used to turn on/off the Option-1 based group-based (inter-cell) beam reporting, and within/under groupBasedBeamReportingMTRP-Opt1, the higher layer parameter nrofReportedGroup-Opt1 indicates the number (N) of groups of resource indicators/beam metrics to be reported per reporting setting/in a single reporting instance for the multi-TRP/inter-cell group-based beam reporting (Option-1 in this disclosure). Here, N≤N_max, where N_max represents the maximum number of groups of resource indicators/beam metrics that can be reported per reporting setting/in a single reporting instance for Option-1 based group-based (inter-cell) beam reporting; for instance, N_max could be 1, 2, 3 or 4 depending on UE capability reporting. When the field nrofReportedGroup-Opt1 is absent, the UE could apply the value 1 (i.e., N=1).

TABLE 3

An example of higher layer parameter CSI-ReportConfig indicating the number of groups of resource indicators/beam metrics to be reported for the Option-1 based group-based (inter-cell) beam reporting

```
CSI-ReportConfig ::= SEQUENCE {
reportConfigId CSI-ReportConfigId,
carrier ServCellIndex OPTIONAL, -- Need S
groupBasedBeamReportingMTRP-Opt1 CHOICE {
...
NrofReportedGroup-Opt1 ENUMERATED {n1, n2, n3, n4} OPTIONAL -- Need S
...
},
resourcesForChannelMeasurement CSI-ResourceConfigId,
    csi-IM-ResourcesForInterference CSI-ResourceConfigId OPTIONAL, -- Need R
    nzp-CSI-RS-ResourcesForInterference CSI-ResourceConfigId OPTIONAL, -- Need R
...
}
```

For the value of N, in another example, the UE could be first higher layer configured by the network (e.g., via the higher layer RRC signalling) a list/set/pool of candidate values for the number (N) of groups of resource indicators/beam metrics to be reported per reporting setting/in a single reporting instance for Option-1 based group-based (inter-cell) beam reporting, denoted by N_set. The UE could then receive from the network a MAC CE command activating at least one value from the list/set/pool of candidate values for N as the number (N) of groups of resource indicators/beam metrics to be reported per reporting setting/in a single reporting instance for Option-1 based group-based beam reporting for the multi-TRP/inter-cell operation.

For the value of N, in yet another example, the UE could be first higher layer configured by the network (e.g., via the higher layer RRC signalling) a list/set/pool of candidate values for the number (N) of groups of resource indicators/beam metrics to be reported per reporting setting/in a single reporting instance for Option-1 based group-based (inter-cell) beam reporting, denoted by N_set. The UE could then receive from the network a bitmap with each entry/bit in the bitmap corresponding to a value/entry in the list/set/pool of candidate values for N. If an entry/bit in the bitmap is set to '1', the corresponding/associated value/entry in the list/set/pool of candidate values for N is activated as the number (N) of groups of resource indicators/beam metrics to be reported per reporting setting/in a single reporting instance for Option-1 based group-based beam reporting for the multi-TRP/inter-cell operation.

For the value of M, in one example, the UE could be indicated by the network, e.g., via higher layer RRC signaling and/or MAC CE command and/or DCI based signaling, the exact value of M, i.e., the number of resource indicators/beam metrics reported in a group of resource indicators/beam metrics in a single reporting instance for Option-1 based group-based (inter-cell) beam reporting. In this example, the value of M is common for all reported N groups of resource indicators/beam metrics per reporting setting/in a single reporting instance. For instance, the exact value of M could be indicated/configured in the corresponding CSI reporting setting, e.g., via the higher layer parameter CSI-ReportConfig, which is presented in TABLE 4.

As can be seen from TABLE 4, the higher layer parameter groupBasedBeamReportingMTRP-Opt1, could be configured/used to turn on/off the Option-1 based group-based beam reporting for the multi-TRP/inter-cell operation, and within/under groupBasedBeamReportingMTRP-Opt1, the higher layer parameter nrofReportedRSPerGroup-Opt1 indicates the number (M) of resource indicators/beam metrics in each group of resource indicators/beam metrics to be reported per reporting setting/in a single reporting instance for the group-based (inter-cell) beam reporting (Option-1 in this disclosure). Here, M≤M_max, where M_max represents the maximum number of resource indicators/beam metrics that can be reported in a group of resource indicators/beam metrics per reporting setting/in a single reporting instance for Option-1 based group-based (inter-cell) beam reporting; for instance, M_max could be 2, 3 or 4 depending on UE capability reporting. When the field nrofReportedRSPerGroup-Opt1 is absent, the UE could apply the value 2 (i.e., M=2).

TABLE 4

An example of higher layer parameter CSI-ReportConfig indicating the number of resource indicators/beam metrics to be reported per group for the Option-1 based group-based (inter-cell) beam reporting

```
CSI-ReportConfig ::= SEQUENCE {
  reportConfigId CSI-ReportConfigId,
  carrier ServCellIndex OPTIONAL, -- Need S
  groupBasedBeamReportingMTRP-Opt1 CHOICE {
    ...
    NrofReportedRSPerGroup-Opt1 ENUMERATED {n2, n3, n4} OPTIONAL -- Need S
    ...
  },
  resourcesForChannelMeasurement CSI-ResourceConfigId,
      csi-IM-ResourcesForInterference CSI-ResourceConfigId OPTIONAL, -- Need R
      nzp-CSI-RS-ResourcesForInterference CSI-ResourceConfigId OPTIONAL, -- Need R
      ...
}
```

For the value of M, in another example, the UE could be indicated by the network, e.g., via higher layer RRC signaling and/or MAC CE command and/or DCI based signaling, the exact value of M, i.e., the number of resource indicators/beam metrics reported in a group of resource indicators/beam metrics in a single reporting instance for Option-1 based group-based (inter-cell) beam reporting. In this example, the value of M could be different across/among two or more reported N groups of resource indicators/beam metrics per reporting setting/in a single reporting instance. For instance, the UE could be indicated/configured by the network a set of values for M, and each entry in the set corresponds to one or more reported groups of resource indicators/beam metrics.

The UE could also be indicated by the network the mapping relationship(s)/association rule(s) between the set of values for M and the reported groups of resource indicators/beam metrics in a single reporting instance for Option-1 based group-based (inter-cell) beam reporting. The set of values for M could be indicated/configured in the corresponding CSI reporting setting, e.g., via the higher layer parameter CSI-ReportConfig. Here, each value/entry in the set of values for M≤M_max, where M_max represents the maximum number of resource indicators/beam metrics that can be reported in a group of resource indicators/beam metrics per reporting setting/in a single reporting instance for Option-1 based group-based (inter-cell) beam reporting; for instance, M_max could be 2, 3 or 4 depending on UE capability reporting.

For the value of M, in yet another example, the UE could be first higher layer configured by the network (e.g., via the higher layer RRC signalling) a list/set/pool of candidate values for the number (M) of resource indicators/beam metrics to be reported in a given group of resource indicators/beam metrics per reporting setting/in a single reporting instance for Option-1 based group-based (inter-cell) beam reporting, denoted by M_set. In this example, the value of M is common for all reported N groups of resource indicators/beam metrics per reporting setting/in a single reporting instance. The UE could then receive from the network a MAC CE command activating at least one value from the list/set/pool of candidate values for M as the number (M) of resource indicators/beam metrics to be reported in each group of resource indicators/beam metrics per reporting setting/in a single reporting instance for Option-1 based group-based beam reporting for the multi-TRP/inter-cell operation.

For the value of M, in yet another example, the UE could be first higher layer configured by the network (e.g., via the higher layer RRC signalling) a list/set/pool of candidate values for the number (M) of resource indicators/beam metrics to be reported in a given group of resource indicators/beam metrics per reporting setting/in a single reporting instance for Option-1 based group-based (inter-cell) beam reporting, denoted by M_set. In this example, the value of M could be different across/among two or more reported N groups of resource indicators/beam metrics per reporting setting/in a single reporting instance. The UE could then receive from the network at least one MAC CE command activating at least one value from the list/set/pool of candidate values for M as the number (M) of resource indicators/beam metrics to be reported in one or more groups of resource indicators/beam metrics per reporting setting/in a single reporting instance for Option-1 based group-based (inter-cell) beam reporting.

For instance, the UE could receive from the network N separate MAC CE commands each corresponding to a reported group of resource indicators/beam metrics per reporting setting/in a single reporting instance for Option-1 based group-based (inter-cell) beam reporting. Each MAC CE command could activate at least one value from the list/set/pool of candidate values for M as the number (M) of resource indicators/beam metrics to be reported in the corresponding/associated group of resource indicators/beam metrics per reporting setting/in a single reporting instance for Option-1 based group-based beam reporting for the multi-TRP/inter-cell operation.

For the value of M, in yet another example, the UE could be first higher layer configured by the network (e.g., via the higher layer RRC signalling) a list/set/pool of candidate values for the number (M) of resource indicators/beam metrics to be reported in a given group of resource indicators/beam metrics per reporting setting/in a single reporting instance for Option-1 based group-based (inter-cell) beam reporting, denoted by M_set. In this example, the value of M is common for all reported N groups of resource indicators/beam metrics per reporting setting/in a single reporting instance. The UE could then receive from the network a bitmap with each entry/bit in the bitmap corresponding to a value/entry in the list/set/pool of candidate values for M. If an entry/bit in the bitmap is set to '1', the corresponding/associated value/entry in the list/set/pool of candidate values for M is activated as the number (M) of resource indicators/beam metrics to be reported in each group of resource indicators/beam metrics per reporting setting/in a single reporting instance for Option-1 based group-based beam reporting for the multi-TRP/inter-cell operation.

For the value of M, in yet another example, the UE could be first higher layer configured by the network (e.g., via the higher layer RRC signalling) a list/set/pool of candidate values for the number (M) of resource indicators/beam metrics to be reported in a given group of resource indicators/beam metrics per reporting setting/in a single reporting instance for Option-1 based group-based beam reporting for the multi-TRP/inter-cell operation, denoted by M_set. In this example, the value of M could be different across/among two or more reported N groups of resource indicators/beam metrics per reporting setting/in a single reporting instance. The UE could then receive from the network at least one bitmap for one or more groups of resource indicators/beam metrics to be reported per reporting setting/in a single reporting instance for Option-1 based group-based (inter-cell) beam reporting; each entry/bit in the bitmap corresponds to a value/entry in the list/set/pool of candidate values for M. If an entry/bit in a bitmap is set to '1', the corresponding/associated value/entry in the list/set/pool of candidate values for M is activated as the number (M) of resource indicators/beam metrics to be reported in the corresponding/associated group(s) of resource indicators/beam metrics per reporting setting/in a single reporting instance for Option-1 based group-based (inter-cell) beam reporting. For instance, the UE could receive from the network N separate bitmaps each corresponding to a reported group of resource indicators/beam metrics per reporting setting/in a single reporting instance. Each bitmap could activate at least one value from the list/set/pool of candidate values for M as the number (M) of resource indicators/beam metrics to be reported in the corresponding/associated group of resource indicators/beam metrics per reporting setting/in a single reporting instance for Option-1 based group-based beam reporting for the multi-TRP/inter-cell operation.

For Option-1 based group-based (inter-cell) beam reporting, the UE could be configured/indicated by the network to report to the network per reporting setting/in a single reporting instance up to N_max (N_max≥1) groups of resource indicators/beam metrics with each group of resource indicators/beam metrics including up to M_max (M_max>1) resource indicators/beam metrics; the indication of the value(s) of N_max/M_max could be via higher layer (RRC) or/and MAC CE or/and DCI based signaling or/and any combination of at least two of RRC, MAC CE and DCI based signaling; the indication of the value(s) of N_max/M_max could be via a separate (dedicated) parameter or joint with another parameter.

For the value of N_max, in one example, the UE could be indicated by the network, e.g., via higher layer RRC signaling and/or MAC CE command and/or DCI based signaling, the exact value of N_max, i.e., the maximum number of groups of resource indicators/beam metrics that can be reported in a single reporting instance for Option-1 based group-based (inter-cell) beam reporting. For instance, the candidate values for N_max could be {1, 2, 3, 4}, and the indication/configuration of the exact value of N_max could be based on UE's capability/preference signaling. The exact value of N_max could be indicated/configured in the corresponding CSI reporting setting, e.g., via the higher layer parameter CSI-ReportConfig, which is presented in TABLE 5.

As can be seen from TABLE 5, the higher layer parameter groupBasedBeamReportingMTRP-Opt1, could be configured/used to turn on/off the Option-1 based group-based beam reporting for the multi-TRP/inter-cell operation, and within/under groupBasedBeamReportingMTRP-Opt1, the higher layer parameter maxnrofReportedGroup-Opt1 indicates the maximum number (N_max) of groups of resource indicators/beam metrics that can be reported per reporting setting/in a single reporting instance for the group-based (inter-cell) beam reporting (Option-1 in this disclosure). When the field maxnrofReportedGroup-Opt1 is absent, the UE could apply the value 1 (i.e., N_max=1).

For the value of N_max, in another example, the UE could be first higher layer configured by the network (e.g., via the higher layer RRC signalling) a list/set/pool of candidate values for the maximum number (N_max) of resource indicators/beam metrics that can be reported per reporting setting/in a single reporting instance for Option-1 based group-based (inter-cell) beam reporting, denoted by N_max_set (e.g., N_max_set={1, 2, 3, 4}). The UE could then receive from the network a MAC CE command activating at least one value from the list/set/pool of candidate values for N_max as the maximum number (N_max) of groups of resource indicators/beam metrics that can be reported per reporting setting/in a single reporting instance for Option-1 based group-based beam reporting for the multi-TRP/inter-cell operation.

For the value of N_max, in yet another example, the UE could be first higher layer configured by the network (e.g., via the higher layer RRC signalling) a list/set/pool of candidate values for the maximum number (N_max) of groups of resource indicators/beam metrics that can be reported per reporting setting/in a single reporting instance for Option-1 based group-based (inter-cell) beam reporting, denoted by N_max_set (e.g., N_max_set={1, 2, 3, 4}). The UE could then receive from the network a bitmap with each entry/bit in the bitmap corresponding to a value/entry in the list/set/pool of candidate values for N_max. If an entry/bit in the bitmap is set to '1', the corresponding/associated value/entry in the list/set/pool of candidate values for N_max is activated as the maximum number (N_max) of groups of resource indicators/beam metrics that can be reported per reporting setting/in a single reporting instance for Option-1 based group-based beam reporting for the multi-TRP/inter-cell operation.

For the value of M_max, in one example, the UE could be indicated by the network, e.g., via higher layer RRC signaling and/or MAC CE command and/or DCI based signaling, the exact value of M_max, i.e., the maximum number of resource indicators/beam metrics that can be reported in a group of resource indicators/beam metrics in a single reporting instance for Option-1 based group-based (inter-cell) beam reporting. For instance, the candidate values for M_max could be {2, 3, 4}, and the indication/configuration of the exact value of M_max could be based on UE's capability/preference signaling. The exact value of M_max could be indicated/configured in the corresponding CSI reporting setting, e.g., via the higher layer parameter CSI-ReportConfig, which is presented in TABLE 6.

TABLE 5

An example of higher layer parameter CSI-ReportConfig indicating the maximum number of groups of resource indicators/beam metrics to be reported for the Option-1 based group-based (inter-cell) beam reporting

```
CSI-ReportConfig ::= SEQUENCE {
  reportConfigId CSI-ReportConfigId,
  carrier ServCellIndex OPTIONAL, -- Need S
  groupBasedBeamReportingMTRP-Opt1 CHOICE {
    ...
    maxnrofReportedGroup-Opt1 ENUMERATED {n1, n2, n3, n4} OPTIONAL -- Need S
    ...
  },
  resourcesForChannelMeasurement CSI-ResourceConfigId,
    csi-IM-ResourcesForInterference CSI-ResourceConfigId OPTIONAL, -- Need R
    nzp-CSI-RS-ResourcesForInterference CSI-ResourceConfigId OPTIONAL, -- Need R
  ...
}
```

As can be seen from TABLE 6, the higher layer parameter groupBasedBeamReportingMTRP-Opt1, could be configured/used to turn on/off the Option-1 based group-based beam reporting for the multi-TRP/inter-cell operation, and within/under groupBasedBeamReportingMTRP-Opt1, the higher layer parameter maxnrofReportedRSPerGroup-Opt1 indicates the maximum number (M_max) of resource indicators/beam metrics that can be reported in a group of resource indicators/beam metrics per reporting setting/in a single reporting instance for the group-based (inter-cell) beam reporting (Option-1 in this disclosure). When the field maxnrofReportedRSPerGroup-Opt1 is absent, the UE could apply the value 2 (i.e., M_max=2).

TABLE 6

An example of higher layer parameter CSI-ReportConfig indicating the maximum number of resource indicators/beam metrics to be reported per group for the Option-1 based group-based (inter-cell) beam reporting

```
CSI-ReportConfig ::= SEQUENCE {
  reportConfigId CSI-ReportConfigId,
  carrier ServCellIndex OPTIONAL, -- Need S
  groupBasedBeamReportingMTRP-Opt1 CHOICE {
    ...
    MaxnrofReportedRSPerGroup-Opt1 ENUMERATED {n2, n3, n4} OPTIONAL -- Need S
    ...
  },
  resourcesForChannelMeasurement CSI-ResourceConfigId,
    csi-IM-ResourcesForInterference CSI-ResourceConfigId OPTIONAL, -- Need R
    nzp-CSI-RS-ResourcesForInterference CSI-ResourceConfigId OPTIONAL, -- Need R
  ...
}
```

For the value of M_max, in another example, the UE could be first higher layer configured by the network (e.g., via the higher layer RRC signalling) a list/set/pool of candidate values for the maximum number (M_max) of resource indicators/beam metrics that can be reported in a group of resource indicators/beam metrics per reporting setting/in a single reporting instance for Option-1 based group-based (inter-cell) beam reporting, denoted by M_max_set (e.g., M_max_set={2, 3, 4}). The UE could then receive from the network a MAC CE command activating at least one value from the list/set/pool of candidate values for M_max as the maximum number (M_max) of resource indicators/beam metrics that can be reported in a group of resource indicators/beam metrics per reporting setting/in a single reporting instance for Option-1 based group-based beam reporting for the multi-TRP/inter-cell operation.

For the value of M_max, in yet another example, the UE could be first higher layer configured by the network (e.g., via the higher layer RRC signalling) a list/set/pool of candidate values for the maximum number (M_max) of resource indicators/beam metrics that can be reported in a group of resource indicators/beam metrics per reporting setting/in a single reporting instance for Option-1 based group-based (inter-cell) beam reporting, denoted by M_max_set. The UE could then receive from the network a bitmap with each entry/bit in the bitmap corresponding to a value/entry in the list/set/pool of candidate values for M_max. If an entry/bit in the bitmap is set to '1', the corresponding/associated value/entry in the list/set/pool of candidate values for M_max is activated as the maximum number (M_max) of resource indicators/beam metrics that can be reported in a group of resource indicators/beam metrics per reporting setting/in a single reporting instance for Option-1 based group-based beam reporting for the multi-TRP/inter-cell operation.

Figure 9:
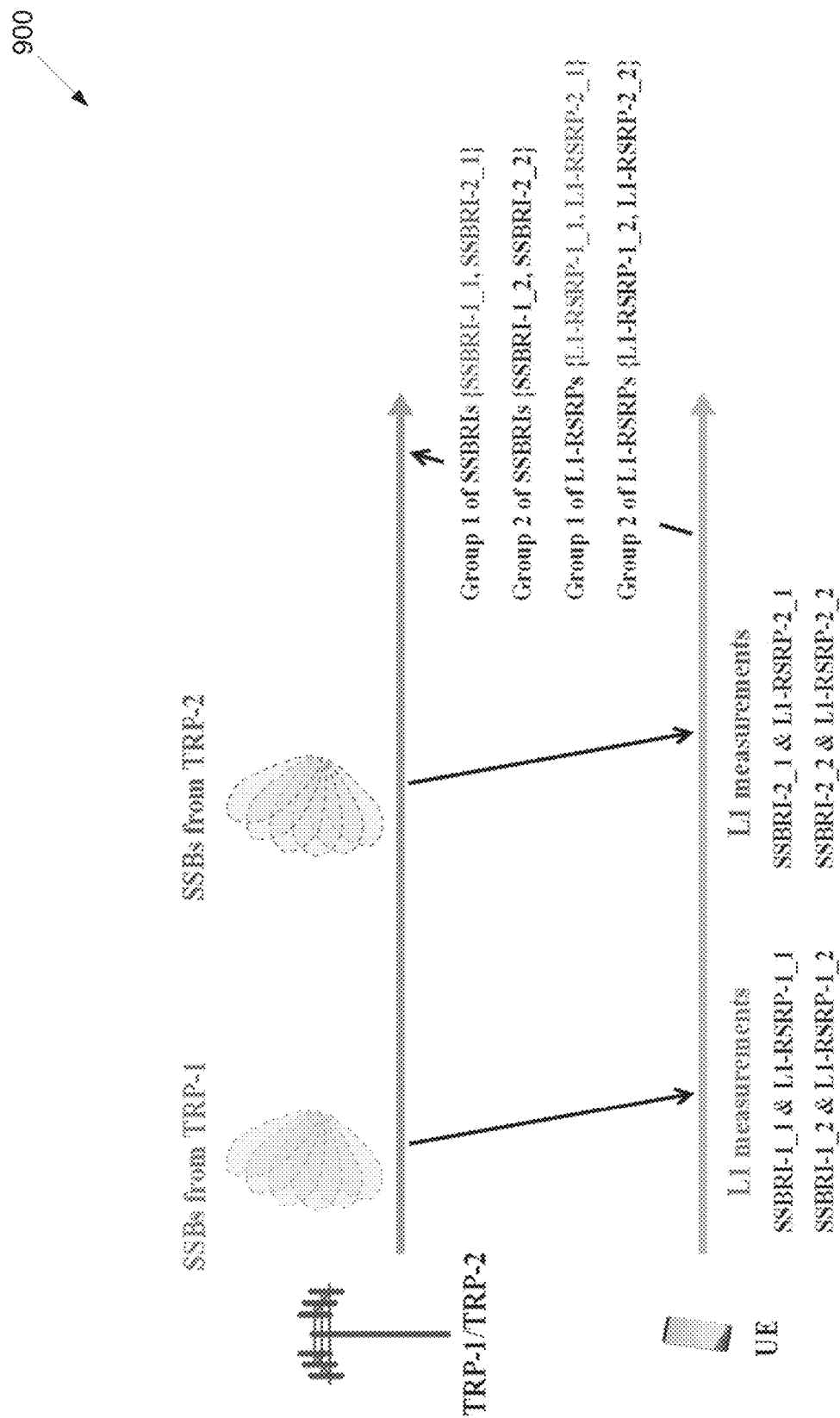
FIG. 9 illustrates an example of beam measurement and group-based beam reporting for multi-TRP system according to embodiments of the present disclosure.

FIG. 9 illustrates an example of beam measurement and group-based beam reporting for multi-TRP system 900 according to embodiments of the present disclosure. An embodiment of the beam measurement and group-based beam reporting for the multi-TRP system 900 shown in FIG. 9 is for illustration only.

In FIG. 9, an Option-1 based group-based (inter-cell) beam reporting design for a wireless communications system comprising of two TRPs, TRP-1 and TRP-2 in FIG. 8, is illustrated, wherein the two TRPs TRP-1 and TRP-2 could be associated with the same PCI/PCI index (e.g., either the serving cell PCI/PCI index or a PCI/PCI index different from the serving cell PCI/PCI index) or different PCIs/PCI indexes including at least a PCI/PCI index different from the serving cell PCI/PCI index. In this example, the UE reports in a single reporting instance two groups (N=2) of SSBRIs with each group comprising of two (M=2) SSBRIs each for a different TRP.

As can be seen from FIG. 9, the UE reports SSBRI-1_1 for TRP-1 and SSBRI-2_1 for TRP-2 in Group 1 of SSBRIs, and SSBRI-1_2 for TRP-1 and SSBRI-2_2 for TRP-2 in Group 2 of SSBRIs. According to the design principle of the Option-1 based group-based (inter-cell) beam reporting, this also implies that the UE could simultaneously receive the SSB beams corresponding to SSBRI-1_1 and SSBRI-2_1, or the SSB beams corresponding to SSBRI-1_2 and SSBRI-2_2, using either a single spatial domain receive filter or more than one spatial domain receive filters. The UE also reports L1-RSRP-1_1 (corresponding to SSBRI-1_1) and L1-RSRP-2_1 (corresponding to SSBRI-2_1) in Group 1 of L1-RSRPs, and L1-RSRP-1_2 (corresponding to SSBRI-1_2) and L1-RSRP-2_2 (corresponding to SSBRI-2_2) in Group 2 of L1-RSRPs.

TABLE 7

Combinations of different types of resource indicators reported in a group

| RSs from TRP-1 | RSs from TRP-2 | Resource indicator for TRP-1 | Resource indicator for TRP-2 | Group of resource indicators to be reported |
|---|---|---|---|---|
| SSBs | SSBs | SSBRI_0 | SSBRI_1 | {SSBRI_0, SSBRI_1} or {SSBRI_1, SSBRI_0} |

TABLE 7-continued

Combinations of different types of resource indicators reported in a group

| RSs from TRP-1 | RSs from TRP-2 | Resource indicator for TRP-1 | Resource indicator for TRP-2 | Group of resource indicators to be reported |
|---|---|---|---|---|
| SSBs | CSI-RSs | SSBRI_0 | CRI_1 | {SSBRI_0, CRI_1} or {CRI_1, SSBRI_0} |
| CSI-RSs | CSI-RSs | CRI_0 | CRI_1 | {CRI_0, CRI_1} or {CRI_1, CRI_0} |
| CSI-RSs | SSBs | CRI_0 | SSBRI_1 | {CRI_0, SSBRI_1} or {SSBRI_1, CRI_0} |

For Option-1 based group-based (inter-cell) beam reporting, the resource indicators within the same group of resource indicators could be of the same type, such as M SSBRIs (as shown in FIG. 9) or M CRIs. The resource indicators within the same group of resource indicators could be of different types or a mixture of different types such as SSBRIs and CRIs. For instance, for a wireless system comprising of two TRPs (TRP-1 and TRP-2 in FIG. 8) wherein the two TRPs TRP-1 and TRP-2 could be associated with the same PCI/PCI index (e.g., either the serving cell PCI/PCI index or a PCI/PCI index different from the serving cell PCI/PCI index) or different PCIs/PCI indexes including at least a PCI/PCI index different from the serving cell PCI/PCI index, the UE could report in the same group of resource indicators a SSBRI for TRP-1 and a CRI for TRP-2.

In TABLE 7, a table summarizes several combinations of different types of resource indicators reported in a single group is presented. Similarly, the beam metrics reported within the same group of beam metrics could be of the same type, such as M L1-RSRPs (as shown in FIG. 9) or M L1-SINRs. The beam metrics within the same group of beam metrics could be of different types or a mixture of different types such as L1-RSRPs and L1-SINRs. For instance, for a wireless system comprising of two TRPs (TRP-1 and TRP-2 in FIG. 8) wherein the two TRPs TRP-1 and TRP-2 could be associated with the same PCI/PCI index (e.g., either the serving cell PCI/PCI index or a PCI/PCI index different from the serving cell PCI/PCI index) or different PCIs/PCI indexes including at least a PCI/PCI index different from the serving cell PCI/PCI index, the UE could report in the same group of beam metrics a L1-RSRP for TRP-1 and a L1-SINR for TRP-2.

The UE could be indicated/configured by the network the type(s) of the resource indicators in each group of resource indicators to be reported in a single reporting instance. For instance, for a given group of resource indicators to be reported in a single reporting instance, the UE could be indicated/configured by the network to report a SSBRI for TRP-1 as the first resource indicator in the group and a CRI for TRP-2 as the second resource indicator in the group. For a given group of resource indicators to be reported in a single reporting instance, In one example, the UE could be explicitly indicated/configured by the network, e.g., via the field reportQuantity in the higher layer parameter CSI-ReportConfig, the type(s) of the resource indicators to be reported in the given group of resource indicators. For instance, for M=2, the UE could be indicated/configured by the network, e.g., via reportQuantity in CSI-ReportConfig, to report {SSBRI, SSBRI} or {SSBRI, CRI} or {CRI, SSBRI} or {CRI, CRI} for the given group of resource indicators to be reported.

In another example, the UE could be first configured/indicated by the network one or more combinations of the type(s) of the resource indicators to be reported in the given group of resource indicators.

For example, the UE could be explicitly configured/indicated by the network the combination(s) of the type(s) of the resource indicators that can be reported in the given group of resource indicators.

For another example, the UE could be first higher layer configured by the network (e.g., via higher layer RRC signaling) a list/set/pool of all combinations of the type(s) of the resource indicators that can be reported in a group of resource indicators. The UE could then receive from the network a MAC CE command activating one or more combinations of the type(s) of the resource indicators from the higher layer configured list/set/pool of all combinations of the type(s) of the resource indicators that can be reported in the given group of resource indicators.

For yet another example, the UE could be first higher layer configured by the network (e.g., via higher layer RRC signaling) a list/set/pool of all combinations of the type(s) of the resource indicators that can be reported in a group of resource indicators. The UE could then receive from the network a bitmap with each entry/bit in the bitmap corresponding to a combination of the type(s) of the resource indicators from the higher layer configured list/set/pool of all combinations of the type(s) of the resource indicators that can be reported in the given group of resource indicators. If an entry/bit in the bitmap is set to "1", the corresponding/associated combination of the type(s) of the resource indicators from the list/set/pool of all combinations of the type(s) of the resource indicators that can be reported in the given group of resource indicators is activated. The bitmap could include at least one "1".

The UE could then receive from the network at least one indicator to indicate at least one combination of the type(s) of the resource indicators to be reported in the given group of resource indicators from the configured/indicated combination(s) of the type(s) of the resource indicators that can be reported in a group of resource indicators. For instance, for M=2, if the configured/indicated combinations of the type(s) of the resource indicators that can be reported in a group of resource indicators are {SSBRI, SSBRI} and {SSBRI, CRI} and {CRI, SSBRI} and {CRI, CRI}, each combination of the type(s) of the resource indicators could correspond to a state of a 2-bit indicator, which are "00"—{SSBRI, SSBRI}, "01"—{SSBRI, CRI}, "10"—{CRI, SSBRI} and "11"—{CRI, CRI}. The 2-bit indicator could indicate to the UE a state, e.g., "00"—{SSBRI, SSBRI}, out of the four states as the type(s) of the resource indicators to be reported in the given group of resource indicators.

Alternatively, the UE could receive from the network a MAC CE command activating at least one combination of the type(s) of the resource indicators to be reported in the given group of resource indicators from the configured/indicated combination(s) of the type(s) of the resource indicators that can be reported in a group of resource indicators. The UE could also receive from the network a bitmap with each entry/bit in the bitmap corresponding to a configured/indicated combination of the type(s) of the resource indicators that can be reported in a group of resource indicators; if an entry/bit in the bitmap is set to "1", the corresponding/associated combination of the type(s) of the resource indicators from the configured/indicated combination(s) of the type(s) of the resource indicators that can be reported in a group of resource indicators is activated; the bitmap could contain at least one "1".

The UE could be indicated/configured by the network the type(s) of the beam metrics in each group of beam metrics to be reported in a single reporting instance. For instance, for a given group of beam metrics to be reported in a single reporting instance, the UE could be indicated/configured by the network to report a L1-RSRP for TRP-1 as the first beam metric in the group and a L1-SINR for TRP-2 as the second beam metric in the group.

For a given group of beam metrics to be reported in a single reporting instance, in one example, the UE could be explicitly indicated/configured by the network, e.g., via the field reportQuantity in the higher layer parameter CSI-ReportConfig, the type(s) of the beam metrics to be reported in the given group of beam metrics. For instance, for M=2, the UE could be indicated/configured by the network, e.g., via reportQuantity in CSI-ReportConfig, to report {L1-RSRP, L1-RSRP} or {L1-RSRP, L1-SINR} or {L1-SINR, L1-RSRP} or {L1-SINR, L1-SINR} for the given group of beam metrics to be reported.

For a given group of beam metrics to be reported in a single reporting instance, in another example, the UE could be first configured/indicated by the network one or more combinations of the type(s) of the beam metrics to be reported in the given group of beam metrics.

In such example, the UE could be explicitly configured/indicated by the network the combination(s) of the type(s) of the beam metrics that can be reported in the given group of beam metrics.

In such example, the UE could be first higher layer configured by the network (e.g., via higher layer RRC signaling) a list/set/pool of all combinations of the type(s) of the beam metrics that can be reported in a group of beam metrics. The UE could then receive from the network a MAC CE command activating one or more combinations of the type(s) of the beam metrics from the higher layer configured list/set/pool of all combinations of the type(s) of the beam metrics that can be reported in the given group of beam metrics.

In such example, the UE could be first higher layer configured by the network (e.g., via higher layer RRC signaling) a list/set/pool of all combinations of the type(s) of the beam metrics that can be reported in a group of beam metrics. The UE could then receive from the network a bitmap with each entry/bit in the bitmap corresponding to a combination of the type(s) of the beam metrics from the higher layer configured list/set/pool of all combinations of the type(s) of the beam metrics that can be reported in the given group of beam metrics. If an entry/bit in the bitmap is set to "1", the corresponding/associated combination of the type(s) of the beam metrics from the list/set/pool of all combinations of the type(s) of the beam metrics that can be reported in the given group of beam metrics is activated. The bitmap could include at least one "1".

The UE could then receive from the network at least one indicator to indicate at least one combination of the type(s) of the beam metrics to be reported in the given group of beam metrics from the configured/indicated combination(s) of the type(s) of the beam metrics that can be reported in a group of beam metrics. For instance, for M=2, if the configured/indicated combinations of the type(s) of the beam metrics that can be reported in a group of beam metrics are {L1-RSRP, L1-RSRP} and {L1-RSRP, L1-SINR} and {L1-SINR, L1-RSRP} and {L1-SINR, L1-SINR}, each combination of the type(s) of the beam metrics could correspond to a state of a 2-bit indicator, which are "00"—{L1-RSRP, L1-RSRP}, "01"—{L1-RSRP, L1-SINR}, "10"—{L1-SINR, L1-RSRP} and "11"—{L1-SINR, L1-SINR}. The 2-bit indicator could indicate to the UE a state, e.g., "00"—{L1-RSRP, L1-RSRP}, out of the four states as the type(s) of the beam metrics to be reported in the given group of beam metrics.

Alternatively, the UE could receive from the network a MAC CE command activating at least one combination of the type(s) of the beam metrics to be reported in the given group of beam metrics from the configured/indicated combination(s) of the type(s) of the beam metrics that can be reported in a group of beam metrics. The UE could also receive from the network a bitmap with each entry/bit in the bitmap corresponding to a configured/indicated combination of the type(s) of the beam metrics that can be reported in a group of beam metrics; if an entry/bit in the bitmap is set to "1", the corresponding/associated combination of the type(s) of the beam metrics from the configured/indicated combination(s) of the type(s) of the beam metrics that can be reported in a group of beam metrics is activated; the bitmap could contain at least one "1".

The UE could be indicated/configured by the network the type(s) of both the resource indicators and the beam metrics in each group of resource indicators/beam metrics to be reported in a single reporting instance. For instance, for a given group of resource indicators/beam metrics to be reported in a single reporting instance, the UE could be indicated/configured by the network to report a SSBRI and a L1-RSRP for TRP-1 as the first resource indicator in the group of resource indicators and as the first beam metric in the group of beam metrics, and a CRI and a L1-SINR for TRP-2 as the second resource indicator in the group of resource indicators and as the second beam metric in the group of beam metrics.

For a given group of resource indicators/beam metrics to be reported in a single reporting instance, in one example, the UE could be explicitly indicated/configured by the network, e.g., via the field reportQuantity in the higher layer parameter CSI-ReportConfig, the type(s) of both the resource indicators and the beam metrics to be reported in the given group of resource indicators/beam metrics. For instance, for M=2, the UE could be indicated/configured by the network, e.g., via reportQuantity in CSI-ReportConfig, to report {SSBRI and L1-RSRP, SSBRI and L1-RSRP} or {SSBRI and L1-RSRP, SSBRI and L1-SINR} or {SSBRI and L1-RSRP, CRI and L1-RSRP} or {SSBRI and L1-RSRP, CRI and L1-SINR} or {SSBRI and L1-SINR, SSBRI and L1-SINR} or {SSBRI and L1-SINR, SSBRI and L1-RSRP} or {SSBRI and L1-SINR, CRI and L1-RSRP} or {SSBRI and L1-SINR, CRI and L1-SINR} or {CRI and L1-RSRP, SSBRI and L1-SINR} or {CRI and L1-RSRP, SSBRI and L1-RSRP} or {CRI and L1-RSRP, CRI and L1-RSRP} or {CRI and L1-RSRP, CRI and L1-SINR} or {CRI and L1-SINR, SSBRI and L1-SINR} or {CRI and L1-SINR, SSBRI and L1-RSRP} or {CRI and L1-SINR, CRI and L1-RSRP} or {CRI and L1-SINR, CRI and L1-SINR} for the given group of resource indicators/beam metrics to be reported.

For a given group of resource indicators/beam metrics to be reported in a single reporting instance, in another example, the UE could be first configured/indicated by the network one or more combinations of the type(s) of both the resource indicators and the beam metrics to be reported in the given group of resource indicators/beam metrics.

In such example, the UE could be explicitly configured/indicated by the network the combination(s) of the type(s) of both the resource indicators and the beam metrics that can be reported in the given group of resource indicators/beam metrics.

In such example, the UE could be first higher layer configured by the network (e.g., via higher layer RRC signaling) a list/set/pool of all combinations of the type(s) of both the resource indicators and the beam metrics that can be reported in a group of resource indicators/beam metrics. The UE could then receive from the network a MAC CE command activating one or more combinations of the type(s) of both the resource indicators and the beam metrics from the higher layer configured list/set/pool of all combinations of the type(s) of both the resource indicators and the beam metrics that can be reported in the given group of resource indicators/beam metrics.

In such example, the UE could be first higher layer configured by the network (e.g., via higher layer RRC signaling) a list/set/pool of all combinations of the type(s) of both the resource indicators and the beam metrics that can be reported in a group of resource indicators/beam metrics. The UE could then receive from the network a bitmap with each entry/bit in the bitmap corresponding to a combination of the type(s) of both the resource indicators and the beam metrics from the higher layer configured list/set/pool of all combinations of the type(s) of both the resource indicators and the beam metrics that can be reported in the given group of resource indicators/beam metrics. If an entry/bit in the bitmap is set to "1", the corresponding/associated combination of the type(s) of both the resource indicators and the beam metrics from the list/set/pool of all combinations of the type(s) of both the resource indicators and the beam metrics that can be reported in the given group of resource indicators/beam metrics is activated. The bitmap could include at least one "1".

The UE could then receive from the network at least one indicator to indicate at least one combination of the type(s) of both the resource indicators and the beam metrics to be reported in the given group of resource indicators/beam metrics from the configured/indicated combination(s) of the type(s) of both the resource indicators and the beam metrics that can be reported in a group of resource indicators/beam metrics.

For instance, for M=2, if the configured/indicated combinations of the type(s) of both the resource indicators and the beam metrics that can be reported in a group of resource indicators/beam metrics are {SSBRI and L1-RSRP, SSBRI and L1-RSRP} and {SSBRI and L1-RSRP, SSBRI and L1-SINR} and {SSBRI and L1-RSRP, CRI and L1-RSRP} and {SSBRI and L1-RSRP, CRI and L1-SINR} and {SSBRI and L1-SINR, SSBRI and L1-SINR} and {SSBRI and L1-SINR, SSBRI and L1-RSRP} and {SSBRI and L1-SINR, CRI and L1-RSRP} and {SSBRI and L1-SINR, CRI and L1-SINR} and {CRI and L1-RSRP, SSBRI and L1-SINR} and {CRI and L1-RSRP, SSBRI and L1-RSRP} and {CRI and L1-RSRP, CRI and L1-RSRP} and {CRI and L1-RSRP, CRI and L1-SINR} and {CRI and L1-SINR, SSBRI and L1-SINR} and {CRI and L1-SINR, SSBRI and L1-RSRP} and {CRI and L1-SINR, CRI and L1-RSRP} and {CRI and L1-SINR, CRI and L1-SINR}, each combination of the type(s) of both the resource indicators and the beam metrics could correspond to a state of a 4-bit indicator, which are "0000"—{SSBRI and L1-RSRP, SSBRI and L1-RSRP} and "0001"—{SSBRI and L1-RSRP, SSBRI and L1-SINR} and "0010"—{SSBRI and L1-RSRP, CRI and L1-RSRP} and "0011"—{SSBRI and L1-RSRP, CRI and L1-SINR} and "0100"—{SSBRI and L1-SINR, SSBRI and L1-SINR} and "0101"—{SSBRI and L1-SINR, SSBRI and L1-RSRP} and "0110"—{SSBRI and L1-SINR, CRI and L1-RSRP} and "0111"—{SSBRI and L1-SINR, CRI and L1-SINR} and "1000"—{CRI and L1-RSRP, SSBRI and L1-SINR} and "1001"—{CRI and L1-RSRP, SSBRI and L1-RSRP} and "1010"—{CRI and L1-RSRP, CRI and L1-RSRP} and "1011"—{CRI and L1-RSRP, CRI and L1-SINR} and "1100"—{CRI and L1-SINR, SSBRI and L1-SINR} and "1101"—{CRI and L1-SINR, SSBRI and L1-RSRP} and "1110"—{CRI and L1-SINR, CRI and L1-RSRP} and "1111"—{CRI and L1-SINR, CRI and L1-SINR}. The 4-bit indicator could indicate to the UE a state, e.g., "0000"—{SSBRI and L1-RSRP, SSBRI and L1-RSRP}, out of the 16 states as the type(s) of both the resource indicators and the beam metrics to be reported in the given group of resource indicators/beam metrics.

Alternatively, the UE could receive from the network a MAC CE command activating at least one combination of the type(s) of both the resource indicators and the beam metrics to be reported in the given group of resource indicators/beam metrics from the configured/indicated combination(s) of the type(s) of the resource indicators/beam metrics that can be reported in a group of resource indicators/beam metrics. The UE could also receive from the network a bitmap with each entry/bit in the bitmap corresponding to a configured/indicated combination of the type(s) of both the resource indicators and the beam metrics that can be reported in a group of resource indicators/beam metrics; if an entry/bit in the bitmap is set to "1", the corresponding/associated combination of the type(s) of both the resource indicators and the beam metrics from the configured/indicated combination(s) of the type(s) of both the resource indicators and the beam metrics that can be reported in a group of resource indicators/beam metrics is activated; the bitmap could contain at least one "1".

The Option-1 based group-based (inter-cell) beam report could include two parts. Part 1 of the beam report could have a fixed payload size (in terms of the number of bits) and could be used to identify/indicate the size of the payload in Part 2 of the beam report. Part 1 of the beam report shall be transmitted in its entirety before the transmission of Part 2 of the beam report. In one example, Part 2 of the beam report can be absent. When absent, the group-based beam report is via Part 1 only (i.e. one part UCI), and when present, the group-based beam report is via both Part 1 and Part 2 (i.e. two-part UCI). In one example, Part 2 of the beam report is always present, but it's payload could vary depending on the information in Part 1.

The resource indicators in Part 1 or Part 2 of the beam report could be associated with the same PCI/PCI index (e.g., either the serving cell PCI/PCI index or a PCI different from the serving cell PCI/PCI index) according to those specified in the example-I, example-II or example-III in the present disclosure. For the inter-cell operation, the resource indicators in Part 1 or Part 2 of the beam report could be associated with different PCIs/PCI indexes including the serving cell PCI/PCI index and at least one PCI/PCI index different from the serving cell PCI/PCI index according to those specified in the example-D, example-E, example-F or example-G in the present disclosure. In the following, various design schemes of the Option-1 based two-part group-based beam report for the multi-TRP/inter-cell operation are illustrated.

Scheme-1.1, Part 1 of the beam report includes at least one of the following: one group of resource indicators (such as SSBRIs and/or CRIs) denoted by Group 0 of resource indicators, one group of beam metrics (such as L1-RSRPs and/or L1-SINRs), denoted by Group 0 of beam metrics, corresponding to Group 0 of resource indicators, and an indicator (denoted by indicator-x) to indicate the number of groups of resource indicators/beam metrics in Part 2 of the beam report.

For instance, indicator-x could correspond to the exact value of (N−1) and/or N, which can be dynamically changed/configured/selected by the UE. As discussed above, the UE could autonomously determine/select the exact value of the number (N) of groups of resource indicators/beam metrics to be reported in a single reporting instance, e.g., from a set of possible values for N configured/indicated by the network. Part 2 of the beam report could include at least one of the following: (N−1) groups of resource indicators, and (N−1) groups of beam metrics corresponding to the (N−1) groups of resource indicators.

For instance, if indicator-x=3 (N=4), 3 groups of resource indicators and 3 groups of beam metrics corresponding to the 3 groups of resource indicators are included in Part 2 of the beam report. If indicator-x=2 (N=3), 2 groups of resource indicators and 2 groups of beam metrics corresponding to the 2 groups of resource indicators are included in Part 2 of the beam report. If indicator-x=0 (N=1), Part 2 of the beam report would be absent, i.e., no resource indicators/beam metrics are reported in Part 2 of the beam report.

Figure 10A:
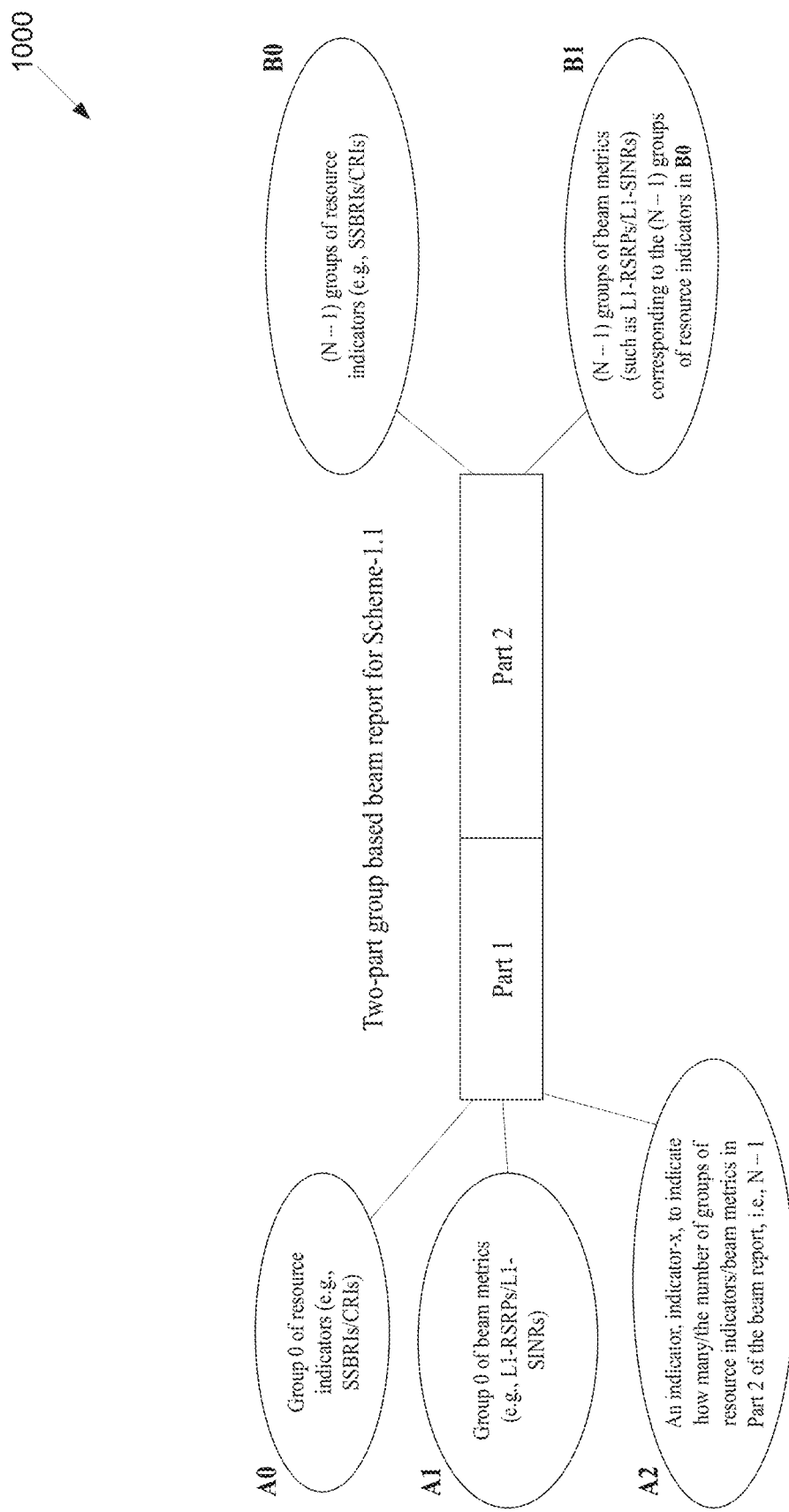
FIG. 10A illustrates an example of two-part group-based beam reporting according to embodiments of the present disclosure.

FIG. 10A illustrates an example of two-part group-based beam reporting 1000 according to embodiments of the present disclosure. An embodiment of the two-part group-based beam reporting 1000 shown in FIG. 10A is for illustration only.

In FIG. 10A, the two-part group-based beam reporting strategy for Scheme-1.1 is illustrated. As can be seen from FIG. 10A, if indicator-x=0, A2 in Part 1 of the beam report would be absent, and Part 2 of the beam report would be absent. The absence of Part 2 of the beam report is characterized in FIG. 10B.

Figure 10B:
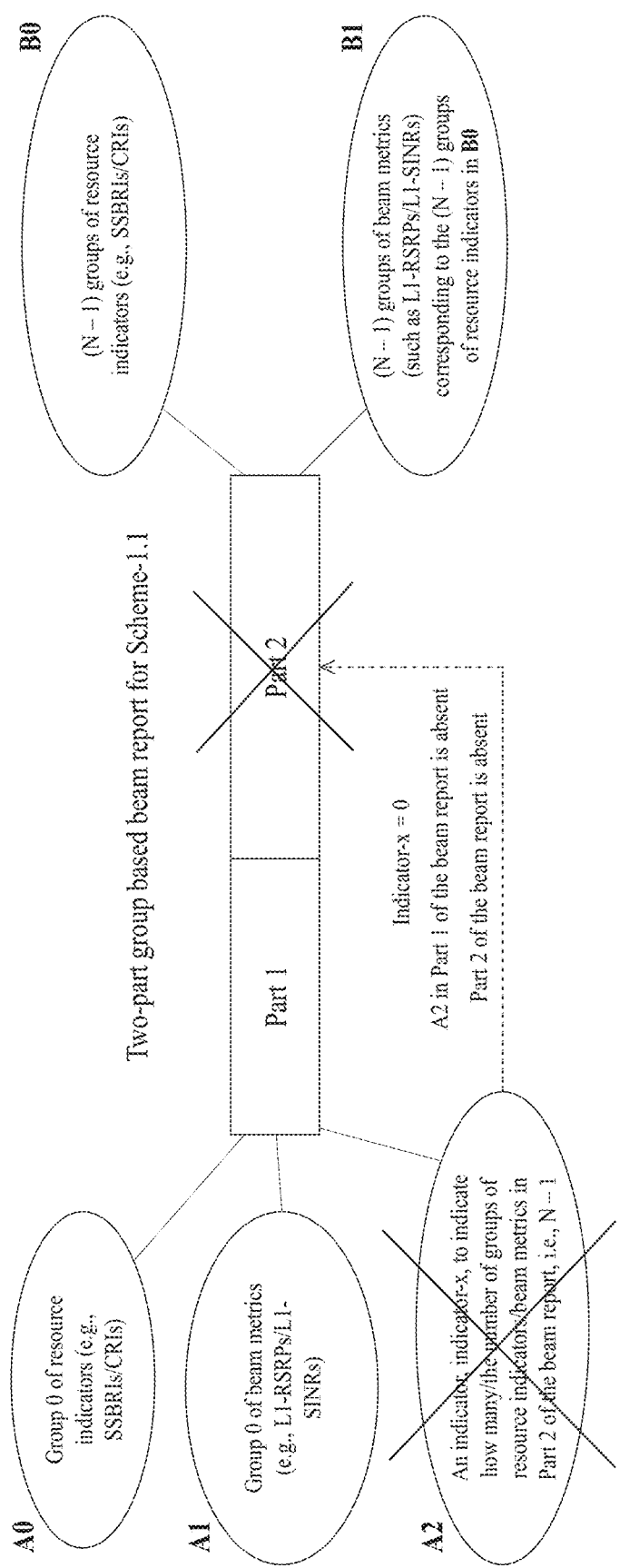
FIG. 10B illustrates another example of two-part group-based beam reporting according to embodiments of the present disclosure.

FIG. 10B illustrates another example of two-part group-based beam reporting 1050 according to embodiments of the present disclosure. An embodiment of the two-part group-based beam reporting 1050 shown in FIG. 10B is for illustration only.

Scheme-1.2: the key components of the two-part group-based beam reporting strategy in Scheme-1.2 are similar to those in Scheme-1.1 except that in Scheme-1.2, an indicator (denoted by indicator-y) to indicate the total number of groups of resource indicators/beam metrics in both Part 1 and Part 2 of the beam report, i.e., N, is incorporated in Part 1 of the beam report. One example of the two-part group-based beam report for Scheme-1.2 is presented in FIG. 11. It is evident from FIG. 11 that if indicator-y=1 (implying that N=1), A2 in Part 1 of the beam report would be absent, and Part 2 of the beam report would be absent.

Figure 11:
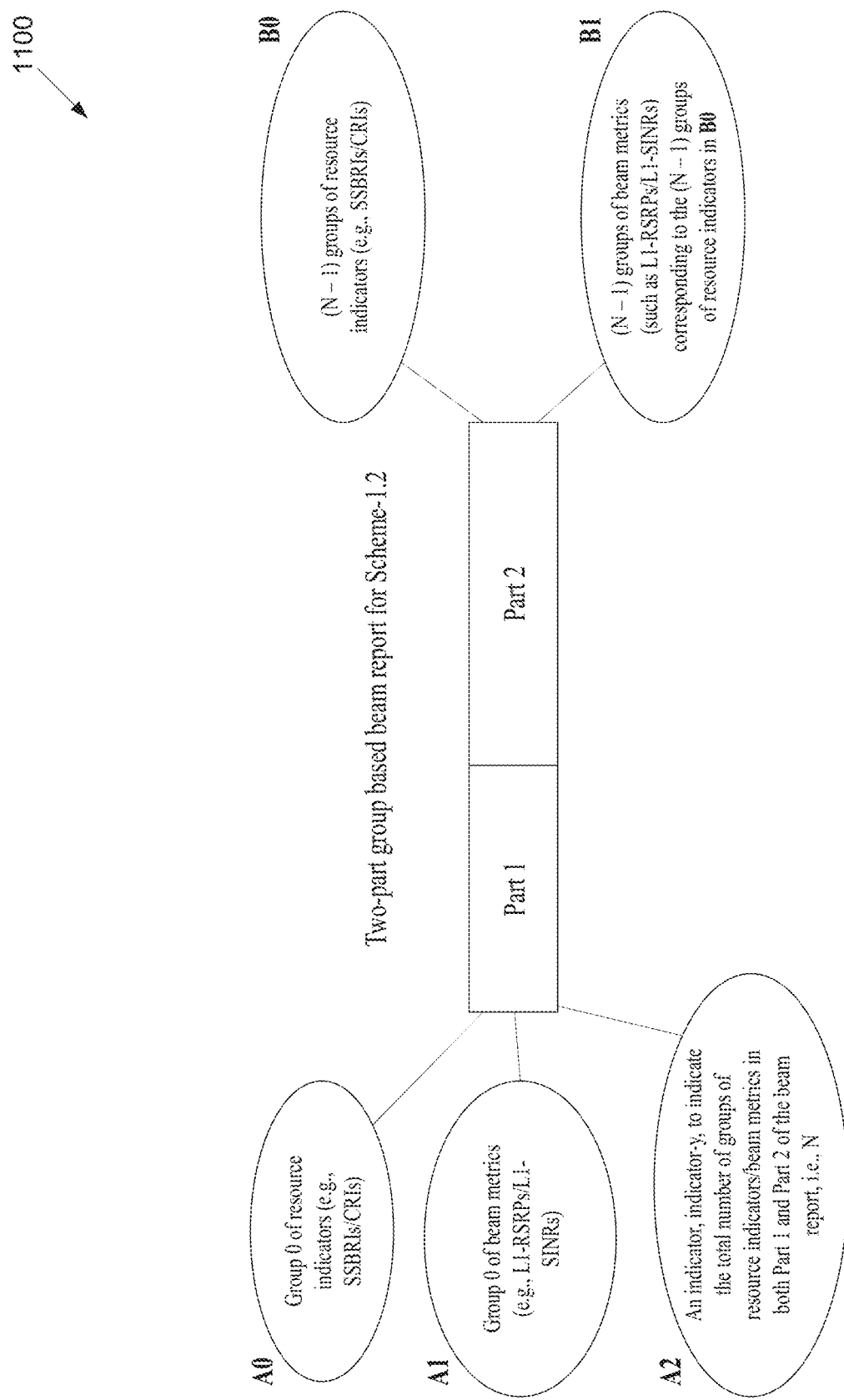
FIG. 11 illustrates yet another example of two-part group-based beam reporting according to embodiments of the present disclosure.

FIG. 11 illustrates yet another example of two-part group-based beam reporting 1100 according to embodiments of the present disclosure. An embodiment of the two-part group-based beam reporting 1100 shown in FIG. 11 is for illustration only.

Scheme-1.3: Part 1 of the beam report includes at least one of the following: one group of resource indicators (such as SSBRIs and/or CRIs) denoted by Group 0 of resource indicators, one group of beam metrics (such as L1-RSRPs and/or L1-SINRs), denoted by Group 0 of beam metrics, corresponding to Group 0 of resource indicators, an indicator (denoted by indicator-x-ri) to indicate the number of groups of resource indicators in Part 2 of the beam report (denoted by N_ri, 1≤N_ri≤N−1), and another indicator (denoted by indicator-x-bm) to indicate the number of groups of beam metrics in Part 2 of the beam report (denoted by N_bm, 1≤N_bm≤N−1). Here, N_ri and N_bm could be different. If N_ri and N_bm are the same and equal to N, Scheme-1.3 is equivalent to Scheme-1.1. In this example, the UE could be indicated by the network the value N. Part 2 of the beam report includes at least one of the following: N_ri groups of resource indicators and N_bm groups of beam metrics corresponding to the N_ri groups of resource indicators.

Figure 12:
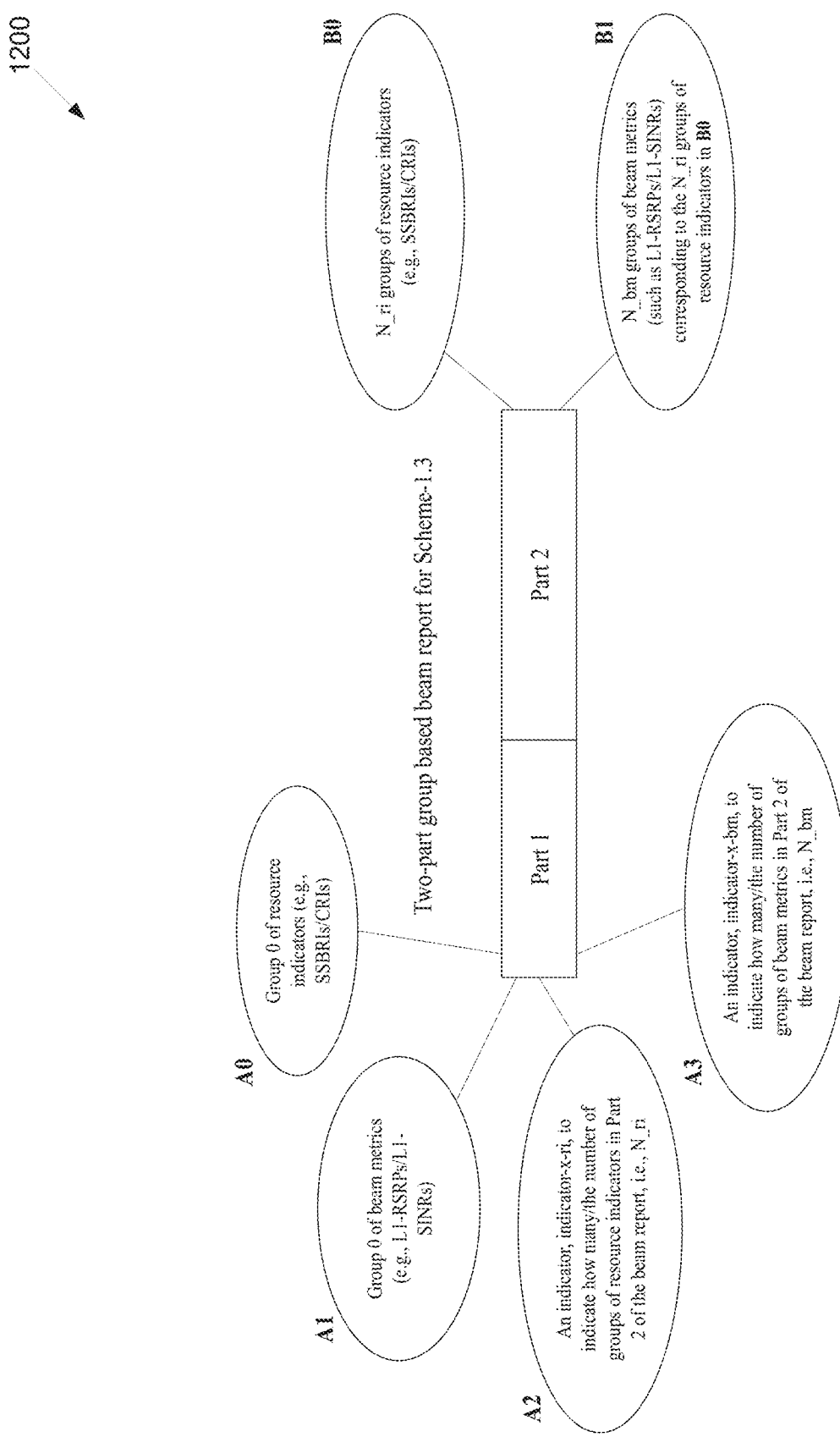
FIG. 12 illustrates yet another example of two-part group-based beam reporting according to embodiments of the present disclosure.

FIG. 12 illustrates yet another example of two-part group-based beam reporting 1200 according to embodiments of the present disclosure. An embodiment of the two-part group-based beam reporting 1200 shown in FIG. 12 is for illustration only.

In FIG. 12, a conceptual example characterizing the two-part group-based beam reporting strategy for Scheme-1.3 is depicted. As can be seen from FIG. 12, if N_ri=0 and N_bm=0, A2 and A3 would be absent in Part 1 of the beam report, and Part 2 of the beam report would be absent.

Scheme-1.4: Part 1 of the beam report includes at least one of the following: one group of resource indicators (such as SSBRIs and/or CRIs) denoted by Group 0 of resource indicators, one group of beam metrics (such as L1-RSRPs and/or L1-SINRs), denoted by Group 0 of beam metrics, corresponding to Group 0 of resource indicators, an indicator (denoted by indicator-y-ri) to indicate the total number of groups of resource indicators in both Part 1 and Part 2 of the beam report (denoted by N_ri_tot, 1≤N_ri_tot≤N), and another indicator (denoted by indicator-y-bm) to indicate the total number of groups of beam metrics in both Part 1 and Part 2 of the beam report (denoted by N_bm_tot, 1≤N_bm_tot≤N). Here, N_ri_tot and N_bm_tot could be different. If N_ri_tot and N_bm_tot are the same and equal to N, Scheme-1.4 is equivalent to Scheme-1.2.

In this example, the UE could be indicated by the network the value of N. Part 2 of the beam report includes at least one of the following: (N_ri_tot−1) groups of resource indicators and (N_bm_tot−1) groups of beam metrics corresponding to the (N_ri_tot−1) groups of resource indicators.

Figure 13:
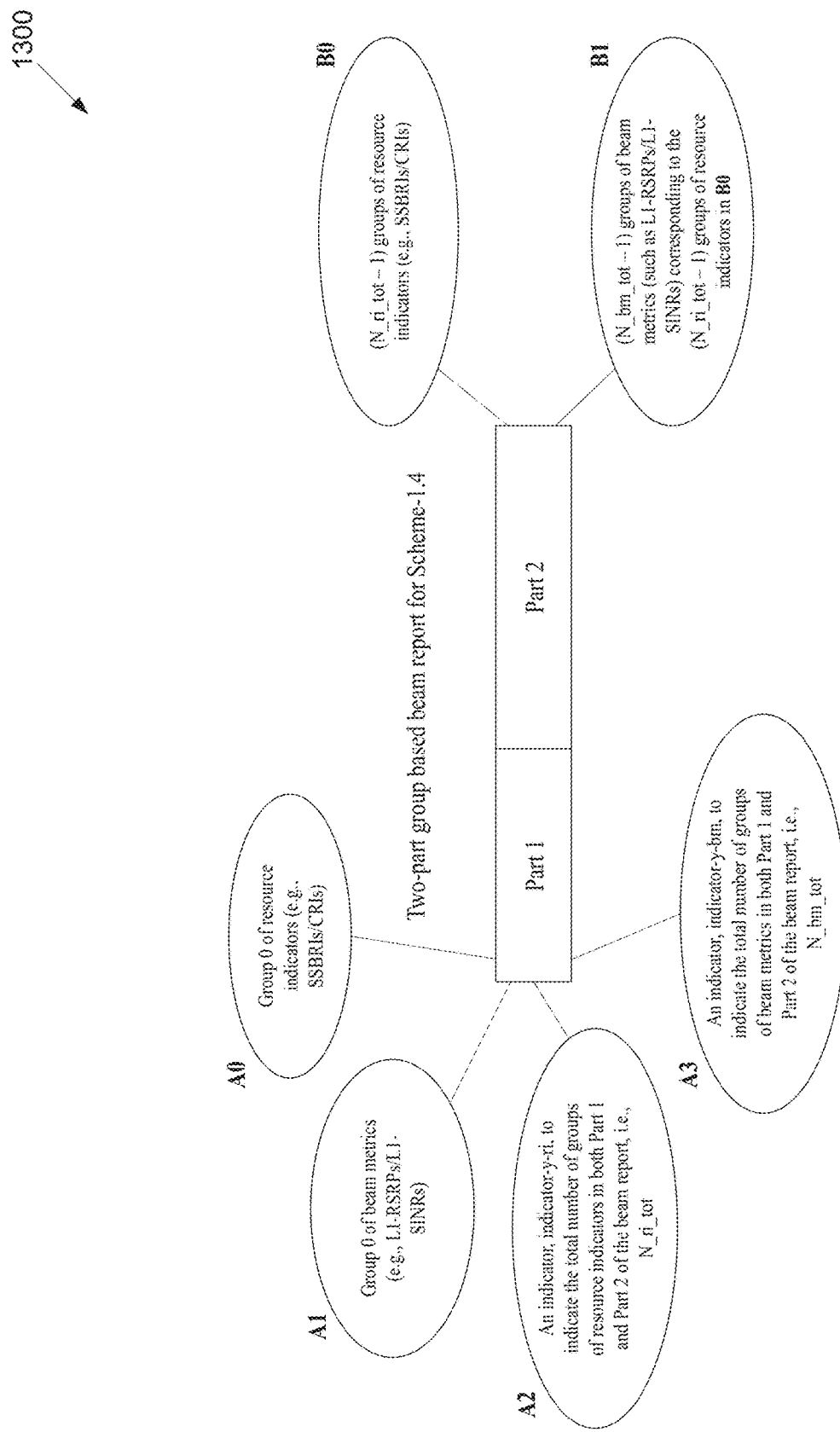
FIG. 13 illustrates yet another example of two-part group-based beam reporting according to embodiments of the present disclosure.

FIG. 13 illustrates yet another example of two-part group-based beam reporting 1300 according to embodiments of the present disclosure. An embodiment of the two-part group-based beam reporting 1300 shown in FIG. 13 is for illustration only.

In FIG. 13, a conceptual example characterizing the two-part group-based beam reporting strategy for Scheme-1.4 is depicted. As can be seen from FIG. 13, if N_ri_tot=1 and N_bm_tot=1, A2 and A3 would be absent in Part 1 of the beam report, and Part 2 of the beam report would be absent.

Figure 14A:
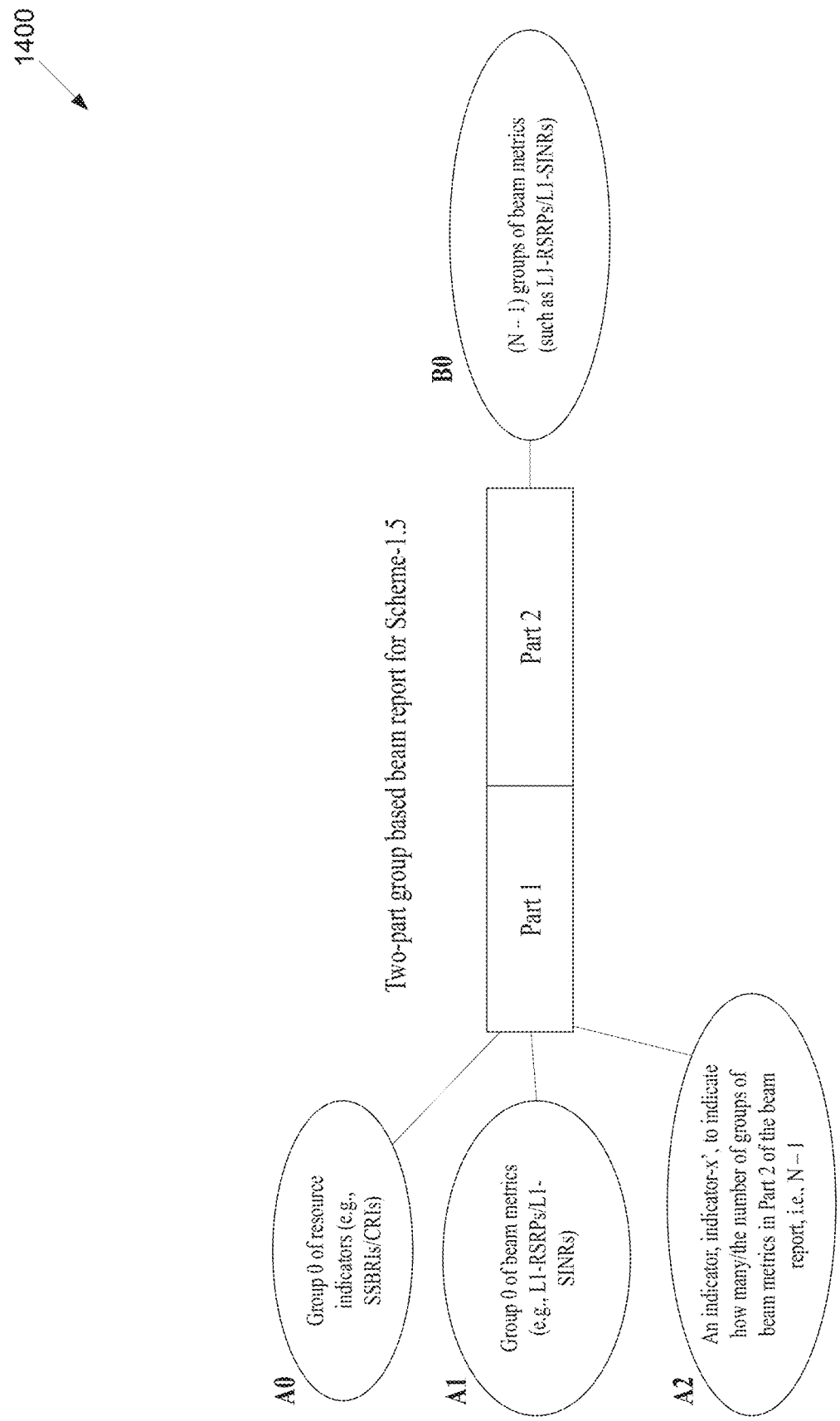
FIG. 14A illustrates yet another example of two-part group-based beam reporting according to embodiments of the present disclosure.

FIG. 14A illustrates yet another example of two-part group-based beam reporting 1400 according to embodiments of the present disclosure. An embodiment of the two-part group-based beam reporting 1400 shown in FIG. 14A is for illustration only.

Scheme-1.5: the main difference between Scheme-1.5 and other schemes is that in Scheme-1.5, only the groups of beam metrics are reported in Part 2 of the beam report, while in other schemes, both resource indicators and their associated beam metrics are reported in Part 2 of the beam report. In the following, Scheme-1.5 is discussed under the framework of Scheme-1.1, and depicted in FIG. 14A. Note that the provided design in FIG. 14A can be extended to other frameworks under Scheme-1.2, Scheme-1.3 and Scheme-1.4.

As can be seen from FIG. 14A, Part 1 of the beam report includes at least one of the following: one group of resource indicators (such as SSBRIs and/or CRIs) denoted by Group 0 of resource indicators, one group of beam metrics (such as L1-RSRPs and/or L1-SINRs), denoted by Group 0 of beam metrics, corresponding to Group 0 of resource indicators, and an indicator (denoted by indicator-x') to indicate the number of groups of beam metrics in Part 2 of the beam report. For instance, indicator-x' could correspond to the exact value of (N−1) and/or N, which can be dynamically changed/configured/selected by the UE. Part 2 of the beam report includes at least one of the following: (N−1) groups of beam metrics such as L1-RSRPs/L1-SINRs.

As discussed above, the UE could autonomously determine/select the exact value of the number (N) of groups of beam metrics to be reported in a single reporting instance, e.g., from a set of possible values for N configured/indicated by the network. For instance, if indicator-x'=3 (N=4), 3 groups of beam metrics corresponding to 3 groups of resource indicators are included in Part 2 of the beam report. If indicator-x'=2 (N=3), 2 groups of beam metrics corresponding to 2 groups of resource indicators are included in Part 2 of the beam report. If indicator-x'=0 (N=1), A2 in Part 1 of the beam report would be absent, and Part 2 of the beam report would be absent, i.e., no beam metrics are reported in Part 2 of the beam report. Upon receiving the (N−1) groups of beam metrics from Part 2 of the beam report, the network could configure the UE to report one or more groups of resource indicators from the (N−1) groups of resource indicators corresponding to the (N−1) groups of beam metrics reported in Part 2 of the beam report.

Scheme-1.6: Part 1 of the beam report includes at least one of the following: n_0≥1 group(s) of resource indicators (such as SSBRIs and/or CRIs), n_0≥1 group(s) of beam metrics (such as L1-RSRPs and/or L1-SINRs) corresponding to the n_0 group(s) of resource indicators, an indicator (denoted by indicator-x) to indicate the number of groups of resource indicators/beam metrics in Part 1 or Part 2 of the beam report, and an indicator (denoted by indicator-y) to indicate the total number of groups of resource indicators/ beam metrics in both Part 1 and Part 2 of the beam report, i.e., N. For instance, indicator-x could correspond to the exact value of n_0, i.e., the number of groups of resource indicators/beam metrics in Part 1 of the beam report, which can be dynamically changed/configured/selected by the UE.

As discussed above, the UE could autonomously determine/select the exact value of the number (N) of groups of resource indicators/beam metrics to be reported in a single reporting instance, e.g., from a set of possible values for N configured/indicated by the network, the exact value of the number (n_0) of groups of resource indicators/beam metrics in Part 1 of the two-part group-based beam report, and therefore the exact value of the number (N−n_0) of groups of resource indicators/beam metrics to be reported in Part 2 of the two-part group-based beam report. Part 2 of the beam report could include at least one of the following: (N−n_0) groups of resource indicators, and (N−n_0) groups of beam metrics corresponding to the (N−n_0) groups of resource indicators.

For instance, if indicator-x=2 (e.g., n_0=2) and indicator-y=4 (i.e., N=4), 2 groups of resource indicators and 2 groups of beam metrics corresponding to the 2 groups of resource indicators are included in Part 1 of the beam report, and 2 groups of resource indicators and 2 groups of beam metrics corresponding to the 2 groups of resource indicators are included in Part 2 of the beam report. If indicator-x=2 (e.g., n_0=2) and indicator-y=6 (i.e., N=6), 2 groups of resource indicators and 2 groups of beam metrics corresponding to the 2 groups of resource indicators are included in Part 1 of the beam report, and 4 groups of resource indicators and 4 groups of beam metrics corresponding to the 4 groups of resource indicators are included in Part 2 of the beam report. If indicator-y=1 (i.e., N=1), Part 2 of the beam report would be absent, i.e., no resource indicators/beam metrics are reported in Part 2 of the beam report.

Figure 14B:
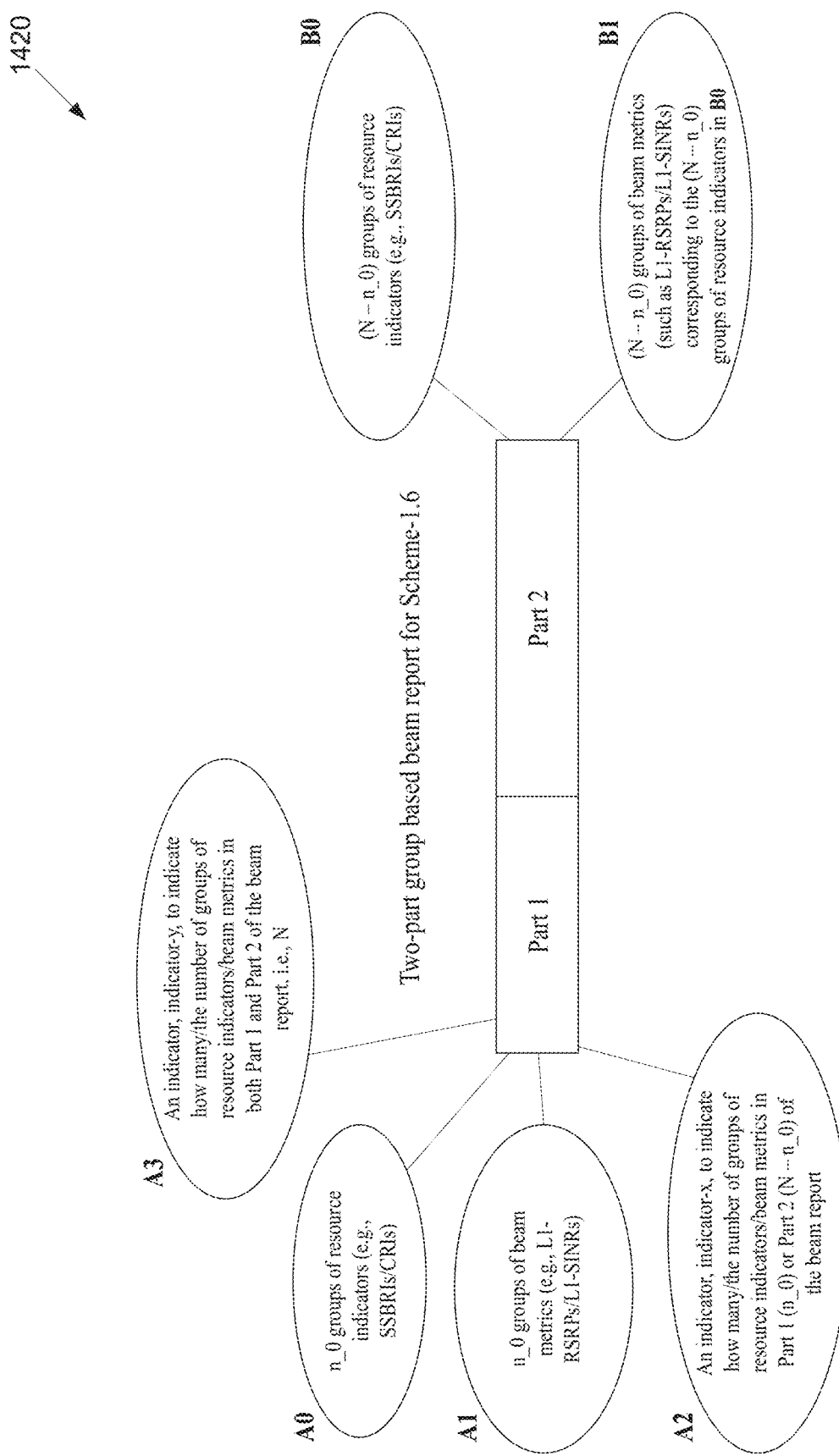
FIG. 14B illustrates yet another example of two-part group-based beam reporting according to embodiments of the present disclosure.

FIG. 14B illustrates yet another example of two-part group-based beam reporting 1420 according to embodiments of the present disclosure. An embodiment of the two-part group-based beam reporting 1420 shown in FIG. 14B is for illustration only.

In FIG. 14B, an example of the two-part group-based beam reporting strategy for Scheme-1.6 is illustrated. As discussed above, in A2 in FIG. 14B, the indicator-x could indicate either the number (n_0) of groups of resource indicators/beam metrics in Part 1 of the beam report or the number (N−n_0) of groups of resource indicators/beam metrics in Part 2 of the beam report, and in A3 in FIG. 14B, the indicator-y could indicate the total number (N) of groups of resource indicators/beam metrics to be reported in both Part 1 and Part 2 of the beam report. If the UE is configured/ indicated by the network the value N, A3 in FIG. 14B could be absent. Furthermore, other combinations of A2 and A3 in FIG. 14B are also possible. For example, the indicator-x in A2 could indicate the number (n_0) of groups of resource indicators/beam metrics in Part 1 of the beam report, and the indicator-y in A3 could indicate the number (N−n_0) of groups of resource indicators/beam metrics in Part 2 of the beam report.

To determine the number (n_0) of groups of resource indicators/beam metrics to be reported in Part 1 of the two-part beam report, in one example, the UE could be higher layer configured by the network a first threshold. For a group of resource indicators/beam metrics to be reported, the UE could compare the corresponding (average) L1-RSRP/L1-SINR metric(s)/value(s) with the first threshold; if the (average) L1-RSRP/L1-SINR metric(s)/value(s) is beyond the first threshold, the UE could incorporate/ include the group of resource indicators/beam metrics in Part 1 of the two-part group-based beam report(s).

To determine the number (n_0) of groups of resource indicators/beam metrics to be reported in Part 1 of the two-part beam report, in another example, the UE could be higher layer configured by the network a second threshold. The UE could compare the number (N) of groups of resource indicators/beam metrics to be reported in both Part 1 and Part 2 of the two-part group-based beam report(s) with the second threshold. For instance, if N is beyond the second threshold by n', the UE could report n' (n_0=n' in this case) groups of resource indicators/beam metrics in Part 1 of the beam report, and (N−n'), and therefore, (N−n_0) groups of resource indicators/beam metrics in Part 2 of the beam report. If N is below the second threshold, the UE could report all N groups of resource indicators/beam metrics (n_0=N in this case) in Part 1 of the two-part group-based beam report(s), and Part 2 of the beam report would be absent.

To determine the number (n_0) of groups of resource indicators/beam metrics to be reported in Part 1 of the two-part beam report, in yet another example, the UE could be higher layer configured by the network a third threshold and a fourth threshold. The UE could compare the number (N) of groups of resource indicators/beam metrics to be reported in both Part 1 and Part 2 of the two-part group-based beam report(s) with the third threshold. If N is beyond the third threshold, the UE could compare the (average) L1-RSRP/L1-SINR metric(s)/value(s) for each group of resource indicators/beam metrics with the fourth threshold. If the (average) L1-RSRP/L1-SINR metric(s)/value(s) of a group of resource indicators/beam metrics is beyond the fourth threshold, the UE could incorporate/include the group of resource indicators/beam metrics in Part 1 of the two-part group-based beam report(s). Otherwise, if N is below the third threshold, the UE could report all N groups of resource indicators/beam metrics (n_0=N in this case) in Part 1 of the two-part group-based beam report(s), and Part 2 of the beam report would be absent.

In Scheme-1.1, Scheme-1.2, Scheme-1.3, Scheme-1.4, Scheme-1.5 and Scheme-1.6, the UE could autonomously determine/select the number (N) of groups of resource indicators/beam metrics to be reported in both Part 1 and Part 2 of the beam report(s) and/or the number of groups of resource indicators/beam metrics to be reported in either Part 1 (n_0) or Part 2 (N−n_0) of the beam report(s), and include the relevant/corresponding indicators (such as indicator-x, indicator-y and etc.) in Part 1 of the beam report(s). In these cases, the UE could be indicated/configured by the network the number (M) of resource indicators/beam metrics within each group of resource indicators/beam metrics to be reported.

Alternatively, the UE could autonomously determine/select the number (M) of resource indicators/beam metrics in each group of resource indicators/beam metrics to be reported. The UE could also include in the two-part group-based beam report (e.g., in Part 1 of the beam report) the information regarding the number of (M) of resource indicators/beam metrics in each group of resource indicators/beam metrics to be reported. Other variations are also possible. For example, the UE could be indicated/configured by the network the number (N) of groups of resource indicators/beam metrics to be reported in both Part 1 and Part 2 of the beam report(s) and/or the number of groups of resource indicators/beam metrics to be reported in either Part 1 (n_0) or Part 2 (N−n_0) of the beam report(s); the UE could autonomously determine/select the number (M) of resource indicators/beam metrics in each group of resource indicators/beam metrics to be reported, and include in the two-part group-based beam report (e.g., in Part 1 of the beam report) the information regarding the number of (M) of resource indicators/beam metrics in each group of resource indicators/beam metrics to be reported.

The UE could be configured/indicated by the network via higher layer RRC signaling to follow one or more of the schemes (i.e., Scheme-1.1, Scheme-1.2, Scheme-1.3, Scheme-1.4, Scheme-1.5 and/or Scheme-1.6) to send to the network the two-part group-based beam report(s). Alternatively, the UE could autonomously determine which scheme(s) (i.e., Scheme-1.1, Scheme-1.2, Scheme-1.3, Scheme-1.4, Scheme-1.5 and/or Scheme-1.6) to follow to construct and send the two-part group-based beam report(s), and indicate to the network their choice(s).

Figure 14C:
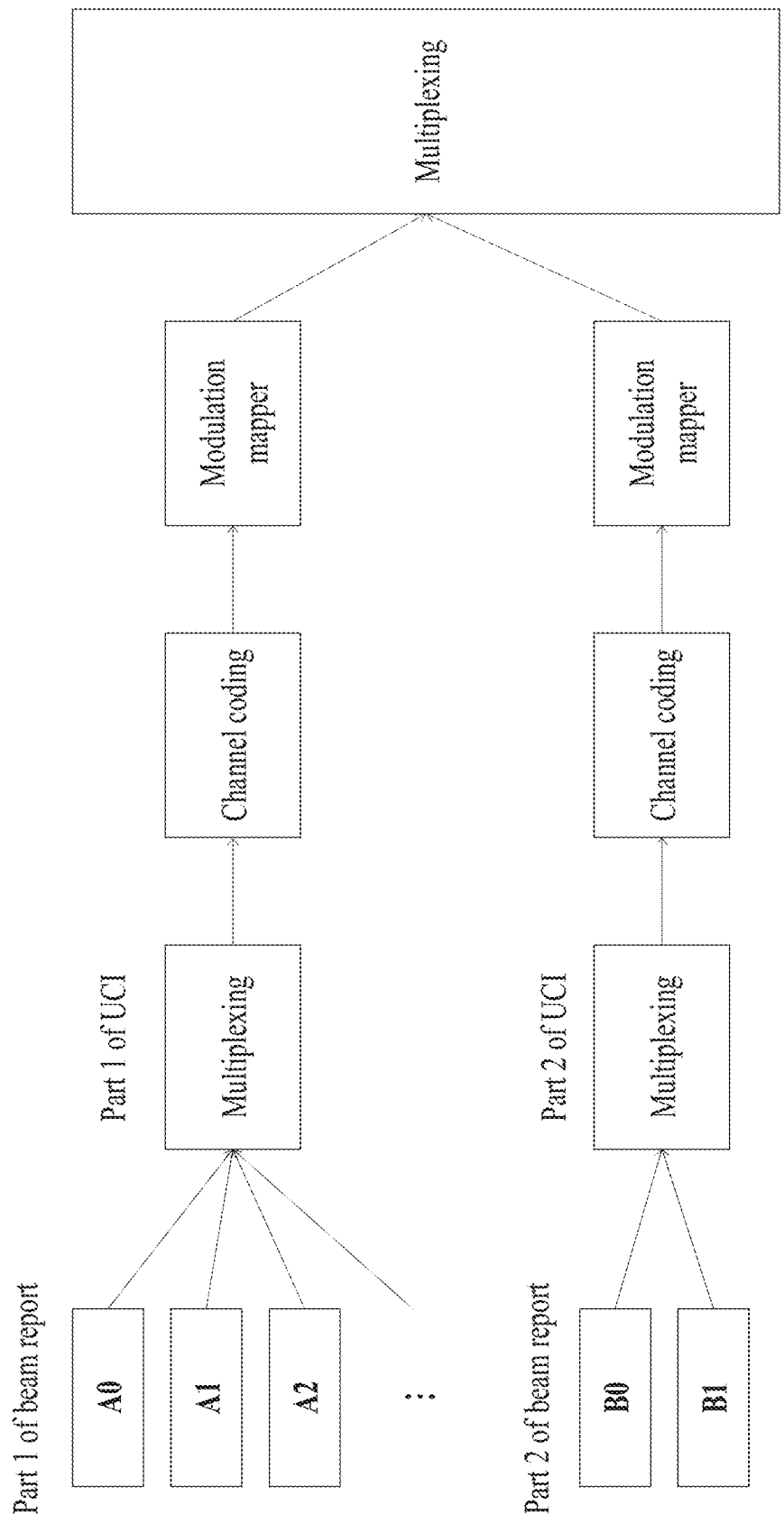
FIG. 14C illustrates an example of two-part UCI according to embodiments of the present disclosure.

FIG. 14C illustrates an example of two-part UCI 1440 according to embodiments of the present disclosure. An embodiment of the two-part UCI 1440 shown in FIG. 14C is for illustration only.

For all of the above schemes in Option-1 based two-part group-based beam reporting design for the multi-TRP/inter-cell operation, Part 1 and Part 2 of the beam report are separately encoded (see FIG. 14C) and reported in a single reporting instance. Detailed correspondences between A0, A1, A2, . . . , B0, B1 and the contents in the beam report are presented in FIGS. 10A to 14C for Scheme-1.1, Scheme-1.2, Scheme-1.3, Scheme-1.4, Scheme-1.5 and Scheme-1.6.

In one embodiment of one or two-part UCI, as discussed above, for Scheme-1.1, Scheme-1.2, Scheme-1.3, Scheme-1.4, Scheme-1.5 and Scheme-1.6, the group-based (inter-cell) beam reporting is via one-part UCI or a two-part UCI depending on one or more conditions. In one example (Scheme-1.2), the condition is based on the value of N. For example, when N<=x (where x is threshold, fixed or configured), the one-part UCI is used for the reporting, and when N>x, the two-part UCI is used for the reporting. Furthermore, for Scheme-1.1, Scheme-1.2, Scheme-1.3, Scheme-1.4, Scheme-1.5 and Scheme-1.6, the group-based (inter-cell) beam reporting is via one-part UCI or a two-part UCI depending on a signaling from the NW. This signaling could be semi-static via higher layer RRC signaling (using a dedicated parameter or with a joint configuration parameter) or more dynamic via MAC CE or DCI based signaling (using a dedicated indication or with a joint indication).

In one embodiment of multiplexing with other CSI reports, the group-based (inter-cell) beam reporting could be multiplexed with other types of CSI or beam reports, wherein whether one-part or two-part UCI is used for beam reporting could depend on the other CSI or beam reports.

The two-part UCI is used only when at least one of the other CSI or beam reports is configured with a two-part UCI.

The UL channel for group-based beam reporting (via two-part UCI)) can be fixed, e.g., to PUSCH. In one example, the UL channel for group-based beam reporting (via two-part UCI) can be fixed, e.g., to PUCCH. In one example, the UL channel for group-based beam reporting (via two-part UCI) can be configured from PUCCH and PUSCH.

The group-based (inter-cell) beam reporting (via two-part UCI) can be configured via higher layer RRC signaling. In one example, the group-based (inter-cell) beam reporting (via two-part UCI) can only be triggered via a code point in DCI (UL-related or DL-related DCI).

As discussed above, for the Option-1 based group-based beam reporting for the multi-TRP/inter-cell operation: (1) Configuration-1: the UE could be indicated/configured by the network the number (N) of group(s) of resource indicators/beam metrics to be reported per reporting setting/in a single reporting instance; and (2) Configuration-2: the UE could autonomously select/determine the number (N) of group(s) of resource indicators/beam metrics to be reported per reporting setting/in a single reporting instance; the UE could indicate to the network the value N in Part 1 of the two-part group-based beam report(s).

The UE could be indicated by the network to follow Configuration-1 and/or Configuration-2 to determine the number (N) of group(s) of resource indicators/beam metrics to be reported per reporting setting/in a single reporting instance for Option-1 based group-based (inter-cell) beam reporting; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE could be indicated by the network, e.g., via higher layer RRC signaling and/or dynamic DCI signaling, to follow Configuration-1 (based on network's configuration) or Configuration-2 (based on UE's reporting) or both to determine the number (N) of group(s) of resource indicators/beam metrics to be reported per reporting setting/in a single reporting instance for Option-1 based group-based (inter-cell) beam reporting. For instance, Configuration-1 could be the default mode/configuration, and the UE could be higher layer indicated by the network, e.g., via the higher layer parameter CSI-ReportConfig, whether Configuration-2 is enabled in addition to Configuration-1 or overriding/replacing Configuration-1. If the UE is indicated/configured by the network that Configuration-2 overrides/replaces Configuration-1, the UE could autonomously determine/select the number (N) of group(s) of resource indicators/beam metrics to be reported per reporting setting/in a single reporting instance for Option-1 based group-based (inter-cell) beam reporting, which could be different from that (the value of N) configured/indicated by the network.

In another example, the UE could receive from the network a MAC CE command activating Configuration-1 or Configuration-2 or both. For instance, if the MAC CE command has activated Configuration-2, the UE could autonomously determine/select the value of N, and report the relevant/corresponding indicator(s) to the network in Part 1 of the two-part group-based beam report for Option-1 based group-based beam reporting for the multi-TRP/inter-cell operation.

In yet another example, the UE could receive from the network a bitmap with each entry/bit corresponding to either Configuration-1 or Configuration-2. If an entry/bit in the bitmap is set to "1", the corresponding/associated configuration (either Configuration-1 or Configuration-2) is activated. A bitmap could contain at least one "1".

In yet another example, Configuration-1 could be the default mode/configuration. If/when the Option-1 based group-based beam reporting for the multi-TRP/inter-cell operation is enabled (e.g., groupBasedBeamReportingMTRP-Opt1 in the higher layer parameter CSI-ReportConfig shown in TABLE 3 is set to 'enabled') and the field indicating the number (N) of group(s) of resource indicators/beam metrics to be reported per reporting setting/in a single reporting instance is not enabled/configured/present (e.g., nrofReportedGroup-Opt1 in the higher layer parameter CSI-ReportConfig shown in TABLE 3 is not enabled/configured/present), the UE would follow Configuration-2 to autonomously determine/select the value of N, and report the relevant/corresponding indicator(s) to the network in Part 1 of the two-part group-based beam report for Option-1 based group-based (inter-cell) beam reporting.

In the present disclosure, a design option (Option-2) for group-based beam reporting for multi-TRP/inter-cell operation is provided.

The UE reports to the network in a single reporting instance N' (N'>1, e.g., N'=2) groups of resource indicators (such as SSBRIs and/or CRIs); the i-th group of resource indicators or/and the group of resource indicators with the i-th lowest/highest group index/ID value could include Qi (Qi≥1, e.g., Qi=1, 2, 3 or 4, i=1, 2, . . . , N') resource indicator(s), and the numbers of resource indicator(s) in different (N') groups of resource indicators could be different.

The resource indicator(s) in a given group of resource indicator(s) could correspond to the same TRP, and the resource indicators from different groups of resource indicators could correspond to different TRPs in the multi-TRP system. The UE could be indicated/configured by the network the association rule(s)/mapping relationship(s) between the groups of resource indicators and the TRPs (and therefore, the corresponding TRP-specific index/ID values such as PCI values, TRP ID values and CORESETPoolIndex values, or/and the corresponding resource settings/resource sets).

In one example-i, the UE could be indicated by the network the mapping relationship(s)/association rule(s) between the TRP-specific index/ID values such as PCI values, TRP ID values and etc. and the groups of resource indicators. For example, the UE could be first higher layer configured by the network a list/set/pool of TRP-specific index/ID values such as PCI values, TRP ID values and etc. The first reported group of resource indicator(s) could be associated with/mapped to/linked to the first entry in the list/set/pool of TRP-specific index/ID values, the second reported group of resource indicator(s) could be associated with/mapped to/linked to the second entry in the list/set/pool of TRP-specific index/ID values, and so on, and the last group of resource indicator(s) could be associated with/mapped to/linked to the last entry in the list/set/pool of TRP-specific index/ID values.

For another example, the first reported group of resource indicator(s) could be associated with/mapped to/linked to the lowest (or the highest) TRP-specific index/ID value such as the lowest (or the highest) PCI value, the second reported group of resource indicator(s) could be associated with/mapped to/linked to the second lowest (or the second highest) TRP-specific index/ID value such as the second lowest (or the second highest) PCI value, and so on, and the last reported group of resource indicator(s) could be associated with/mapped to/linked to the highest (or the lowest) TRP-specific index/ID value such as the highest (or the lowest) PCI value.

In one example-ii, the UE could be indicated by the network the links/associations/mappings/correspondences between the resource settings/resource sets and the groups of resource indicators. For example, the UE could be configured by the network N'>1 SSB/CSI-RS resource sets in a single CSI resource setting each configured for/associated with a different TRP (e.g., for N'=2, the first SSB/CSI-RS resource set is configured for/associated with TRP-1 and the second SSB/CSI-RS resource set is configured for/associated with TRP-2). Furthermore, the UE could be configured by the network that the first group of resource indicator(s) could be linked to/associated with/mapped to the first SSB/CSI-RS resource set or/and the SSB/CSI-RS resource set with the lowest (or the highest) resource set index/ID value, while the second group of resource indicators could be linked to/associated with/mapped to the second SSB/CSI-RS resource set or/and the SSB/CSI-RS resource set with the second lowest (or the second highest) resource set index/ID value, and so on, and the last group of resource indicator(s) could be linked to/associated with/mapped to the last SSB/CSI-RS resource set or/and the SSB/CSI-RS resource set with the highest (or the lowest) resource set index/ID value.

For N'=2, the UE would report the first group of resource indicator(s) selected/determined from the first CSI resource set or the CSI resource set with the lowest (or the highest) resource set ID/index value for TRP-1, and the second group of resource indicator(s) selected/determined from the second CSI resource set or the CSI resource set with the highest (or the lowest) resource set ID/index value for TRP-2.

In one example-iii, if CORESETPoolIndex is configured (e.g., the UE is provided by PDCCH-Config two CORESETPoolIndex values—0 and 1—in CORESETs), the UE could be indicated/configured by the network the association rule(s)/mapping relationship(s) between the values of CORESETPoolIndex (i.e., either "0" or "1") and the groups of resource indicators. Alternatively, the UE could indicate to the network the association rule(s)/mapping relationship(s) between the values of CORESETPoolIndex and the groups of resource indicators. The UE could also know the association rule(s)/mapping relationship(s) between the values of CORESETPoolIndex and the groups of resource indicators in an implicit manner. For example, the first group of resource indicator(s) could be associated with value 0 (or 1) of CORESETPoolIndex or one or more CORESETs with "CORESETPoolIndex=0 or 1" while the second group of resource indicator(s) could be associated with value 1 (or 0) of CORESETPoolIndex or one or more CORESETs with "CORESETPoolIndex=1 or 0".

The UE could simultaneously receive the downlink beams/RSs/channels corresponding to the resource indicators from different groups of resource indicators using either a single spatial domain receive filter or multiple (more than one) spatial domain receive filters. For instance, for N'=2 and Q1=Q2=1, the UE could simultaneously receive the downlink beam/RS/channel corresponding to the resource indicator in the first group of resource indicator and the downlink beam/RS/channel corresponding to the resource indicator in the second group of resource indicator using either a single spatial domain receive filter or multiple (more than one) spatial domain receive filters.

Within the same reporting instance, the UE could also report to the network N' (N'>1, e.g., N'=2) groups of beam metrics (such as L1-RSRPs/L1-SINRs); the i-th group of beam metrics or/and the group of beam metrics with the i-th lowest/highest group index/ID value could include Qi (Qi≥1, e.g., Qi=1, 2, 3 or 4, i=1, 2, . . . , N') beam metrics. The reported beam metrics could be one-to-one associated to the reported resource indicators. For instance, assuming N'=2 and Q1=Q2=2, the first beam metric in the first group of beam metrics could correspond to the first resource indicator in the first group of resource indicators, the second beam metric in the first group of beam metrics could correspond to the second resource indicator in the first group of resource indicators, the first beam metric in the second group of beam metrics could correspond to the first resource indicator in the second group of resource indicators, and the second beam metric in the second group of beam metrics could correspond to the second resource indicator in the second group of resource indicators.

In TABLE 8, an example of the above described mapping order of CSI fields of one report for Option-2 based group-based beam reporting for the multi-TRP operation is presented for N'=4 and Q1=2, Q2=2, Q3=2 and Q4=2. The bitwidths for SSBRI, CRI, RSRP and differential RSRP in TABLE 8 are determined according to Table 6.3.1.1.2-6 in the 3GPP TS 38.212. As shown in TABLE 8, the beam metric of the first resource indicator in the first group of resource indicators corresponds to the largest measured value of L1-RSRP. In addition, a resource set indicator could be incorporated/included in the CSI report as one CSI field. The resource set indicator could be a one-bit indicator, with value 0 or 1, indicating the first or second CSI resource set, from which the (first and second) resource indicators in the first group of resource indicators are selected/determined.

Furthermore, the (first and second) resource indicators in odd-numbered/indexed group(s) of resource indicators (e.g., the third group of resource indicators in TABLE 8) are selected/determined from the same CSI resource set used for determining the (first and second) resource indicators in the first group of resource indicators, and the (first and second) resource indicators in even-numbered/indexed group(s) of resource indicators (e.g., the fourth group of resource indicators in TABLE 8) are selected/determined from the same CSI resource set used for determining the (first and second) resource indicators in the second group of resource indicators.

TABLE 8

Mapping order of CSI fields of one report for Option-2 based group-based beam reporting

| CSI report number | CSI fields |
|---|---|
| CSI report #n | Resource set indicator |
| | The first resource indicator (SSBRI/CRI) in the first reported group of resource indicators |
| | The second resource indicator (SSBRI/CRI) in the first reported group of resource indicators |
| | The first resource indicator (SSBRI/CRI) in the second reported group of resource indicators |
| | The second resource indicator (SSBRI/CRI) in the second reported group of resource indicators |
| | The first resource indicator (SSBRI/CRI) in the third reported group of resource indicators, if reported |
| | The second resource indicator (SSBRI/CRI) in the third reported group of resource indicators, if reported |
| | The first resource indicator (SSBRI/CRI) in the fourth reported group of resource indicators, if reported |
| | The second resource indicator (SSBRI/CRI) in the fourth reported group of resource indicators, if reported |
| | RSRP of the first resource indicator (SSBRI/CRI) in the first reported group of resource indicators |
| | Differential RSRP of the second resource indicator (SSBRI/CRI) in the first reported group of resource indicators |
| | Differential RSRP of the first resource indicator (SSBRI/CRI) in the second reported group of resource indicators |
| | Differential RSRP of the second resource indicator (SSBRI/CRI) in the second reported group of resource indicators |
| | Differential RSRP of the first resource indicator (SSBRI/CRI) in the third reported group of resource indicators, if reported |
| | Differential RSRP of the second resource indicator (SSBRI/CRI) in the third reported group of resource indicators, if reported |
| | Differential RSRP of the first resource indicator (SSBRI/CRI) in the fourth reported group of resource indicators, if reported |
| | Differential RSRP of the second resource indicator (SSBRI/CRI) in the fourth reported group of resource indicators, if reported |

For an inter-cell system comprising the serving cell PCI and at least one PCI different from the serving cell PCI, resource configuration(s) for inter-cell beam measurement are specified in the example-A, example-B and example-C in the present disclosure. Given the resource configurations specified in the example-A, example-B and example-C for the inter-cell measurement, the corresponding Option-2 based group-based inter-cell beam reporting formats could be specified according to one or more of the following design examples.

In one example-H, the UE could report in a single CSI reporting instance N' (N'>1, e.g., N'=2) groups of resource indicators (such as SSBRIs and/or CRIs); the i-th group of resource indicators or/and the group of resource indicators with the i-th lowest/highest group index/ID value could include Qi (Qi≥1, Qi=1, 2, 3 or 4, i=1, 2, . . . , N') resource indicator(s), and the numbers of resource indicator(s) in different (N') groups of resource indicators could be different. Resource indicators such as SSBRIs/CRIs in a reported group of resource indicators could be associated with a PCI (i.e., either the serving cell PCI or a PCI different from the serving cell PCI) or determined from a CSI resource set (e.g., configured according to the example-A or example-B in the present disclosure). The UE could simultaneously receive the SSB resources or CSI-RS resources corresponding to the SSBRIs or CRIs across different reported groups of resource indicators. In the following examples, two CSI resource sets are configured. Similar design principles can be applied/extended to the case where more than two CSI resource sets are configured for the inter-cell operation.

For example, the resource indicators in the odd-numbered/indexed (e.g., the first, third, fifth and etc.) group(s) of resource indicators could be determined from/associated with the first CSI resource set configured according to the example-A or example-B (and therefore, the corresponding/associated PCI), and the resource indicators in the even-numbered/indexed (e.g., the second, fourth, sixth and etc.) group(s) of resource indicators could be determined from/associated with the second CSI resource set configured according to the example-A or example-B (and therefore, the corresponding/associated PCI).

For another example, the resource indicators in the odd-numbered/indexed (e.g., the first, third, fifth and etc.) group(s) of resource indicators could be determined from/associated with the CSI resource set with the lowest (or the highest) resource set index/ID value configured according to the example-A or example-B (and therefore, the corresponding/associated PCI), and the resource indicators in the even-numbered/indexed (e.g., the second, fourth, sixth and etc.) group(s) of resource indicators could be determined from/associated with the CSI resource set with the highest (or the lowest) resource set index/ID value configured according to the example-A or example-B (and therefore, the corresponding/associated PCI).

Yet for another example, the resource indicators in the odd-numbered/indexed (e.g., the first, third, fifth and etc.) group(s) of resource indicators could be determined from/associated with the CSI resource set associated with the serving cell PCI/PCI index configured according to the example-A or example-B, and the resource indicators in the even-numbered/indexed (e.g., the second, fourth, sixth and etc.) group(s) of resource indicators could be determined from/associated with the CSI resource set associated with the PCI/PCI index different from the serving cell PCI/PCI index configured according to the example-A or example-B.

Yet for another example, the resource indicators in the odd-numbered/indexed (e.g., the first, third, fifth and etc.) group(s) of resource indicators could be determined from/associated with the CSI resource set associated with the lowest (or the highest) PCI/PCI index configured according to the example-A or example-B, and the resource indicators in the even-numbered/indexed (e.g., the second, fourth, sixth and etc.) group(s) of resource indicators could be determined from/associated with the CSI resource set associated with the highest (or the lowest) PCI/PCI index configured according to the example-A or example-B.

In one example-L, the UE could report in a single CSI reporting instance N' (N'>1, e.g., N'=2) groups of resource indicators (such as SSBRIs and/or CRIs); the i-th group of resource indicators or/and the group of resource indicators with the i-th lowest/highest group index/ID value could include Qi (Qi≥1, Qi=1, 2, 3 or 4, i=1, 2, . . . , N') resource indicator(s), and the numbers of resource indicator(s) in different (N') groups of resource indicators could be different. Resource indicators such as SSBRIs/CRIs in a reported group of resource indicators could be determined from the CSI resource set configured according to the example-C and associated with a PCI (i.e., either the serving cell PCI or a PCI different from the serving cell PCI). The UE could simultaneously receive the SSB resources or CSI-RS resources corresponding to the SSBRIs or CRIs across different reported groups of resource indicators. In the following examples, the serving cell PCI/PCI index and a PCI/PCI index different from the serving cell PCI/PCI index are configured. Similar design principles can be applied/extended to the case where more than two PCIs/PCI indexes (including the serving cell PCI/PCI index and at least one PCI/PCI index different from the serving cell PCI/PCI index) are configured for the inter-cell operation.

For instance, the resource indicators in the odd-numbered/indexed (e.g., the first, third, fifth and etc.) group(s) of resource indicators could be determined from one or more SSB/CSI-RS resources associated with the serving cell PCI/PCI index or the lowest (or the highest) PCI/PCI index in the CSI resource set configured according to the example-C, and the resource indicators in even-numbered/indexed (e.g., the second, fourth, sixth and etc.) group(s) of resource indicators could be determined from one or more SSB/CSI-RS resources associated with the PCI/PCI index different from the serving cell PCI/PCI index or the highest (or the lowest) PCI/PCI index in the CSI resource set configured according to the example-C. For another example, the UE could autonomously determine the order of the groups of resource indicators in one CSI report. For this case, the odd-numbered/indexed (or the even-numbered/indexed) group(s) of resource indicators in one CSI report could be associated with different PCIs/PCI indexes.

In one example-J, the UE could report in a single CSI reporting instance N' (N'>1, e.g., N'=2) groups of resource indicators (such as SSBRIs and/or CRIs); the i-th group of resource indicators or/and the group of resource indicators with the i-th lowest/highest group index/ID value could include Qi (Qi≥1, Qi=1, 2, 3 or 4, i=1, 2, . . . , N') resource indicator(s), and the numbers of resource indicator(s) in different (N') groups of resource indicators could be different. Resource indicators such as SSBRIs/CRIs in a reported group of resource indicators could be associated with a PCI (i.e., either the serving cell PCI or a PCI different from the serving cell PCI) or determined from a CSI resource set (e.g., configured according to the example-A or example-B in the present disclosure). The UE could simultaneously receive the SSB resources or CSI-RS resources corresponding to the SSBRIs or CRIs across different reported groups of resource indicators. In the following examples, two CSI resource sets are configured. Similar design principles can be applied/extended to the case where more than two CSI resource sets are configured for the inter-cell operation.

For instance, the first resource indicator in the first group of resource indicators could be associated with the largest measured value of L1-RSRP (or L1-SINR), and the remaining (Q1−1) resource indicator(s) in the first group of resource indicators could be determined from the same CSI resource set (and therefore, associated with the same PCI/PCI index) used for determining the first resource indicator in the first group of resource indicators. For this case, the resource indicators in the second group of resource indicators could be determined from the CSI resource set different from that used for determining the resource indicators in the first group of resource indicators. Furthermore, the resource indicators in the remaining odd-numbered/indexed (e.g., the third, fifth and etc.) group(s) of resource indicators could be determined from the same CSI resource set (and therefore, associated with the same PCI/PCI index) as that used for determining the (first) resource indicators in the first group of resource indicators, and the resource indicators in the remaining even-numbered/indexed (e.g., the fourth, sixth and etc.) group(s) of resource indicators could be determined from the same CSI resource set (and therefore, associated with the same PCI/PCI index) as that used for determining the (first) resource indicators in the second group of resource indicators.

Alternatively, the remaining (N'−2) group(s) of resource indicators other than the first and second reported groups of resource indicators could be ordered according to those specified in the example-H—e.g., according to the order of the resource set indexes/IDs, PCIs/PCI indexes and etc.

In one example-K, the UE could report in a single CSI reporting instance N' (N'>1, e.g., N'=2) groups of resource indicators (such as SSBRIs and/or CRIs); the i-th group of resource indicators or/and the group of resource indicators with the i-th lowest/highest group index/ID value could include Qi (Qi≥1, Qi=1, 2, 3 or 4, i=1, 2, . . . , N') resource indicator(s), and the numbers of resource indicator(s) in different (N') groups of resource indicators could be different. Resource indicators such as SSBRIs/CRIs in a reported group of resource indicators could be determined from the CSI resource set configured according to the example-C and associated with a PCI (i.e., either the serving cell PCI or a PCI different from the serving cell PCI). The UE could simultaneously receive the SSB resources or CSI-RS resources corresponding to the SSBRIs or CRIs across different reported groups of resource indicators. In the following examples, the serving cell PCI/PCI index and a PCI/PCI index different from the serving cell PCI/PCI index are configured. Similar design principles can be applied/extended to the case where more than two PCIs/PCI indexes (including the serving cell PCI/PCI index and at least one PCI/PCI index different from the serving cell PCI/PCI index) are configured for the inter-cell operation.

For instance, the first resource indicator in the first group of resource indicators could be associated with the largest measured value of L1-RSRP (or L1-SINR), and the remaining (Q1−1) resource indicator(s) in the first group of resource indicators could be determined from the same SSB/CSI-RS resources (and therefore, associated with the same PCI/PCI index) in the CSI resource set used for determining the first resource indicator in the first group of resource indicators. For this case, the resource indicators in the second group of resource indicators could be determined from one or more SSB/CSI-RS resources different from the SSB/CSI-RS resources in the CSI resource set used for determining the resource indicators in the first group of resource indicators. Furthermore, the resource indicators in the remaining odd-numbered/indexed (e.g., the third, fifth and etc.) group(s) of resource indicators could be determined from the same SSB/CSI-RS resources (and therefore, associated with the same PCI/PCI index) in the CSI resource set that are used for determining the (first) resource indicators in the first group of resource indicators, and the resource indicators in the remaining even-numbered/indexed (e.g., the fourth, sixth and etc.) group(s) of resource indicators could be determined from the same SSB/CSI-RS resources (and therefore, associated with the same PCI/PCI index) in the CSI resource set that are used for determining the (first) resource indicators in the second group of resource indicators.

Alternatively, the remaining (N'−2) group(s) of resource indicators other than the first and second reported groups of resource indicators could be ordered according to those specified in the example-J—e.g., according to the order of the associated PCIs/PCI indexes or autonomously determined by the UE.

For the example-H, example-L, example-J and example-K in the present disclosure, the UE could also report to the network N' (N'>1, e.g., N'=2) groups of beam metrics (such as L1-RSRPs/L1-SINRs); the i-th group of beam metrics or/and the group of beam metrics with the i-th lowest/highest group index/ID value could include Qi (Qi≥1, e.g., Qi=1, 2, 3 or 4, i=1, 2, . . . , N') beam metrics. The reported beam metrics could be one-to-one associated to the reported resource indicators. For instance, assuming N'=2 and Q1=Q2=2, the first beam metric in the first group of beam metrics could correspond to the first resource indicator in the first group of resource indicators, the second beam metric in the first group of beam metrics could correspond to the second resource indicator in the first group of resource indicators, the first beam metric in the second group of beam metrics could correspond to the first resource indicator in the second group of resource indicators, and the second beam metric in the second group of beam metrics could correspond to the second resource indicator in the second group of resource indicators.

Furthermore, for the example-H, example-L, example-J and example-K in the present disclosure: (1) for L1-RSRP reporting, the UE could use differential L1-RSRP based reporting, where the largest measured value of L1-RSRP is quantized to a 7-bit value in the range [−40, −44] dBm with 1 dB step size, and the differential L1-RSRP is quantized to a 4-bit value. The differential L1-RSRP value is computed with 2 dB step size with a reference to the largest measured L1-RSRP value which is part of the same L1-RSRP reporting instance, and (2) for L1-SINR reporting, the UE could use differential L1-SINR based reporting, where the largest measured value of L1-SINR is quantized to a 7-bit value in the range [−23, −40] dBm with 0.5 dB step size, and the differential L1-SINR is quantized to a 4-bit value. The differential L1-SINR value is computed with 1 dB step size with a reference to the largest measured L1-SINR value which is part of the same L1-SINR reporting instance.

For the example-J in the present disclosure, as the first resource indicator in the first reported group of resource indicators is associated with the largest measured value of L1-RSRP (or equivalently, the first beam metric in the first reported group of beam metrics corresponds to the largest measured value of L1-RSRP), the UE may need to indicate to the network information related to the CSI resource set (and therefore, the associated PCI/PCI index), from which the first resource indicator in the first reported group of resource indicators is determined/selected. In TABLE 9, an example of the above described mapping order of CSI fields of one report for Option-2 based group-based inter-cell beam reporting is presented for N'=4, Q1=2, Q2=2, Q3=4 and Q4=2. The bitwidths for SSBRI, CRI, RSRP and differential RSRP in TABLE 9 could be determined according to Table 6.3.1.1.2-6 in the 3GPP TS 38.212. As shown in TABLE 9, an entity indicator could be incorporated/included in the CSI report as one CSI field. The entity indicator could correspond be determined according to the example-i1 or example-i2 in the present disclosure.

TABLE 9

Mapping order of CSI fields of one report for Option-2 based group-based inter-cell beam reporting

| CSI report number | CSI fields |
| --- | --- |
| CSI report #n | An entity indicator<br>The first resource indicator (SSBRI/CRI) in the first reported group of resource indicators<br>The second resource indicator (SSBRI/CRI) in the first reported group of resource indicators<br>The first resource indicator (SSBRI/CRI) in the second reported group of resource indicators<br>The second resource indicator (SSBRI/CRI) in the second reported group of resource indicators<br>The first resource indicator (SSBRI/CRI) in the third reported group of resource indicators, if reported<br>The second resource indicator (SSBRI/CRI) in the third reported group of resource indicators, if reported<br>The first resource indicator (SSBRI/CRI) in the fourth reported group of resource indicators, if reported<br>The second resource indicator (SSBRI/CRI) in the fourth reported group of resource indicators, if reported<br>RSRP of the first resource indicator (SSBRI/CRI) in the first reported group of resource indicators<br>Differential RSRP of the second resource indicator (SSBRI/CRI) in the first reported group of resource indicators<br>Differential RSRP of the first resource indicator (SSBRI/CRI) in the second reported group of resource indicators<br>Differential RSRP of the second resource indicator (SSBRI/CRI) in the second reported group of resource indicators<br>Differential RSRP of the first resource indicator (SSBRI/CRI) in the third reported group of resource indicators, if reported<br>Differential RSRP of the second resource indicator (SSBRI/CRI) in the third reported group of resource indicators, if reported<br>Differential RSRP of the first resource indicator (SSBRI/CRI) in the fourth reported group of resource indicators, if reported<br>Differential RSRP of the second resource indicator (SSBRI/CRI) in the fourth reported group of resource indicators, if reported |

For the example-H, example-L or example-K in the present disclosure, the entity indicator field in the CSI report shown in TABLE 9 could be absent. As discussed above, at least for the example-J, the resource indicators in the odd-numbered/indexed (including the first) group(s) of resource indicators (if reported) could be associated with the same SSB/CSI-RS resources or CSI resource set or PCI/PCI index, and the resource indicators in the even-numbered/indexed (including the second) group(s) of resource indicators (if reported) could be associated with the same SSB/CSI-RS resources or CSI resource set or PCI/PCI index, wherein the first resource indicator in the first reported group of resource indicators is associated with the indicated entity indicator.

The UE could be configured/indicated by the network the exact values of N', i.e., the number of groups of resource indicators/beam metrics to be reported in a single reporting instance and/or Qi (Qi≥1, i=1, 2, . . . , N'), i.e., the number of resource indicator(s)/beam metric(s) in the i-th group of resource indicator(s)/beam metric(s) or/and the group of resource indicator(s)/beam metric(s) with the i-th lowest/highest group index/ID value; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For the value of N', in one example, the UE could be indicated by the network, e.g., via higher layer RRC signaling and/or MAC CE command and/or DCI based signaling, the exact value of N', i.e., the number of groups of resource indicators/beam metrics to be reported in a single reporting instance for Option-2 based group-based (inter-cell) beam reporting. For instance, the exact value of N' could be indicated/configured in the CSI reporting setting, e.g., via the higher layer parameter CSI-ReportConfig, which is presented in TABLE 10.

As can be seen from TABLE 10, the higher layer parameter groupBasedBeamReportingMTRP-Opt2, could be configured/used to turn on/off the Option-2 based group-based beam reporting for the multi-TRP/inter-cell operation, and within/under groupBasedBeamReportingMTRP-Opt2, the higher layer parameter nrofReportedGroup-Opt2 indicates the number (N') of groups of resource indicators/beam metrics to be reported per reporting setting/in a single reporting instance for the group-based (inter-cell) beam reporting (Option-2 in this disclosure). Here, N'≤N'_max, where N'_max represents the maximum number of groups of resource indicators/beam metrics that can be reported per reporting setting/in a single reporting instance for Option-2 based group-based beam reporting for the multi-TRP/inter-cell operation; for instance, N'_max could be 2, 3 or 4 depending on UE capability reporting. When the field nrofReportedGroup-Opt2 is absent, the UE could apply the value 2 (i.e., N'=2).

TABLE 10

An example of higher layer parameter CSI-ReportConfig indicating the number of groups of resource indicators/beam metrics to be reported for the Option-2 based group-based (inter-cell) beam reporting

```
CSI-ReportConfig ::= SEQUENCE {
  reportConfigId CSI-ReportConfigId,
  carrier ServCellIndex OPTIONAL, -- Need S
  groupBasedBeamReportingMTRP-Opt2 CHOICE {
    ...
    NrofReportedGroup-Opt2 ENUMERATED {n2, n3, n4} OPTIONAL -- Need S
    ...
  },
```

TABLE 10-continued

An example of higher layer parameter CSI-ReportConfig indicating the number of groups of resource indicators/beam metrics to be reported for the Option-2 based group-based (inter-cell) beam reporting

```
    resourcesForChannelMeasurement CSI-ResourceConfigId,
        csi-IM-ResourcesForInterference CSI-ResourceConfigId OPTIONAL, -- Need R
        nzp-CSI-RS-ResourcesForInterference CSI-ResourceConfigId OPTIONAL, -- Need R
        ...
}
```

For the value of N', in another example, the UE could be first higher layer configured by the network (e.g., via the higher layer RRC signalling) a list/set/pool of candidate values for the number (N') of groups of resource indicators/beam metrics to be reported per reporting setting/in a single reporting instance for Option-2 based group-based (inter-cell) beam reporting, denoted by N'_set. The UE could then receive from the network a MAC CE command activating at least one value from the list/set/pool of candidate values for N' as the number (N') of groups of resource indicators/beam metrics to be reported per reporting setting/in a single reporting instance for Option-2 based group-based beam reporting for the multi-TRP/inter-cell operation.

For the value of N', in yet another example, the UE could be first higher layer configured by the network (e.g., via the higher layer RRC signalling) a list/set/pool of candidate values for the number (N') of groups of resource indicators/beam metrics to be reported per reporting setting/in a single reporting instance for Option-2 based group-based (inter-cell) beam reporting, denoted by N'_set. The UE could then receive from the network a bitmap with each entry/bit in the bitmap corresponding to a value in the list/set/pool of candidate values for N'. If an entry/bit in the bitmap is set to "1", the corresponding/associated value in the list/set/pool of candidate values for N' is activated as the number (N') of groups of resource indicators/beam metrics to be reported per reporting setting/in a single reporting instance for Option-2 based group-based beam reporting for the multi-TRP/inter-cell operation.

For the value of Qi (Qi≥1, i=1, 2, . . . , N'), in one example, the UE could be indicated by the network, e.g., via higher layer RRC signaling and/or MAC CE command and/or DCI based signaling, the exact value of Qi (Qi≥1, i=1, 2, . . . , N'), i.e., the number of resource indicator(s)/beam metric(s) reported in the i-th group of resource indicator(s)/beam metric(s) or/and the group of resource indicator(s)/beam metric(s) with the i-th lowest/highest group index/ID value in a single reporting instance for Option-2 based group-based beam reporting for the multi-TRP/inter-cell operation. In this example, the values of Qi's (Qi≥1, i=1, 2, . . . , N') could be common (denoted by Q) for all reported N' groups of resource indicators/beam metrics per reporting setting/in a single reporting instance.

For instance, the exact value of Qi (Qi≥1, i=1, 2, . . . , N') could be indicated/configured in the CSI reporting setting, e.g., via the higher layer parameter CSI-ReportConfig, which is presented in TABLE 11. As can be seen from TABLE 11, the higher layer parameter groupBasedBeamReportingMTRP-Opt2, could be configured/used to turn on/off the Option-2 based group-based beam reporting for the multi-TRP/inter-cell operation, and within/under groupBasedBeamReportingMTRP-Opt2, the higher layer parameter nrofReportedRSPerGroup-Opt2 indicates the number of resource indicator(s)/beam metric(s) in each group of resource indicator(s)/beam metric(s) to be reported per reporting setting/in a single reporting instance for the group-based (inter-cell) beam reporting (Option-2 in this disclosure). Here, Q≤Q_max, where Q_max represents the maximum number of resource indicators/beam metrics that can be reported in a group of resource indicators/beam metrics per reporting setting/in a single reporting instance for Option-2 based group-based (inter-cell) beam reporting; for instance, Q_max could be 1, 2, 3 or 4 depending on UE capability reporting. When the field nrofReportedRSPerGroup-Opt2 is absent, the UE could apply the value 1 (i.e., Q=1).

TABLE 11

An example of higher layer parameter CSI-ReportConfig indicating the number of resource indicators/beam metrics to be reported per group for the Option-2 based group-based (inter-cell) beam reporting

```
CSI-ReportConfig ::= SEQUENCE {
    reportConfigId CSI-ReportConfigId,
    carrier ServCellIndex OPTIONAL, -- Need S
    groupBasedBeamReportingMTRP-Opt2 CHOICE {
        ...
        NrofReportedRSPerGroup-Opt2 ENUMERATED {n1, n2, n3, n4} OPTIONAL -- Need S
        ...
    },
    resourcesForChannelMeasurement CSI-ResourceConfigId,
        csi-IM-ResourcesForInterference CSI-ResourceConfigId OPTIONAL, -- Need R
        nzp-CSI-RS-ResourcesForInterference CSI-ResourceConfigId OPTIONAL, -- Need R
        ...
}
```

For the value of Qi (Qi≥1, i=1, 2, ..., N'), in another example, the UE could be indicated by the network, e.g., via higher layer RRC signaling and/or MAC CE command and/or DCI based signaling, the exact value of Qi (Qi≥1, i=1, 2, ..., N'), i.e., the number of resource indicator(s)/beam metric(s) reported in the i-th group of resource indicator(s)/beam metric(s) or/and the group of resource indicator(s)/beam metric(s) with the i-th lowest/highest group index/ID value in a single reporting instance for Option-2 based group-based (inter-cell) beam reporting.

In this example, the values of Qi's (Qi≥1, i=1, 2, ..., N') could be different across/among two or more reported N' groups of resource indicators/beam metrics per reporting setting/in a single reporting instance for Option-2 based group-based (inter-cell) beam reporting. For instance, the UE could be indicated/configured by the network a set of values for Qi (Qi≥1, i=1, 2, ..., N'), and each entry in the set corresponds to one or more reported groups of resource indicators/beam metrics for Option-2 based group-based (inter-cell) beam reporting. The UE could also be indicated by the network the mapping relationship(s)/association rule(s) between the set of values for Qi (Qi≥1, i=1, 2, ..., N') and the reported groups of resource indicators/beam metrics in a single reporting instance for Option-2 based group-based (inter-cell) beam reporting.

The set of values for Qi (Qi≥1, i=1, 2, ..., N') could be indicated/configured in the CSI reporting setting, e.g., via the higher layer parameter CSI-ReportConfig. Here, each value/entry in the set of values for Qi (Qi≥1, i=1, 2, ..., N')≤Q_max, where Q_max represents the maximum number of resource indicators/beam metrics that can be reported in a group of resource indicators/beam metrics per reporting setting/in a single reporting instance for Option-2 based group-based (inter-cell) beam reporting; for instance, Q_max could be 1, 2, 3 or 4 depending on UE capability reporting.

For the value of Qi (Qi≥1, i=1, 2, ..., N'), in yet another example, the UE could be first higher layer configured by the network (e.g., via the higher layer RRC signalling) a list/set/pool of candidate values for the number (Qi (Qi≥1, i=1, 2, ..., N')) of resource indicators/beam metrics to be reported in a given group of resource indicators/beam metrics per reporting setting/in a single reporting instance for Option-2 based group-based (inter-cell) beam reporting, denoted by Q_set. In this example, the value of Qi (Qi≥1, i=1, 2, ..., N') could be common (denoted by Q) for all reported N' groups of resource indicators/beam metrics per reporting setting/in a single reporting instance for Option-2 based group-based (inter-cell) beam reporting. The UE could then receive from the network a MAC CE command activating at least one value from the list/set/pool of candidate values for Qi (Qi≥1, i=1, 2, ..., N') as the number (Qi (Qi≥1, i=1, 2, ..., N')) of resource indicators/beam metrics to be reported in each group of resource indicators/beam metrics per reporting setting/in a single reporting instance for Option-2 based group-based beam reporting for the multi-TRP/inter-cell operation.

For the value of Qi (Qi≥1, i=1, 2, ..., N'), in yet another example, the UE could be first higher layer configured by the network (e.g., via the higher layer RRC signalling) a list/set/pool of candidate values for the number (Qi (Qi≥1, i=1, 2, ..., N')) of resource indicators/beam metrics to be reported in a given group of resource indicators/beam metrics per reporting setting/in a single reporting instance for Option-2 based group-based (inter-cell) beam reporting, denoted by Q_set. In this example, the values of Qi's (Qi≥1, i=1, 2, ..., N') could be different across/among two or more reported N' groups of resource indicators/beam metrics per reporting setting/in a single reporting instance for Option-2 based group-based (inter-cell) beam reporting. The UE could then receive from the network at least one MAC CE command activating at least one value from the list/set/pool of candidate values for Qi (Qi≥1, i=1, 2, ..., N') as the number(s) (Qi (Qi≥1, i=1, 2, ..., N')) of resource indicators/beam metrics to be reported in one or more groups of resource indicators/beam metrics per reporting setting/in a single reporting instance for Option-2 based group-based (inter-cell) beam reporting.

For instance, the UE could receive from the network N' separate MAC CE commands each corresponding to a reported group of resource indicator(s)/beam metric(s) per reporting setting/in a single reporting instance for Option-2 based group-based (inter-cell) beam reporting. Each MAC CE command could activate at least one value from the list/set/pool of candidate values for Qi (Qi≥1, i=1, 2, ..., N') as the number (Qi (Qi≥1, i=1, 2, ..., N')) of resource indicator(s)/beam metric(s) to be reported in the corresponding/associated group of resource indicator(s)/beam metric(s) per reporting setting/in a single reporting instance for Option-2 based group-based beam reporting for the multi-TRP/inter-cell operation.

For the value of Qi (Qi≥1, i=1, 2, ..., N'), in yet another example, the UE could be first higher layer configured by the network (e.g., via the higher layer RRC signalling) a list/set/pool of candidate values for the number (Qi (Qi≥1, i=1, 2, ..., N')) of resource indicators/beam metrics to be reported in a given group of resource indicators/beam metrics per reporting setting/in a single reporting instance for Option-2 based group-based (inter-cell) beam reporting, denoted by Q_set. In this example, the values of Qi's (Qi≥1, i=1, 2, ..., N') could be common for all reported N' groups of resource indicators/beam metrics per reporting setting/in a single reporting instance for Option-2 based group-based (inter-cell) beam reporting. The UE could then receive from the network a bitmap with each entry/bit in the bitmap corresponding to a value in the list/set/pool of candidate values for Qi (Qi≥1, i=1, 2, ..., N'). If an entry/bit in the bitmap is set to "1", the corresponding/associated value in the list/set/pool of candidate values for Qi (Qi≥1, i=1, 2, ..., N') is activated as the number (Qi (Qi≥1, i=1, 2, ..., N')) of resource indicator(s)/beam metric(s) to be reported in each group of resource indicator(s)/beam metric(s) per reporting setting/in a single reporting instance for Option-2 based group-based beam reporting for the multi-TRP/inter-cell operation.

For the value of Qi (Qi≥1, i=1, 2, ..., N'), in yet another example, the UE could be first higher layer configured by the network (e.g., via the higher layer RRC signalling) a list/set/pool of candidate values for the number (Qi (Qi≥1, i=1, 2, ..., N')) of resource indicators/beam metrics to be reported in a given group of resource indicators/beam metrics per reporting setting/in a single reporting instance for Option-2 based group-based (inter-cell) beam reporting, denoted by Q_set. In this example, the values of Qi's (Qi≥1, i=1, 2, ..., N') could be different across/among two or more reported N' groups of resource indicators/beam metrics per reporting setting/in a single reporting instance for Option-2 based group-based (inter-cell) beam reporting. The UE could then receive from the network at least one bitmap for one or more groups of resource indicators/beam metrics to be reported per reporting setting/in a single reporting instance; each entry/bit in the bitmap corresponds to a value in the list/set/pool of candidate values for Qi (Qi≥1, i=1, 2, ..., N').

If an entry/bit in a bitmap is set to "1", the corresponding/associated value in the list/set/pool of candidate values for Qi (Qi≥1, i=1, 2, . . . , N') is activated as the number (Qi (Qi≥1, i=1, 2, . . . , N')) of resource indicator(s)/beam metric(s) to be reported in the corresponding/associated group(s) of resource indicators/beam metrics per reporting setting/in a single reporting instance for Option-2 based group-based (inter-cell) beam reporting. For instance, the UE could receive from the network N' separate bitmaps each corresponding to a reported group of resource indicator(s)/beam metric(s) per reporting setting/in a single reporting instance for Option-2 based group-based (inter-cell) beam As can be seen from TABLE 12, the higher layer parameter groupBasedBeamReportingMTRP-Opt2, could be configured/used to turn on/off the Option-2 based group-based beam reporting for the multi-TRP/inter-cell operation, and within/under groupBasedBeamReportingMTRP-Opt2, the higher layer parameter maxnrofReportedGroup-Opt2 indicates the maximum number (N'_max) of groups of resource indicators/beam metrics that can be reported per reporting setting/in a single reporting instance for the group-based (inter-cell) beam reporting (Option-2 in this disclosure). When the field maxnrofReportedGroup-Opt2 is absent, the UE could apply the value 2 (i.e., N'_max=2).

TABLE 12

An example of higher layer parameter CSI-ReportConfig indicating the maximum number of groups of resource indicators/beam metrics to be reported for the Option-2 based group-based (inter-cell) beam reporting

```
CSI-ReportConfig ::= SEQUENCE {
    reportConfigId CSI-ReportConfigId,
    carrier ServCellIndex OPTIONAL, -- Need S
    groupBasedBeamReportingMTRP-Opt2 CHOICE {
        ...
        MaxnrofReportedGroup-Opt2 ENUMERATED {n2, n3, n4} OPTIONAL -- Need S
        ...
    },
    resourcesForChannelMeasurement CSI-ResourceConfigId,
        csi-IM-ResourcesForInterference CSI-ResourceConfigId OPTIONAL, -- Need R
        nzp-CSI-RS-ResourcesForInterference CSI-ResourceConfigId OPTIONAL, -- Need R
    ...
}
``` reporting. Each bitmap could activate at least one value from the list/set/pool of candidate values for Qi (Qi≥1, i=1, 2, . . . , N') as the number (Qi (Qi≥1, i=1, 2, . . . , N')) of resource indicators/beam metrics to be reported in the corresponding/associated group of resource indicators/beam metrics per reporting setting/in a single reporting instance for Option-2 based group-based beam reporting for the multi-TRP/inter-cell operation.

For Option-2 based group-based (inter-cell) beam reporting, the UE could be configured/indicated by the network to report to the network per reporting setting/in a single reporting instance up to N'_max (N'_max>1) groups of resource indicators/beam metrics with each group of resource indicator(s)/beam metric(s) including up to Q_max (Q_max≥1) resource indicator(s)/beam metric(s); the indication of the value(s) of N'_max/Q_max could be via higher layer (RRC) or/and MAC CE or/and DCI based signaling or/and any combination of at least two of RRC, MAC CE and DCI based signaling; the indication of the value(s) of N'_max/Q_max could be via a separate (dedicated) parameter or joint with another parameter.

For the value of N'_max, in one example, the UE could be indicated by the network, e.g., via higher layer RRC signaling and/or MAC CE command and/or DCI based signaling, the exact value of N'_max, i.e., the maximum number of groups of resource indicators/beam metrics that can be reported in a single reporting instance for Option-2 based group-based (inter-cell) beam reporting. For instance, the candidate values for N'_max could be {2, 3, 4}, and the indication/configuration of the exact value of N'_max could be based on UE's capability/preference signaling. The exact value of N'_max could be indicated/configured in the CSI reporting setting, e.g., via the higher layer parameter CSI-ReportConfig, which is presented in TABLE 12.

For the value of N'_max, in another example, the UE could be first higher layer configured by the network (e.g., via the higher layer RRC signalling) a list/set/pool of candidate values for the maximum number (N'_max) of resource indicator(s)/beam metric(s) that can be reported per reporting setting/in a single reporting instance for Option-2 based group-based (inter-cell) beam reporting, denoted by N'_max_set (e.g., N'_max_set={2, 3, 4}). The UE could then receive from the network a MAC CE command activating at least one value from the list/set/pool of candidate values for N'_max as the maximum number (N'_max) of groups of resource indicators/beam metrics that can be reported per reporting setting/in a single reporting instance for Option-2 based group-based (inter-cell) beam reporting for the multi-TRP operation.

For the value of N'_max, in yet another example, the UE could be first higher layer configured by the network (e.g., via the higher layer RRC signalling) a list/set/pool of candidate values for the maximum number (N'_max) of groups of resource indicators/beam metrics that can be reported per reporting setting/in a single reporting instance for Option-2 based group-based (inter-cell) beam reporting, denoted by N'_max_set (e.g., N'_max_set={2, 3, 4}). The UE could then receive from the network a bitmap with each entry/bit in the bitmap corresponding to a value in the list/set/pool of candidate values for N'_max. If an entry/bit in the bitmap is set to "1", the corresponding/associated value in the list/set/pool of candidate values for N'_max is activated as the maximum number (N'_max) of groups of resource indicators/beam metrics that can be reported per reporting setting/in a single reporting instance for Option-2 based group-based beam reporting for the multi-TRP/inter-cell operation.

For the value of Q_max, in one example, the UE could be indicated by the network, e.g., via higher layer RRC signaling and/or MAC CE command and/or DCI based signaling, the exact value of Q_max, i.e., the maximum number of resource indicator(s)/beam metric(s) that can be reported in a group of resource indicator(s)/beam metric(s) in a single reporting instance for Option-2 based group-based (inter-cell) beam reporting. For instance, the candidate values for Q_max could be {1, 2, 3, 4}, and the indication/configuration of the exact value of Q_max could be based on UE's capability/preference signaling. The exact value of Q_max could be indicated/configured in the CSI reporting setting, e.g., via the higher layer parameter CSI-ReportConfig, which is presented in TABLE 13.

As can be seen from TABLE 13, the higher layer parameter groupBasedBeamReportingMTRP-Opt2, could be configured/used to turn on/off the Option-2 based group-based beam reporting for the multi-TRP/inter-cell operation, and within/under groupBasedBeamReportingMTRP-Opt2, the higher layer parameter maxnrofReportedRSPerGroup-Opt2 indicates the maximum number (Q_max) of resource indicator(s)/beam metric(s) that can be reported in a group of resource indicator(s)/beam metric(s) per reporting setting/in a single reporting instance for the group-based (inter-cell) beam reporting (Option-2 in this disclosure). When the field maxnrofReportedRSPerGroup-Opt2 is absent, the UE could apply the value 1 (i.e., Q_max=1).

cell) beam reporting, denoted by Q_max_set. The UE could then receive from the network a bitmap with each entry/bit in the bitmap corresponding to a value in the list/set/pool of candidate values for Q_max. If an entry/bit in the bitmap is set to "1", the corresponding/associated value in the list/set/pool of candidate values for Q_max is activated as the maximum number (Q_max) of resource indicator(s)/beam metric(s) that can be reported in a group of resource indicator(s)/beam metric(s) per reporting setting/in a single reporting instance for Option-2 based group-based beam reporting for the multi-TRP/inter-cell operation.

Figure 15:
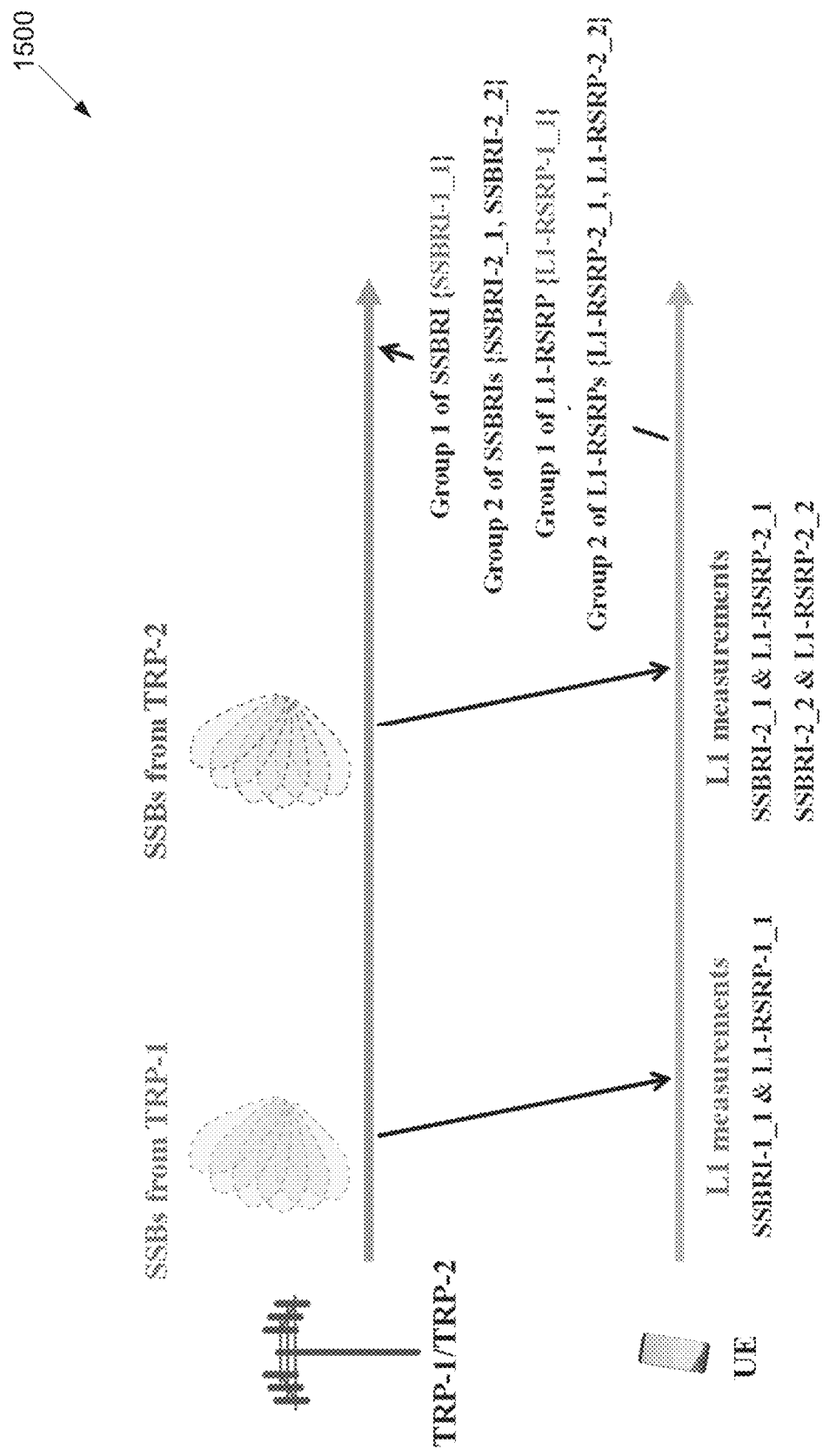
FIG. 15 illustrates an example of beam measurement and group-based beam reporting for multi-TRP system according to embodiments of the present disclosure.

FIG. 15 illustrates an example of beam measurement and group-based beam reporting for multi-TRP system 1500 according to embodiments of the present disclosure. An embodiment of the beam measurement and group-based beam reporting for multi-TRP system 1500 shown in FIG. 15 is for illustration only.

In FIG. 15, an Option-2 based group-based beam reporting design for a wireless communications system comprising of two TRPs, TRP-1 and TRP-2 in FIG. 8, is illustrated, wherein the two TRPs TRP-1 and TRP-2 could be associated with the same PCI/PCI index (e.g., either the serving cell PCI/PCI index or a PCI/PCI index different from the serving cell PCI/PCI index) or different PCIs/PCI indexes including at least a PCI/PCI index different from the serving cell

TABLE 13

An example of higher layer parameter CSI-ReportConfig indicating the maximum number of resource indicators/beam metrics to be reported per group for the Option-2 based group-based (inter-cell) beam reporting

```
CSI-ReportConfig ::= SEQUENCE {
  reportConfigId CSI-ReportConfigId,
  carrier ServCellIndex OPTIONAL, -- Need S
  groupBasedBeamReportingMTRP-Opt2 CHOICE {
    ...
    MaxnrofReportedRSPerGroup-Opt2 ENUMERATED {n1, n2, n3, n4} OPTIONAL -- Need S
    ...
  },
  resourcesForChannelMeasurement CSI-ResourceConfigId,
    csi-IM-ResourcesForInterference CSI-ResourceConfigId OPTIONAL, -- Need R
    nzp-CSI-RS-ResourcesForInterference CSI-ResourceConfigId OPTIONAL, -- Need R
  ...
}
```

In another example, the UE could be first higher layer configured by the network (e.g., via the higher layer RRC signalling) a list/set/pool of candidate values for the maximum number (Q_max) of resource indicator(s)/beam metric(s) that can be reported in a group of resource indicator(s)/beam metric(s) per reporting setting/in a single reporting instance for Option-2 based group-based (inter-cell) beam reporting, denoted by Q_max_set (e.g., Q_max_set={1, 2, 3, 4}). The UE could then receive from the network a MAC CE command activating at least one value from the list/set/pool of candidate values for Q_max as the maximum number (Q_max) of resource indicator(s)/beam metric(s) that can be reported in a group of resource indicator(s)/beam metric(s) per reporting setting/in a single reporting instance for Option-2 based group-based beam reporting for the multi-TRP/inter-cell operation.

In yet another example, the UE could be first higher layer configured by the network (e.g., via the higher layer RRC signalling) a list/set/pool of candidate values for the maximum number (Q_max) of resource indicator(s)/beam metric(s) that can be reported in a group of resource indicator(s)/beam metric(s) per reporting setting/in a single reporting instance for Option-2 based group-based (inter- PCI/PCI index. In this example, the UE reports in a single reporting instance two groups (N'=2) of SSBRIs. The first group comprises of one (Q1=1) SSBRI for TRP-1, and the second group comprises of two (Q2=2) SSBRIs for TRP-2.

As can be seen from FIG. 15, the UE reports SSBRI-1_1 for TRP-1 in Group 1 of SSBRI, and SSBRI-2_1 and SSBRI-2_2 for TRP-2 in Group 2 of SSBRIs. According to the design principle of the Option-2 based group-based (inter-cell) beam reporting, this also implies that the UE could simultaneously receive the SSB beams corresponding to SSBRI-1_1 and SSBRI-2_1, or the SSB beams corresponding to SSBRI-1_1 and SSBRI-2_2, using either a single spatial domain receive filter or multiple spatial domain receive filters. The UE also reports L1-RSRP-1_1 (corresponding to SSBRI-1_1) in Group 1 of L1-RSRP, and L1-RSRP-2_1 (corresponding to SSBRI-2_1) and L1-RSRP-2_2 (corresponding to SSBRI-2_2) in Group 2 of L1-RSRPs.

For Option-2 based group-based (inter-cell) beam reporting, the resource indicators within the same group of resource indicators could be of the same type, such as SSBRIs (as shown in FIG. 15) or CRIs. The resource indicators within the same group of resource indicators could be of different types or a mixture of different types such as SSBRIs and CRIs. Furthermore, the resource indicators among/across different groups of resource indicators could be of the same type, such as SSBRIs or CRIs. The resource indicators among/across different groups of resource indicators could be of different types or a mixture of different types such as SSBRIs and CRIs.

For instance, for a wireless system comprising of two TRPs (TRP-1 and TRP-2 in FIG. 8) wherein the two TRPs TRP-1 and TRP-2 could be associated with the same PCI/PCI index (e.g., either the serving cell PCI/PCI index or a PCI/PCI index different from the serving cell PCI/PCI index) or different PCIs/PCI indexes including at least a PCI/PCI index different from the serving cell PCI/PCI index, the UE could report in a single reporting instance two groups of resource indicators with a SSBRI in the first reported group of resource indicator for TRP-1 and a CRI in the second reported group of resource indicator for TRP-2. Similarly, the beam metrics reported within the same group of beam metrics could be of the same type, such as L1-RSRPs (as shown in FIG. 15) or L1-SINRs. The beam metrics within the same group of beam metrics could be of different types or a mixture of different types such as L1-RSRPs and L1-SINRs.

Furthermore, the beam metrics reported among/across different groups of beam metrics could be of the same type, such as L1-RSRPs or L1-SINR. The beam metrics reported among/across different groups of beam metrics could be of different types or a mixture of different types such as L1-RSRPs and L1-SINRs. For instance, for a wireless system comprising of two TRPs (TRP-1 and TRP-2 in FIG. 8) wherein the two TRPs TRP-1 and TRP-2 could be associated with the same PCI/PCI index (e.g., either the serving cell PCI/PCI index or a PCI/PCI index different from the serving cell PCI/PCI index) or different PCIs/PCI indexes including at least a PCI/PCI index different from the serving cell PCI/PCI index, the UE could report in a single reporting instance two groups of beam metrics with a L1-RSRP in the first reported group of beam metric for TRP-1 and a L1-SINR in the second reported group of beam metric for TRP-2.

The UE could be indicated/configured by the network the type(s) of the resource indicators in each group of resource indicators to be reported in a single reporting instance. For instance, for N'=2 groups of resource indicators to be reported in a single reporting instance with each group containing a single resource indicator (i.e., Q1=Q2=1), the UE could be indicated/configured by the network to report a SSBRI for TRP-1 as the resource indicator in the first group of resource indicator and a CRI for TRP-2 as the resource indicator in the second group of resource indicator.

For N'>1 groups of resource indicators to be reported in a single reporting instance, in one example, the UE could be explicitly indicated/configured by the network, e.g., via the field reportQuantity in the higher layer parameter CSI-ReportConfig, the type(s) of the resource indicators to be reported in the N'>1 groups of resource indicators. For instance, for Q1=Q2=1, the UE could be indicated/configured by the network, e.g., via reportQuantity in CSI-ReportConfig, to report {SSBRI, SSBRI} or {SSBRI, CRI} or {CRI, SSBRI} or {CRI, CRI} for the resource indicator in the first group of resource indicator and the resource indicator in the second group of resource indicator to be reported.

For N'>1 groups of resource indicators to be reported in a single reporting instance, in another example, the UE could be first configured/indicated by the network one or more combinations of the type(s) of the resource indicators to be reported in the N'>1 groups of resource indicators.

For example, the UE could be explicitly configured/indicated by the network the combination(s) of the type(s) of the resource indicators that can be reported in the N'>1 groups of resource indicators.

For another example, the UE could be first higher layer configured by the network (e.g., via higher layer RRC signaling) a list/set/pool of all combinations of the type(s) of the resource indicators that can be reported in N'>1 groups of resource indicators. The UE could then receive from the network a MAC CE command activating one or more combinations of the type(s) of the resource indicators from the higher layer configured list/set/pool of all combinations of the type(s) of the resource indicators that can be reported in the N'>1 groups of resource indicators.

For yet another example, the UE could be first higher layer configured by the network (e.g., via higher layer RRC signaling) a list/set/pool of all combinations of the type(s) of the resource indicators that can be reported in N'>1 groups of resource indicators. The UE could then receive from the network a bitmap with each entry/bit in the bitmap corresponding to a combination of the type(s) of the resource indicators from the higher layer configured list/set/pool of all combinations of the type(s) of the resource indicators that can be reported in the N'>1 groups of resource indicators. If an entry/bit in the bitmap is set to "1", the corresponding/associated combination of the type(s) of the resource indicators from the list/set/pool of all combinations of the type(s) of the resource indicators that can be reported in the N'>1 groups of resource indicators is activated. The bitmap could include at least one "1".

The UE could then receive from the network at least one indicator to indicate at least one combination of the type(s) of the resource indicators to be reported in the N'>1 groups of resource indicators from the configured/indicated combination(s) of the type(s) of the resource indicators that can be reported in N'>1 groups of resource indicators. For instance, for Q1=Q2=1, if the configured/indicated combinations of the type(s) of the resource indicators that can be reported in N'=2 groups of resource indicators are {SSBRI, SSBRI} and {SSBRI, CRI} and {CRI, SSBRI} and {CRI, CRI}, each combination of the type(s) of the resource indicators could correspond to a state of a 2-bit indicator, which are "00"—{SSBRI, SSBRI}, "01"—{SSBRI, CRI}, "10"—{CRI, SSBRI} and "11"—{CRI, CRI}. The 2-bit indicator could indicate to the UE a state, e.g., "00"—{SSBRI, SSBRI}, out of the four states as the type(s) of the resource indicators to be reported in the N'=2 groups of resource indicators; i.e., the UE could report to the network in a single reporting instance a SSBRI in the first group of resource indicator and a CRI in the second group of resource indicator.

Alternatively, the UE could receive from the network a MAC CE command activating at least one combination of the type(s) of the resource indicators to be reported in the N'>1 groups of resource indicators from the configured/indicated combination(s) of the type(s) of the resource indicators that can be reported in the N'>1 group of resource indicators. The UE could also receive from the network a bitmap with each entry/bit in the bitmap corresponding to a configured/indicated combination of the type(s) of the resource indicators that can be reported in the N'>1 groups of resource indicators; if an entry/bit in the bitmap is set to "1", the corresponding/associated combination of the type(s) of the resource indicators from the configured/indicated combination(s) of the type(s) of the resource indicators that can be reported in the N'>1 groups of resource indicators is activated; the bitmap could contain at least one "1".

The UE could be indicated/configured by the network the type(s) of the beam metrics in each group of beam metrics to be reported in a single reporting instance. For instance, for N'=2 groups of beam metrics to be reported in a single reporting instance with each group containing a single beam metric (i.e., Q1=Q2=1), the UE could be indicated/configured by the network to report a L1-RSRP for TRP-1 as the beam metric in the first group of beam metric and a L1-SINR for TRP-2 as the beam metric in the second group of beam metric.

For N'>1 groups of beam metrics to be reported in a single reporting instance, in one example, the UE could be explicitly indicated/configured by the network, e.g., via the field reportQuantity in the higher layer parameter CSI-Report-Config, the type(s) of the beam metrics to be reported in the N'>1 groups of beam metrics. For instance, for Q1=Q2=1, the UE could be indicated/configured by the network, e.g., via reportQuantity in CSI-ReportConfig, to report {L1-RSRP, L1-RSRP} or {L1-RSRP, L1-SINR} or {L1-SINR, L1-RSRP} or {L1-SINR, L1-SINR} for the beam metric in the first group of beam metric and the beam metric in the second group of beam metric to be reported.

For N'>1 groups of beam metrics to be reported in a single reporting instance, in another example, the UE could be first configured/indicated by the network one or more combinations of the type(s) of the beam metrics to be reported in the N'>1 groups of beam metrics.

For example, the UE could be explicitly configured/indicated by the network the combination(s) of the type(s) of the beam metrics that can be reported in the N'>1 groups of beam metrics.

For another example, the UE could be first higher layer configured by the network (e.g., via higher layer RRC signaling) a list/set/pool of all combinations of the type(s) of the beam metrics that can be reported in N'>1 groups of beam metrics. The UE could then receive from the network a MAC CE command activating one or more combinations of the type(s) of the beam metrics from the higher layer configured list/set/pool of all combinations of the type(s) of the beam metrics that can be reported in the N'>1 groups of beam metrics.

For yet another example, the UE could be first higher layer configured by the network (e.g., via higher layer RRC signaling) a list/set/pool of all combinations of the type(s) of the beam metrics that can be reported in N'>1 groups of beam metrics. The UE could then receive from the network a bitmap with each entry/bit in the bitmap corresponding to a combination of the type(s) of the beam metrics from the higher layer configured list/set/pool of all combinations of the type(s) of the beam metrics that can be reported in the N'>1 groups of beam metrics. If an entry/bit in the bitmap is set to "1", the corresponding/associated combination of the type(s) of the beam metrics from the list/set/pool of all combinations of the type(s) of the beam metrics that can be reported in the N'>1 groups of beam metrics is activated. The bitmap could include at least one "1".

The UE could then receive from the network at least one indicator to indicate at least one combination of the type(s) of the beam metrics to be reported in the N'>1 groups of beam metrics from the configured/indicated combination(s) of the type(s) of the beam metrics that can be reported in N'>1 groups of beam metrics. For instance, for Q1=Q2=1, if the configured/indicated combinations of the type(s) of the beam metrics that can be reported in N'=2 groups of beam metrics are {L1-RSRP, L1-RSRP} and {L1-RSRP, L1-SINR} and {L1-SINR, L1-RSRP} and {L1-SINR, L1-SINR}, each combination of the type(s) of the beam metrics could correspond to a state of a 2-bit indicator, which are "00"—{L1-RSRP, L1-RSRP}, "01"—{L1-RSRP, L1-SINR}, "10"—{L1-SINR, L1-RSRP} and "11"—{L1-SINR, L1-SINR}.

The 2-bit indicator could indicate to the UE a state, e.g., "00"—{L1-RSRP, L1-RSRP}, out of the four states as the type(s) of the beam metrics to be reported in the N'=2 groups of beam metrics; i.e., the UE could report to the network in a single reporting instance a L1-RSRP in the first group of beam metric and a L1-RSRP in the second group of beam metric.

Alternatively, the UE could receive from the network a MAC CE command activating at least one combination of the type(s) of the beam metrics to be reported in the N'>1 groups of beam metrics from the configured/indicated combination(s) of the type(s) of the beam metrics that can be reported in the N'>1 groups of beam metrics. The UE could also receive from the network a bitmap with each entry/bit in the bitmap corresponding to a configured/indicated combination of the type(s) of the beam metrics that can be reported in the N'>1 groups of beam metrics; if an entry/bit in the bitmap is set to "1", the corresponding/associated combination of the type(s) of the beam metrics from the configured/indicated combination(s) of the type(s) of the beam metrics that can be reported in the N'>1 groups of beam metrics is activated; the bitmap could contain at least one "1".

The UE could be indicated/configured by the network the type(s) of both the resource indicators and the beam metrics in each group of resource indicators/beam metrics to be reported in a single reporting instance. For instance, for N'=2 groups of resource indicators/beam metrics to be reported in a single reporting instance with each group containing a single resource indicator/beam metric (i.e., Q1=Q2=1), the UE could be indicated/configured by the network to report a SSBRI and a L1-RSRP for TRP-1 as the resource indicator in the first group of resource indicator and as the beam metric in the first group of beam metric, and a CRI and a L1-SINR for TRP-2 as the resource indicator in the second group of resource indicator and as the beam metric in the second group of beam metric.

For N'>1 groups of resource indicators/beam metrics to be reported in a single reporting instance, in one example, the UE could be explicitly indicated/configured by the network, e.g., via the field reportQuantity in the higher layer parameter CSI-ReportConfig, the type(s) of both the resource indicators and the beam metrics to be reported in the N'>1 groups of resource indicators/beam metrics. For instance, for Q1=Q2=1, the UE could be indicated/configured by the network, e.g., via reportQuantity in CSI-ReportConfig, to report {SSBRI and L1-RSRP, SSBRI and L1-RSRP} or {SSBRI and L1-RSRP, SSBRI and L1-SINR} or {SSBRI and L1-RSRP, CRI and L1-RSRP} or {SSBRI and L1-RSRP, CRI and L1-SINR} or {SSBRI and L1-SINR, SSBRI and L1-SINR} or {SSBRI and L1-SINR, SSBRI and L1-RSRP} or {SSBRI and L1-SINR, CRI and L1-RSRP} or {SSBRI and L1-SINR, CRI and L1-SINR} or {CRI and L1-RSRP, SSBRI and L1-SINR} or {CRI and L1-RSRP, SSBRI and L1-RSRP} or {CRI and L1-RSRP, CRI and L1-RSRP} or {CRI and L1-RSRP, CRI and L1-SINR} or {CRI and L1-SINR, SSBRI and L1-SINR} or {CRI and L1-SINR, SSBRI and L1-RSRP} or {CRI and L1-SINR, CRI and L1-RSRP} or {CRI and L1-SINR, CRI and L1-SINR} for the resource indicator/beam metric in the first group of resource indicator/beam metric and the resource indicator/beam metric in the second group of resource indicator/beam metric to be reported.

For N'>1 groups of resource indicators/beam metrics to be reported in a single reporting instance, in another example, the UE could be first configured/indicated by the network one or more combinations of the type(s) of both the resource indicators and the beam metrics to be reported in the N'>1 groups of resource indicators/beam metrics.

For example, the UE could be explicitly configured/indicated by the network the combination(s) of the type(s) of both the resource indicators and the beam metrics that can be reported in the N'>1 groups of resource indicators/beam metrics.

For another example, the UE could be first higher layer configured by the network (e.g., via higher layer RRC signaling) a list/set/pool of all combinations of the type(s) of both the resource indicators and the beam metrics that can be reported in N'>1 groups of resource indicators/beam metrics. The UE could then receive from the network a MAC CE command activating one or more combinations of the type(s) of both the resource indicators and the beam metrics from the higher layer configured list/set/pool of all combinations of the type(s) of both the resource indicators and the beam metrics that can be reported in the N'>1 groups of resource indicators/beam metrics.

For yet another example, the UE could be first higher layer configured by the network (e.g., via higher layer RRC signaling) a list/set/pool of all combinations of the type(s) of both the resource indicators and the beam metrics that can be reported in N'>1 groups of resource indicators/beam metrics. The UE could then receive from the network a bitmap with each entry/bit in the bitmap corresponding to a combination of the type(s) of both the resource indicators and the beam metrics from the higher layer configured list/set/pool of all combinations of the type(s) of both the resource indicators and the beam metrics that can be reported in the N'>1 groups of resource indicators/beam metrics. If an entry/bit in the bitmap is set to "1", the corresponding/associated combination of the type(s) of both the resource indicators and the beam metrics from the list/set/pool of all combinations of the type(s) of both the resource indicators and the beam metrics that can be reported in the N'>1 groups of resource indicators/beam metrics is activated. The bitmap could include at least one "1".

The UE could then receive from the network at least one indicator to indicate at least one combination of the type(s) of both the resource indicators and the beam metrics to be reported in the N'>1 groups of resource indicators/beam metrics from the configured/indicated combination(s) of the type(s) of both the resource indicators and the beam metrics that can be reported in N'>1 groups of resource indicators/beam metrics.

For instance, for Q1=Q2=1, if the configured/indicated combinations of the type(s) of both the resource indicators and the beam metrics that can be reported in N'>1 groups of resource indicators/beam metrics are {SSBRI and L1-RSRP, SSBRI and L1-RSRP} and {SSBRI and L1-RSRP, SSBRI and L1-SINR} and {SSBRI and L1-RSRP, CRI and L1-RSRP} and {SSBRI and L1-RSRP, CRI and L1-SINR} and {SSBRI and L1-SINR, SSBRI and L1-SINR} and {SSBRI and L1-SINR, SSBRI and L1-RSRP} and {SSBRI and L1-SINR, CRI and L1-RSRP} and {SSBRI and L1-SINR, CRI and L1-SINR} and {CRI and L1-RSRP, SSBRI and L1-SINR} and {CRI and L1-RSRP, SSBRI and L1-RSRP} and {CRI and L1-RSRP, CRI and L1-RSRP} and {CRI and L1-RSRP, CRI and L1-SINR} and {CRI and L1-SINR, SSBRI and L1-SINR} and {CRI and L1-SINR, SSBRI and L1-RSRP} and {CRI and L1-SINR, CRI and L1-RSRP} and {CRI and L1-SINR, CRI and L1-SINR}, each combination of the type(s) of both the resource indicators and the beam metrics could correspond to a state of a 4-bit indicator, which are "0000"—{SSBRI and L1-RSRP, SSBRI and L1-RSRP} and "0001"—{SSBRI and L1-RSRP, SSBRI and L1-SINR} and "0010"—{SSBRI and L1-RSRP, CRI and L1-RSRP} and "0011"—{SSBRI and L1-RSRP, CRI and L1-SINR} and "0100"—{SSBRI and L1-SINR, SSBRI and L1-SINR} and "0101"—{SSBRI and L1-SINR, SSBRI and L1-RSRP} and "0110"—{SSBRI and L1-SINR, CRI and L1-RSRP} and "0111"—{SSBRI and L1-SINR, CRI and L1-SINR} and "1000"—{CRI and L1-RSRP, SSBRI and L1-SINR} and "1001"—{CRI and L1-RSRP, SSBRI and L1-RSRP} and "1010"—{CRI and L1-RSRP, CRI and L1-RSRP} and "1011"—{CRI and L1-RSRP, CRI and L1-SINR} and "1100"—{CRI and L1-SINR, SSBRI and L1-SINR} and "1101"—{CRI and L1-SINR, SSBRI and L1-RSRP} and "1110"—{CRI and L1-SINR, CRI and L1-RSRP} and "1111"—{CRI and L1-SINR, CRI and L1-SINR}. The 4-bit indicator could indicate to the UE a state, e.g., "0000"—{SSBRI and L1-RSRP, SSBRI and L1-RSRP}, out of the 16 states as the type(s) of both the resource indicators and the beam metrics to be reported in the N'>1 groups of resource indicators/beam metrics; i.e., the UE could report to the network in a single reporting instance a SSBRI in the first group of resource indicator/a L1-RSRP in the first group of beam metric and a SSBRI in the second group of resource indicator/a L1-RSRP in the second group of beam metric.

Alternatively, the UE could receive from the network a MAC CE command activating at least one combination of the type(s) of both the resource indicators and the beam metrics to be reported in the N'>1 groups of resource indicators/beam metrics from the configured/indicated combination(s) of the type(s) of the resource indicators/beam metrics that can be reported in the N'>1 groups of resource indicators/beam metrics. The UE could also receive from the network a bitmap with each entry/bit in the bitmap corresponding to a configured/indicated combination of the type(s) of both the resource indicators and the beam metrics that can be reported in the N'>1 groups of resource indicators/beam metrics; if an entry/bit in the bitmap is set to "1", the corresponding/associated combination of the type(s) of both the resource indicators and the beam metrics from the configured/indicated combination(s) of the type(s) of both the resource indicators and the beam metrics that can be reported in the N'>1 groups of resource indicators/beam metrics is activated; the bitmap could contain at least one "1".

The Option-2 based group-based (inter-cell) beam report could include two parts. Part 1 of the beam report could have a fixed payload size (in terms of the number of bits) and could be used to identify/indicate the size of the payload in Part 2 of the beam report. Part 1 of the beam report may be transmitted in its entirety before the transmission of Part 2 of the beam report. In one example, Part 2 of the beam report can be absent. When absent, the group-based beam report is via Part 1 only (i.e., one part UCI), and when present, the group-based beam report is via both Part 1 and Part 2 (i.e., two-part UCI). In one example, Part 2 of the beam report is always present, but it's payload could vary depending on the information in Part 1.

The resource indicators in Part 1 or Part 2 of the beam report could be associated with the same PCI/PCI index (e.g., either the serving cell PCI/PCI index or a PCI different from the serving cell PCI/PCI index) according to those specified in the example-I, example-II or example-III in the present disclosure. For the inter-cell operation, the resource indicators in Part 1 or Part 2 of the beam report could be associated with different PCIs/PCI indexes including the serving cell PCI/PCI index and at least one PCI/PCI index different from the serving cell PCI/PCI index according to those specified in the example-H, example-L, example-J or example-K in the present disclosure In the following, various design schemes of the Option-2 based two-part group-based (inter-cell) beam reporting are illustrated.

Scheme-2.1: Part 1 of the beam report includes at least one of the following: two groups of resource indicators (such as SSBRIs and/or CRIs) denoted by Group A of resource indicator(s) and Group B of resource indicator(s), two groups of beam metrics (such as L1-RSRPs and/or L1-SINRs), denoted by Group A of beam metric(s) and Group B of beam metric(s), corresponding to Group A of resource indicator(s) and Group B of resource indicator(s) respectively, and a first indicator (denoted by indicator-a) to indicate the number of groups of resource indicators/beam metrics in Part 2 of the beam report.

For instance, indicator-a could correspond to the exact value of (N'−2), which can be dynamically changed/configured/determined by the UE. As discussed above, the UE could autonomously determine/select the exact value of N', e.g., from a set of possible values for N' configured/indicated by the network. For instance, if indicator-a=2 (N'=4), 2 groups of resource indicators and 2 groups of beam metrics corresponding to the 2 groups of resource indicators are included in Part 2 of the beam report. If indicator-a=0 (N'=2), Part 2 of the beam report would be absent, i.e., no resource indicators/beam metrics are reported in Part 2 of the beam report.

Further, for the j-th group of resource indicator(s)/beam metric(s) reported in Part 2 of the beam report (j=1, 2, . . . , N'−2), a second indicator (denoted by indicator-b_j) to indicate the number of resource indicator(s)/beam metric(s) in the j-th group of resource indicator(s)/beam metric(s) (i.e., Qj) could also be incorporated/included into Part 1 of the beam report. Hence, a total of (N'−2) second indicators could be reported/included in Part 1 of the beam report. Part 1 of the beam report could also include the indications of the number of resource indicator(s)/beam metric(s) in Group A of resource indicator(s)/beam metric(s) and/or the number of resource indicator(s)/beam metric(s) in Group B of resource indicator(s)/beam metric(s). Part 2 of the beam report includes at least one of the following: (N'−2) groups of resource indicators and (N'−2) groups of beam metrics corresponding to the (N'−2) groups of resource indicators.

Figure 16:
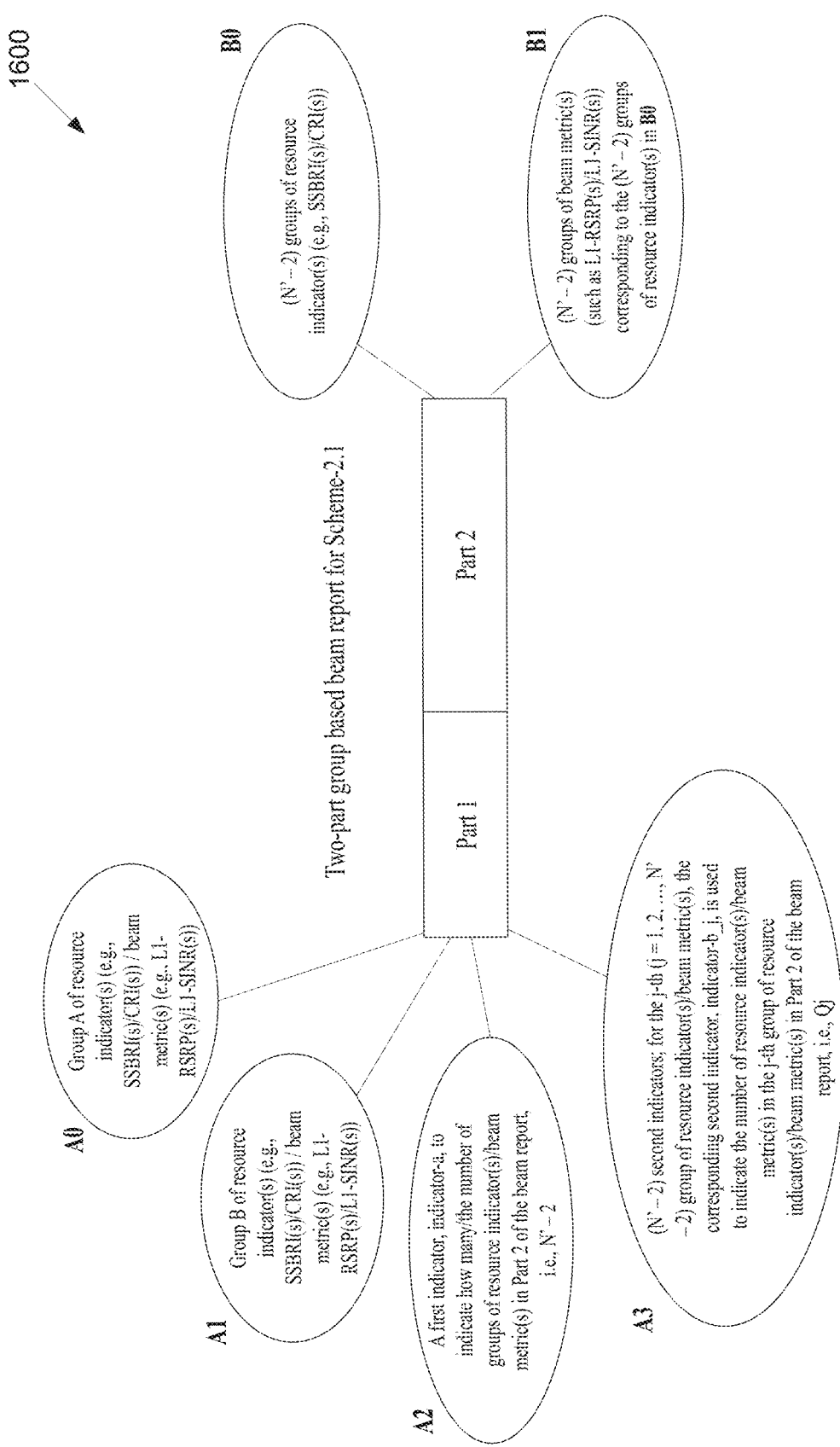
FIG. 16 illustrates an example of design example for two-part group-based beam reporting according to embodiments of the present disclosure.

FIG. 16 illustrates an example of design example for two-part group-based beam reporting 1600 according to embodiments of the present disclosure. An embodiment of the design example for two-part group-based beam reporting 1600 shown in FIG. 16 is for illustration only.

In FIG. 16, a design example of the two-part group-based beam reporting strategy for Scheme-2.1 is illustrated. As can be seen from FIG. 16, if indicator-a=0, A2 and A3 in Part 1 of the beam report would be absent, and Part 2 of the beam report would be absent.

Scheme-2.2: the key components of the two-part group-based beam reporting strategy in Scheme-2.2 are similar to those in Scheme-2.1 except that in Scheme-2.2, a first indicator (denoted by indicator-A) to indicate the total number of groups of resource indicators/beam metrics in both Part 1 and Part 2 of the beam report, i.e., N', is incorporated/included in Part 1 of the beam report. One example of the two-part group-based beam report for Scheme-2.2 is presented in FIG. 17. It is evident from FIG. 17 that if indicator-A=2 (implying that N'=2), A2 and A3 in Part 1 of the beam report would be absent, and Part 2 of the beam report would be absent.

Figure 17:
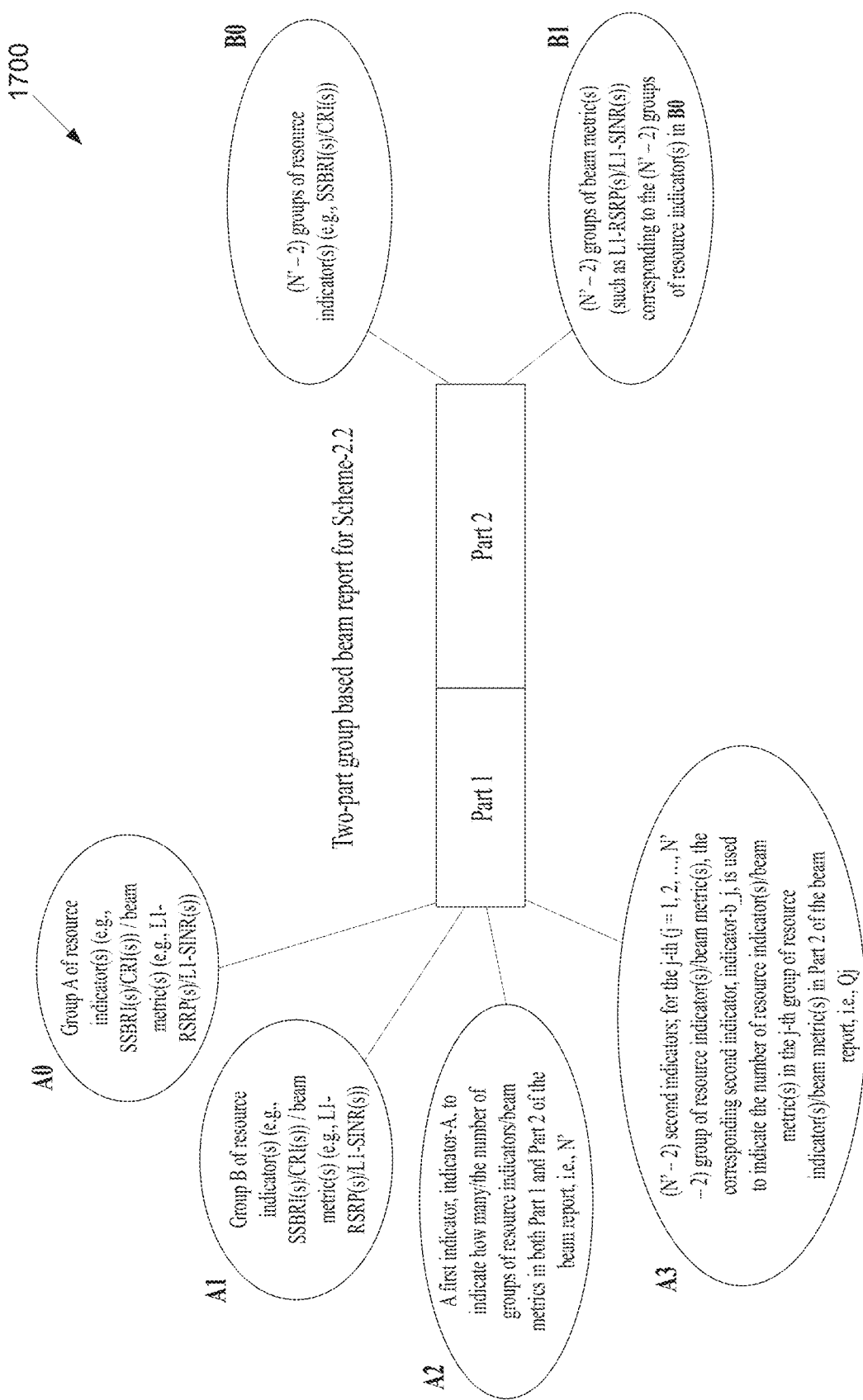
FIG. 17 illustrates another example of design example for two-part group-based beam reporting according to embodiments of the present disclosure.

FIG. 17 illustrates another example of design example for two-part group-based beam reporting 1700 according to embodiments of the present disclosure. An embodiment of the design example for two-part group-based beam reporting 1700 shown in FIG. 17 is for illustration only.

Scheme-2.3: Part 1 of the beam report includes at least one of the following: two groups of resource indicators (such as SSBRIs and/or CRIs) denoted by Group A of resource indicator(s) and Group B of resource indicator(s), two groups of beam metrics (such as L1-RSRPs and/or L1-SINRs), denoted by Group A of beam metric(s) and Group B of beam metric(s), corresponding to Group A of resource indicator(s) and Group B of resource indicator(s) respectively, a first indicator for resource indicator (denoted by indicator-a-ri) to indicate the number of group(s) of resource indicator(s) in Part 2 of the beam report (denoted by N'_ri, 1≤N'_ri≤N'−2), and a first indicator for beam metric (denoted by indicator-a-bm) to indicate the number of group(s) of beam metric(s) in Part 2 of the beam report (denoted by N'_bm, 1≤N'_bm≤N'−2).

Here, N'_ri and N'_bm could be different. Further, for the j-th group of resource indicator(s) reported in Part 2 of the beam report (j=1, 2, . . . , N'_ri), a second indicator for resource indicator (denoted by indicator-b-ri_j) to indicate the number of resource indicator(s) in the j-th group of resource indicator(s) (i.e., Qj) could also be incorporated/included into Part 1 of the beam report. Hence, a total of N'_ri second indicators for resource indicator could be reported/included in Part 1 of the beam report. For the l-th group of beam metric(s) reported in Part 2 of the beam report (l=1, 2, . . . , N'_bm), a second indicator for beam metric (denoted by indicator-b-bm_l) to indicate the number of beam metric(s) in the l-th group of beam metric(s) (i.e., Ql) could be incorporated/included into Part 1 of the beam report as well.

Hence, a total of N'_bm second indicators for beam metric could be reported in Part 1 of the beam report. If N'_ri and N'_bm are the same and equal to N'−2, Scheme-2.3 is equivalent to Scheme-2.1. Part 1 of the beam report could also include the indications of the number of resource indicator(s)/beam metric(s) in Group A of resource indicator(s)/beam metric(s) and/or the number of resource indicator(s)/beam metric(s) in Group B of resource indicator(s)/beam metric(s). Part 2 of the beam report includes at least one of the following: N'_ri groups of resource indicators and N'_bm groups of beam metrics.

Figure 18:
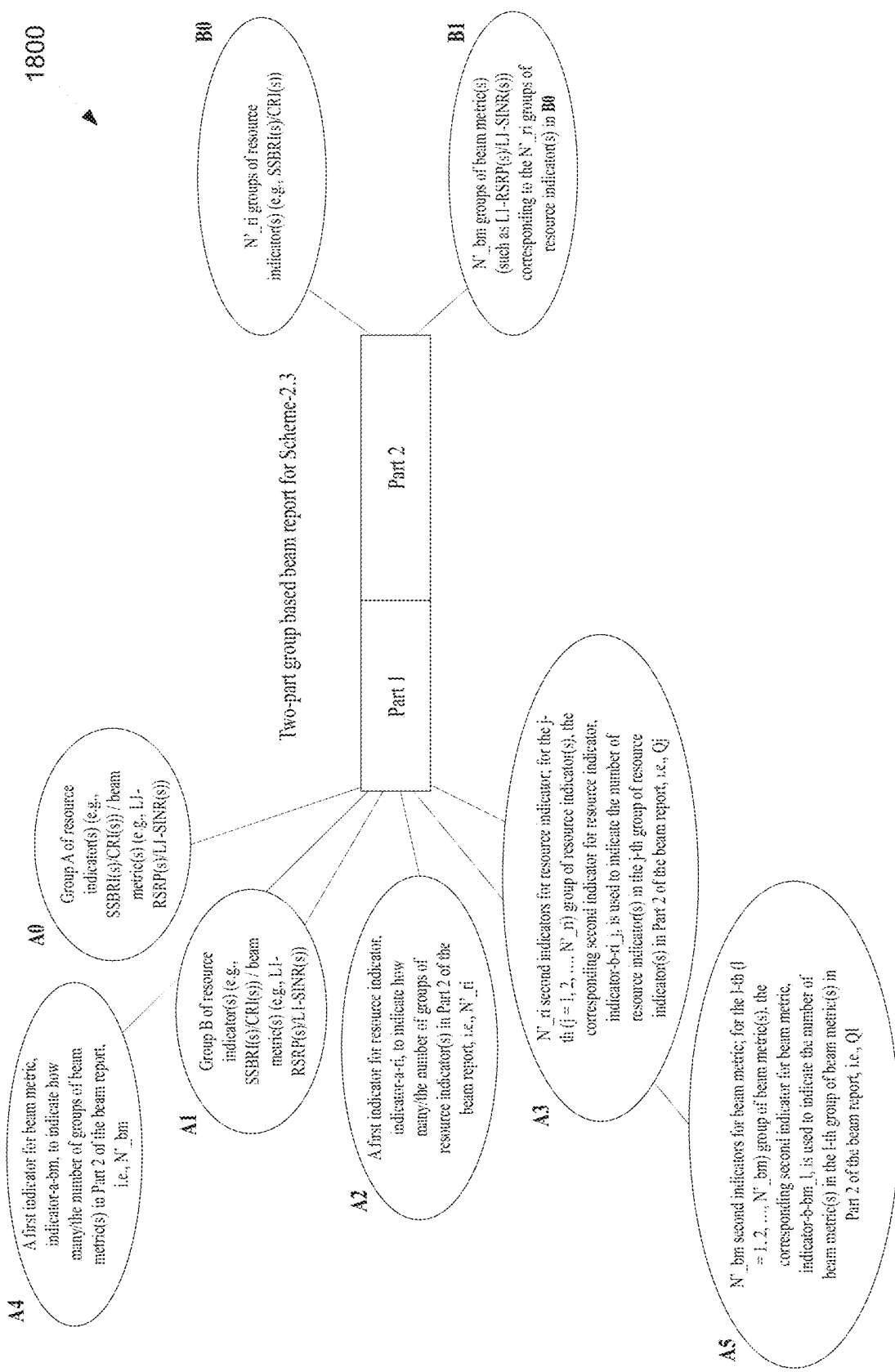
FIG. 18 illustrates yet another example of design example for two-part group-based beam reporting according to embodiments of the present disclosure.

FIG. 18 illustrates yet another example of design example for two-part group-based beam reporting 1800 according to embodiments of the present disclosure. An embodiment of the design example for two-part group-based beam reporting 1800 shown in FIG. 18 is for illustration only.

In FIG. 18, a conceptual example charactering the two-part group-based beam reporting strategy for Scheme-2.3 is depicted. As can be seen from FIG. 18, if N'_ri=0 and N'_bm=0, A2, A3, A4 and A5 would be absent in Part 1 of the beam report, and Part 2 of the beam report would be absent.

Scheme-2.4: Part 1 of the beam report includes at least one of the following: two groups of resource indicators (such as SSBRIs and/or CRIs) denoted by Group A of resource indicator(s) and Group B of resource indicator(s), two groups of beam metrics (such as L1-RSRPs and/or L1-SINRs), denoted by Group A of beam metric(s) and Group B of beam metric(s), corresponding to Group A of resource indicator(s) and Group B of resource indicator(s) respectively, a first indicator for resource indicator (denoted by indicator-A-ri) to indicate the total number of group(s) of resource indicator(s) in both Part 1 and Part 2 of the beam report (denoted by N'_ri_tot, 1≤N'_ri_tot≤N'), and a first indicator for beam metric (denoted by indicator-A-bm) to indicate the total number of group(s) of beam metric(s) in both Part 1 and Part 2 of the beam report (denoted by N'_bm_tot, 1≤N'_bm_tot≤N').

Here, N'_ri_tot and N'_bm_tot could be different. Further, for the j-th group of resource indicator(s) reported in Part 2 of the beam report (j=1, 2, . . . , N'_ri_tot−2), a second indicator for resource indicator (denoted by indicator-b-bm_j) to indicate the number of resource indicator(s) in the j-th group of resource indicator(s) (i.e., Qj) could also be incorporated/included into Part 1 of the beam report. Hence, a total of N'_ri_tot−2 second indicators for resource indicator could be reported/included in Part 1 of the beam report. For the l-th group of beam metric(s) reported in Part 2 of the beam report (l=1, 2, . . . , N'_bm_tot−2), a second indicator for beam metric (denoted by indicator-b-bm_l) to indicate the number of beam metric(s) in the l-th group of beam metric(s) (i.e., Ql) could incorporated/included into Part 1 of the beam report as well.

Hence, a total of N'_bm_tot−2 second indicators for beam metric could be reported in Part 1 of the beam report. If N'_ri_tot and N'_bm_tot are the same and equal to N', Scheme-2.4 is equivalent to Scheme-2.2. Part 1 of the beam report could also include the indications of the number of resource indicator(s)/beam metric(s) in Group A of resource indicator(s)/beam metric(s) and/or the number of resource indicator(s)/beam metric(s) in Group B of resource indicator(s)/beam metric(s). Part 2 of the beam report could include at least one of the following: (N'_ri_tot−2) groups of resource indicators and (N'_bm_tot−2) groups of beam metrics.

Figure 19:
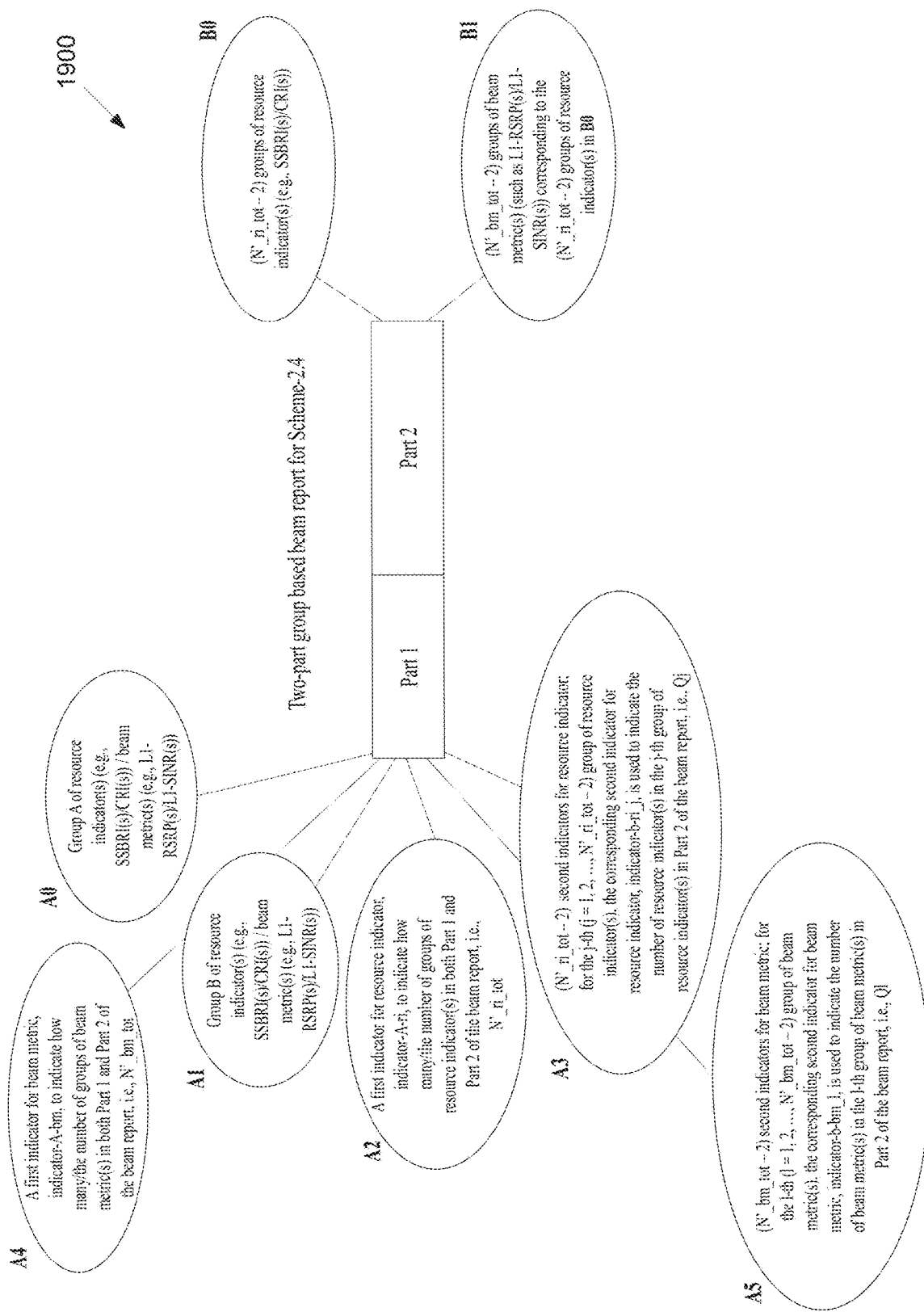
FIG. 19 illustrates yet another example of design example for two-part group-based beam reporting according to embodiments of the present disclosure.

FIG. 19 illustrates yet another example of design example for two-part group-based beam reporting 1900 according to embodiments of the present disclosure. An embodiment of the design example for two-part group-based beam reporting 1900 shown in FIG. 19 is for illustration only.

In FIG. 19, a conceptual example charactering the two-part group-based beam reporting strategy for Scheme-2.4 is depicted. As can be seen from FIG. 19, if N'_ri_tot=2 and N'_bm_tot=2, A2, A3, A4 and A5 would be absent in Part 1 of the beam report, and Part 2 of the beam report would be absent.

Scheme-2.5: the main difference between Scheme-2.5 and other schemes under Option-2 is that in Scheme-2.5, only the groups of beam metrics are reported in Part 2 of the beam report, while in other schemes, both resource indicators and their associated beam metrics are reported in Part 2 of the beam report. In the following, Scheme-2.5 is discussed under the framework of Scheme-2.1, and depicted in FIG. 20A. Note that the provided design in FIG. 20A can be extended to other frameworks under Scheme-2.2, Scheme-2.3 and Scheme-2.4.

Figure 20A:
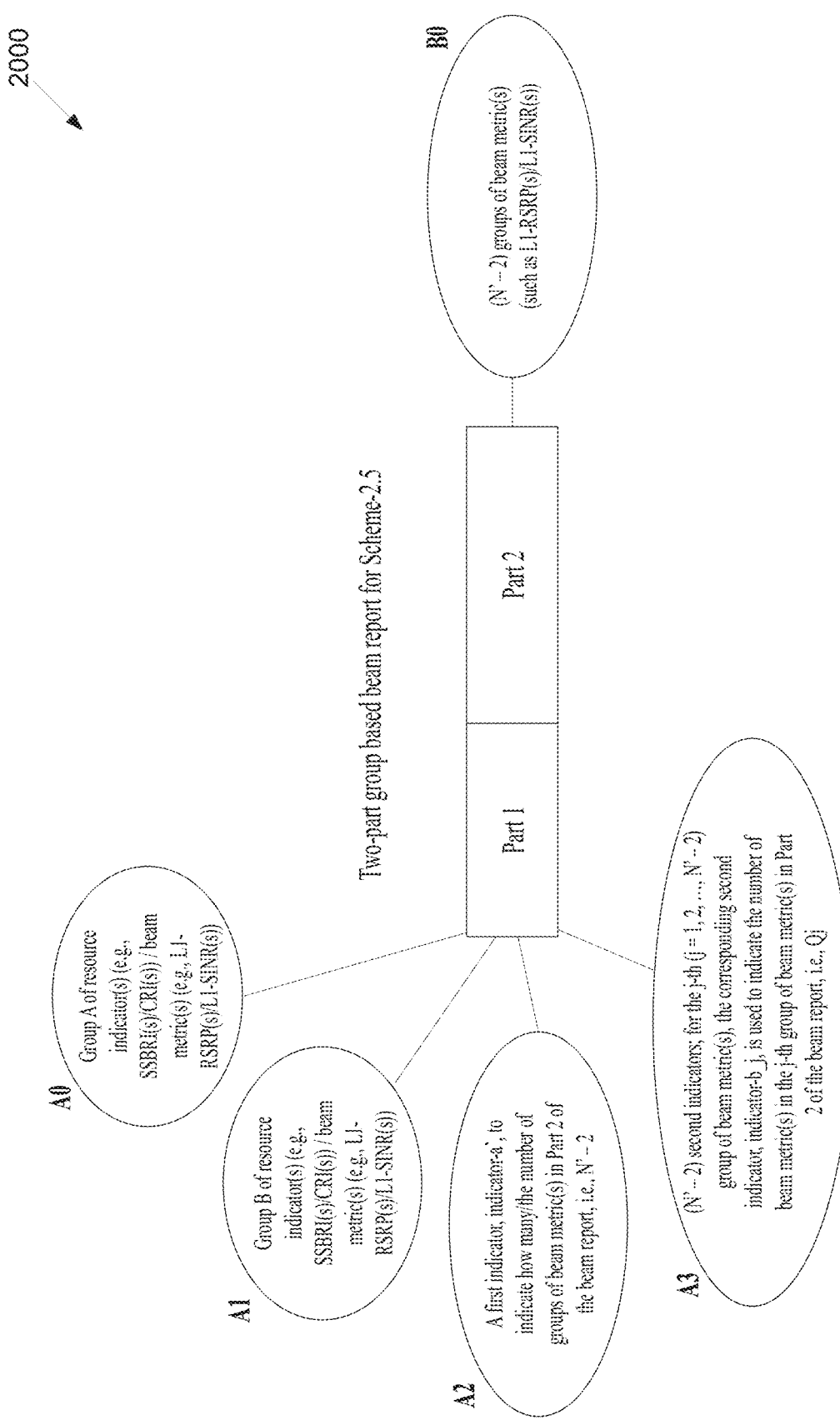
FIG. 20A illustrates yet another example of design example for two-part group-based beam reporting according to embodiments of the present disclosure.

FIG. 20A illustrates yet another example of design example for two-part group-based beam reporting 2000 according to embodiments of the present disclosure. An embodiment of the design example for two-part group-based beam reporting 2000 shown in FIG. 20A is for illustration only.

As can be seen from the example shown in FIG. 20A, Part 1 of the beam report could include at least one of the following: two groups of resource indicators (such as SSBRIs and/or CRIs) denoted by Group A of resource indicator(s) and Group B of resource indicator(s), two groups of beam metrics (such as L1-RSRPs and/or L1-SINRs), denoted by Group A of beam metric(s) and Group B of beam metric(s), corresponding to Group A of resource indicator(s) and Group B of resource indicator(s) respectively, and a first indicator (denoted by indicator-a') to indicate the number of groups of beam metrics in Part 2 of the beam report. For instance, indicator-a' could correspond to the exact value of (N'−2), which can be dynamically changed/configured/selected by the UE.

As discussed above, the UE could autonomously determine/select the exact value of N', e.g., from a set of possible values for N' configured/indicated by the network. For instance, if indicator-a'=2 (N'=4), 2 groups of beam metrics are included in Part 2 of the beam report. If indicator-a'=0 (N'=2), Part 2 of the beam report would be absent, i.e., no beam metrics are reported in Part 2 of the beam report. Furthermore, for the j-th group of beam metric(s) reported in Part 2 of the beam report (j=1, 2, . . . , N'−2), a second indicator (denoted by indicator-b_j) to indicate the number of beam metric(s) in the j-th group of beam metric(s) (i.e., Qj) could also be incorporated/included into Part 1 of the beam report. Hence, a total of (N'−2) second indicators could be reported/included in Part 1 of the beam report.

Even though not shown in FIG. 20A, Part 1 of the beam report could also include the indications of the number of resource indicator(s)/beam metric(s) in Group A of resource indicator(s)/beam metric(s) and/or the number of resource indicator(s)/beam metric(s) in Group B of resource indicator(s)/beam metric(s). Part 2 of the beam report includes at least one of the following: (N'−2) groups of beam metrics. Upon receiving the (N'−2) groups of beam metrics from Part 2 of the beam report, the network could configure the UE to report one or more groups of resource indicators from the (N'−2) groups of resource indicators corresponding to the (N'−2) groups of beam metrics reported in Part 2 of the beam report.

Scheme-2.6: Part 1 of the beam report includes at least one of the following: n_1≥2 groups of resource indicators (such as SSBRIs and/or CRIs), n_1≥2 groups of beam metrics (such as L1-RSRPs and/or L1-SINRs) corresponding to the n_1≥2 groups of resource indicator(s), a first indicator (denoted by indicator-a) to indicate the number of groups of resource indicators/beam metrics in Part 1 or Part 2 of the beam report, and a second indicator (denoted by indicator-b) to indicate the number of groups of resource indicators/beam metrics in both Part 1 and Part 2 of the beam report, i.e., N'. For instance, indicator-a could correspond to the exact value of n_1, i.e., the number of groups of resource indicators/beam metrics in Part 1 of the beam report, which can be dynamically changed/configured/selected by the UE.

As discussed above, the UE could autonomously determine/select the exact value of the number (N') of groups of resource indicators/beam metrics to be reported in a single reporting instance, e.g., from a set of possible values for N' configured/indicated by the network, the exact value of the number (n_1) of groups of resource indicators/beam metrics in Part 1 of the two-part group-based beam report, and therefore the exact value of the number (N'−n_1) of groups of resource indicators/beam metrics to be reported in Part 2 of the two-part group-based beam report.

For instance, if indicator-a=4 (n_1=4) and indicator-b=6 (N'=6), 4 groups of resource indicators and 4 groups of beam metrics corresponding to the 4 groups of resource indicators are included in Part 1 of the beam report, and 2 groups of resource indicators and 2 groups of beam metrics corresponding to the 2 groups of resource indicators are included in Part 2 of the beam report. If indicator-a=2 (n_1=2) and indicator-b=2 (N'=2), Part 2 of the beam report would be absent, i.e., no resource indicators/beam metrics are reported in Part 2 of the beam report. Further, for the j-th group of resource indicator(s)/beam metric(s) reported in Part 2 of the beam report (j=1, 2, . . . , N'-n_1), a third indicator (denoted by indicator-b_j) to indicate the number of resource indicator(s)/beam metric(s) in the j-th group of resource indicator(s)/beam metric(s) (i.e., Qj) could also be incorporated/included into Part 1 of the beam report. Hence, a total of (N'-n_1) third indicators could be reported in Part 1 of the beam report. Part 1 of the beam report could also include the indications of the number of resource indicator(s)/beam metric(s) in the n_1≥2 groups of resource indicator(s)/beam metric(s). Part 2 of the beam report includes at least one of the following: (N'-n_1) groups of resource indicators and (N'-n_1) groups of beam metrics corresponding to the (N'-n_1) groups of resource indicators.

Figure 20B:
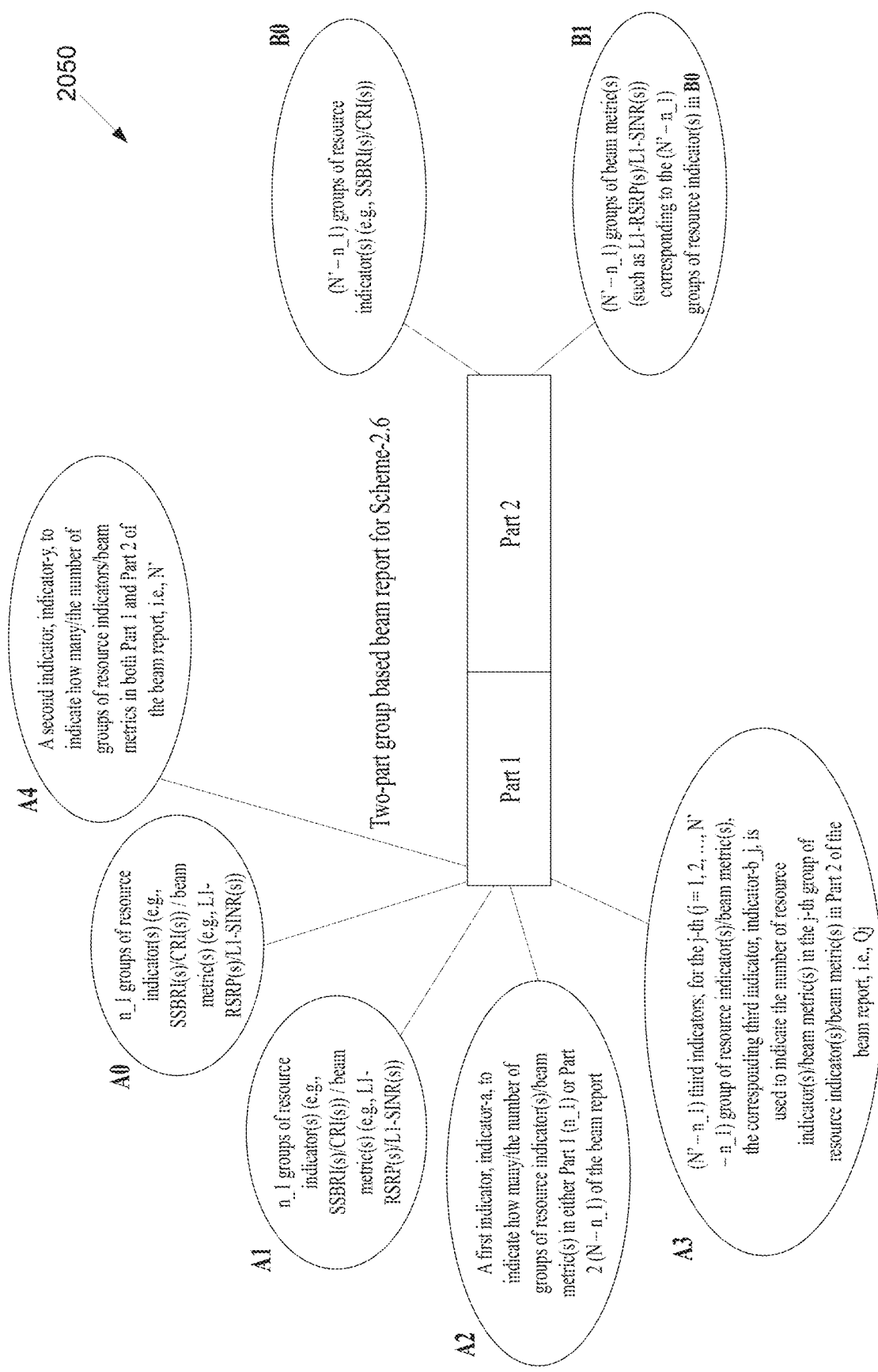
FIG. 20B illustrates yet another example of design example for two-part group-based beam reporting according to embodiments of the present disclosure.

FIG. 20B illustrates yet another example of design example for two-part group-based beam reporting 2050 according to embodiments of the present disclosure. An embodiment of the design example for two-part group-based beam reporting 2050 shown in FIG. 20B is for illustration only.

In FIG. 20B, a design example of the two-part group-based beam reporting strategy for Scheme-2.6 is illustrated. As discussed above, in A2 in FIG. 20B, the indicator-a could indicate either the number (n_1) of groups of resource indicators/beam metrics in Part 1 of the beam report or the number (N'-n_1) of groups of resource indicators/beam metrics in Part 2 of the beam report, and in A4 in FIG. 20B, the indicator-y could indicate the total number (N') of groups of resource indicators/beam metrics to be reported in both Part 1 and Part 2 of the beam report.

If the UE is configured/indicated by the network the value N', A4 in FIG. 20B could be absent. Furthermore, other combinations of A2 and A4 in FIG. 20B are also possible. For example, the indicator-x in A2 could indicate the number (n_1) of groups of resource indicators/beam metrics in Part 1 of the beam report, and the indicator-y in A4 could indicate the number (N'-n_1) of groups of resource indicators/beam metrics in Part 2 of the beam report.

To determine the number (n_1) of groups of resource indicators/beam metrics to be reported in Part 1 of the two-part beam report, in one example, the UE could be higher layer configured by the network a first threshold. For one or more groups of resource indicators/beam metrics to be reported, the UE could compare the corresponding (average) L1-RSRP/L1-SINR metric(s)/value(s) with the first threshold; if the (average) L1-RSRP/L1-SINR metric(s)/value(s) is beyond the first threshold, the UE could incorporate/include the group(s) of resource indicators/beam metrics in Part 1 of the two-part group-based beam report(s).

To determine the number (n_1) of groups of resource indicators/beam metrics to be reported in Part 1 of the two-part beam report, in another example, the UE could be higher layer configured by the network a second threshold. The UE could compare the number (N') of groups of resource indicators/beam metrics to be reported in both Part 1 and Part 2 of the two-part group-based beam report(s) with the second threshold. For instance, if N' is beyond the second threshold by n', the UE could report n' (n_1=n' in this case) groups of resource indicators/beam metrics in Part 1 of the beam report, and (N'-n'), and therefore, (N'-n_1) groups of resource indicators/beam metrics in Part 2 of the beam report. If N' is below the second threshold, the UE could report all N' groups of resource indicators/beam metrics (n_1=N' in this case) in Part 1 of the two-part group-based beam report(s), and Part 2 of the beam report would be absent.

To determine the number (n_1) of groups of resource indicators/beam metrics to be reported in Part 1 of the two-part beam report, in yet another example, the UE could be higher layer configured by the network a third threshold and a fourth threshold. The UE could compare the number (N') of groups of resource indicators/beam metrics to be reported in both Part 1 and Part 2 of the two-part group-based beam report(s) with the third threshold. If N' is beyond the third threshold, the UE could compare the (average) L1-RSRP/L1-SINR metric(s)/value(s) for one or more groups of resource indicators/beam metrics with the fourth threshold. If the (average) L1-RSRP/L1-SINR metric(s)/value(s) of one or more groups of resource indicators/beam metrics is beyond the fourth threshold, the UE could incorporate/include the group(s) of resource indicators/beam metrics in Part 1 of the two-part group-based beam report(s). Otherwise, if N' is below the third threshold, the UE could report all N' groups of resource indicators/beam metrics (n_1=N' in this case) in Part 1 of the two-part group-based beam report(s), and Part 2 of the beam report would be absent.

In Scheme-2.1, Scheme-2.2, Scheme-2.3, Scheme-2.4, Scheme-2.5 and Scheme-2.6, the UE could autonomously determine/select the number (N') of groups of resource indicators/beam metrics to be reported in both Part 1 and Part 2 of the beam report(s) and/or the number of groups of resource indicators/beam metrics to be reported in either Part 1 (n_1) or Part 2 (N−n_1) of the beam report(s), and include the relevant/corresponding indicators (such as indicator-a, indicator-b and etc.) in Part 1 of the beam report(s).

Furthermore, in Scheme-2.1, Scheme-2.2, Scheme-2.3, Scheme-2.4, Scheme-2.5 and Scheme-2.6, the UE could also autonomously determine/select the number (Qi≥1, i=1, 2, . . . , N') of resource indicators/beam metrics in each group of resource indicators/beam metrics to be reported, and include in the two-part group-based beam report (e.g., in Part 1 of the beam report) the information regarding the number of (Qi≥1, i=1, 2, . . . , N') of resource indicators/beam metrics in each group of resource indicators/beam metrics to be reported. Other variations are also possible.

For example, the UE could be indicated/configured by the network the number of (N') of groups of resource indicators/beam metrics to be reported in both Part 1 and Part 2 of the beam report(s) and/or the number of groups of resource indicators/beam metrics to be reported in either Part 1 (n_1) or Part 2 (N-n_1) of the beam report(s); the UE could autonomously determine/select the number (Qi≥1, i=1, 2, . . . , N') of resource indicators/beam metrics in each group of resource indicators/beam metrics to be reported, and include in the two-part group-based beam report (e.g., in Part 1 of the beam report) the information regarding the number of (Qi≥1, i=1, 2, . . . , N') of resource indicators/beam metrics in each group of resource indicators/beam metrics to be reported.

For another example, the UE could autonomously determine/select the number (N') of groups of resource indicators/beam metrics to be reported in both Part 1 and Part 2 of the beam report(s) and/or the number of groups of resource indicators/beam metrics to be reported in either Part 1 (n_1) or Part 2 (N−n_1) of the beam report(s), and include the relevant/corresponding indicators (such as indicator-a, indicator-b and etc.) in Part 1 of the beam report(s); the UE could be indicated/configured by the network the number (Qi≥1, i=1, 2, ..., N') of resource indicators/beam metrics in each group of resource indicators/beam metrics to be reported.

The UE could be configured/indicated by the network via higher layer RRC signaling to follow one or more of the schemes (i.e., Scheme-2.1, Scheme-2.2, Scheme-2.3, Scheme-2.4, Scheme-2.5 and/or Scheme-2.6) to send to the network the two-part group-based beam report(s). Alternatively, the UE could autonomously determine which scheme(s) to follow to construct and send the two-part group-based beam report, and indicate to the network their choice(s).

As discussed above, for the Option-2 based group-based beam reporting for the multi-TRP/inter-cell operation: (1) Configuration-I: the UE could be indicated/configured by the network the number (N') of groups of resource indicators/beam metrics to be reported per reporting setting/in a single reporting instance; and (2) Configuration-II: the UE could autonomously select/determine the number (N') of groups of resource indicators/beam metrics to be reported per reporting setting/in a single reporting instance; the UE could indicate to the network the value N' or/and (N'−2) in Part 1 of the two-part group-based beam report(s).

The UE could be indicated by the network to follow Configuration-I and/or Configuration-II to determine the number (N') of groups of resource indicators/beam metrics to be reported per reporting setting/in a single reporting instance for Option-2 based group-based (inter-cell) beam reporting; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In one example, the UE could be indicated by the network, e.g., via higher layer RRC signaling and/or dynamic DCI signaling, to follow Configuration-I (based on network's configuration) or Configuration-II (based on UE's reporting) or both to determine the number (N') of groups of resource indicators/beam metrics to be reported per reporting setting/in a single reporting instance for Option-2 based group-based (inter-cell) beam reporting. For instance, Configuration-I could be the default mode/configuration, and the UE could be higher layer indicated by the network, e.g., via the higher layer parameter CSI-ReportConfig, whether Configuration-II is enabled in addition to Configuration-I or overriding/replacing Configuration-I. If the UE is indicated/configured by the network that Configuration-II overrides/replaces Configuration-I, the UE could autonomously determine/select the number (N') of groups of resource indicators/beam metrics to be reported per reporting setting/in a single reporting instance for Option-2 based group-based (inter-cell) beam reporting, which could be different from that (the value of N') configured/indicated by the network.

In another example, the UE could receive from the network a MAC CE command activating Configuration-I or Configuration-II or both. For instance, if the MAC CE command has activated Configuration-II, the UE could autonomously determine/select the value of N', and report the relevant/corresponding indicator(s) to the network in Part 1 of the two-part group-based beam report for Option-2 based group-based beam reporting.

In yet another example, the UE could receive from the network a bitmap with each entry/bit corresponding to either Configuration-I or Configuration-II. If an entry/bit in the bitmap is set to "1", the corresponding/associated configuration (either Configuration-I or Configuration-II) is activated. A bitmap could contain at least one "1".

In yet another example, Configuration-I could be the default mode/configuration. If/when the Option-2 based group-based beam reporting for the multi-TRP/inter-cell operation is enabled (e.g., groupBasedBeamReportingMTRP-Opt2 in the higher layer parameter CSI-ReportConfig shown in TABLE 10 is set to 'enabled') and the field indicating the number (N') of groups of resource indicators/beam metrics to be reported per reporting setting/in a single reporting instance is not enabled/configured/present (e.g., nrofReportedGroup-Opt2 in the higher layer parameter CSI-ReportConfig shown in TABLE 10 is not enabled/configured/present), the UE would follow Configuration-II to autonomously determine/select the value of N', and report the relevant/corresponding indicator(s) to the network in Part 1 of the two-part group-based beam report for Option-2 based group-based (inter-cell) beam reporting.

Figure 21:
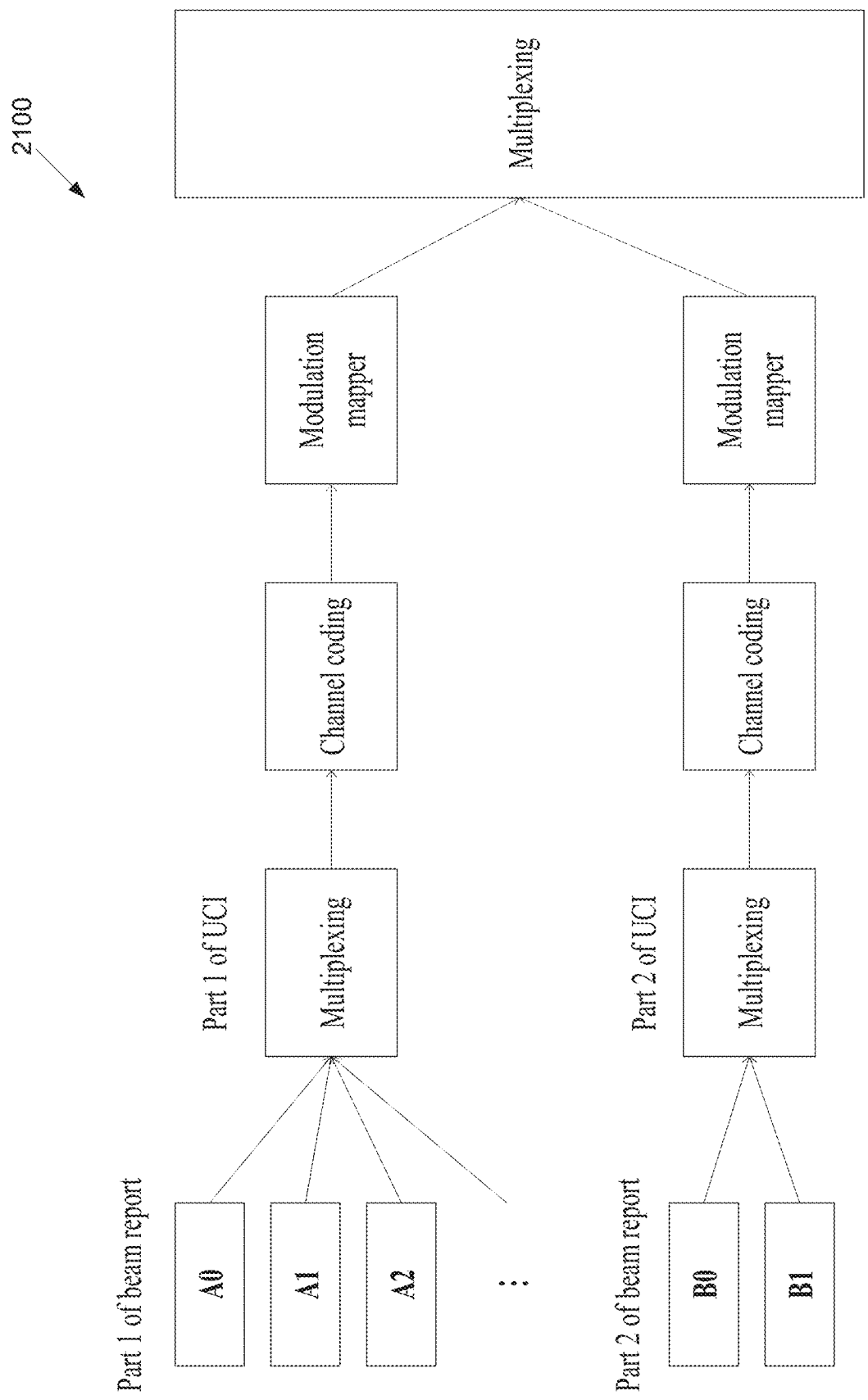
FIG. 21 illustrates an example of two-part UCI according to embodiments of the present disclosure.

FIG. 21 illustrates an example of two-part UCI 2100 according to embodiments of the present disclosure. An embodiment of the two-part UCI 2100 shown in FIG. 21 is for illustration only.

For all of the above schemes in Option-2 based two-part group-based beam reporting design for the multi-TRP/inter-cell operation, Part 1 and Part 2 of the beam report are separately encoded (see FIG. 21) and reported in a single reporting instance. Detailed correspondences between A0, A1, A2, ..., B0, B1 and the contents in the beam report are presented in FIGS. 16 to 20B for Scheme-2.1, Scheme-2.2, Scheme-2.3, Scheme-2.4, Scheme-2.5 and Scheme-2.6.

In one embodiment of one or two-part UCI, as discussed above, for Scheme-2.1, Scheme-2.2, Scheme-2.3, Scheme-2.4, Scheme-2.5 and Scheme-2.6, the group-based (inter-cell) beam reporting is via one-part UCI or a two-part UCI depending on one or more conditions. In one example (Scheme-2.1), the condition is based on the value of N'. For example, when N'<=x (where x is threshold, fixed or configured), the one-part UCI is used for the reporting, and when N'>x, the two-part UCI is used for the reporting.

Further, for Scheme-2.1, Scheme-2.2, Scheme-2.3, Scheme-2.4, Scheme-2.5 and Scheme-2.6, the group-based (inter-cell) beam reporting is via one-part UCI or a two-part UCI depending on a signaling from the NW. This signaling could be semi-static via higher layer RRC signaling (using a dedicated parameter or with a joint configuration parameter) or more dynamic via MAC CE or DCI based signaling (using a dedicated indication or with a joint indication).

In one embodiment of multiplexing with other CSI reports, the group-based (inter-cell) beam reporting could be multiplexed with other types of CSI or beam reports, wherein whether one-part or two-part UCI is used for beam reporting could depend on the other CSI or beam reports.

The two-part UCI is used only when at least one of the other CSI or beam reports is configured with a two-part UCI.

The UL channel for group-based beam reporting (via two-part UCI)) can be fixed, e.g., to PUSCH. In one example, the UL channel for group-based beam reporting (via two-part UCI) can be fixed, e.g., to PUCCH. In one example, the UL channel for group-based beam reporting (via two-part UCI) can be configured from PUCCH and PUSCH.

The group-based (inter-cell) beam reporting (via two-part UCI) can be configured via higher layer RRC signaling. In one example, the group-based (inter-cell) beam reporting (via two-part UCI) can only be triggered via a code point in DCI (UL-related or DL-related DCI).

The UE could be configured/indicated by the network via higher layer RRC signaling to follow Option-1 or Option-2 or both to send to the network the group based beam report(s). Alternatively, the UE could autonomously determine which option(s) (Option-1 or Option-2 or both) to follow to construct and send the group based beam report, and indicate to the network their choice(s).

In one example, the UE could be indicated/configured by the network a higher layer parameter, e.g., groupBasedBeamReportingMTRP-Opt1 to enable/disable or/and turn on/off the Option-1 based group based beam reporting for the multi-TRP/inter-cell operation discussed in the present disclosure. The UE could also be indicated/configured by the network a higher layer parameter, e.g., groupBasedBeamReportingMTRP-Opt2 to enable/disable or/and turn on/off the Option-2 based group based beam reporting for the multi-TRP/inter-cell operation discussed in the present disclosure.

For example, if groupBasedBeamReportingMTRP-Opt1 is enabled and groupBasedBeamReportingMTRP-Opt2 is disabled, the UE would follow Option-1 in this disclosure to send to the network the beam report(s). For another example, if groupBasedBeamReportingMTRP-Opt1 is disabled and groupBasedBeamReportingMTRP-Opt2 is enabled, the UE would follow Option-2 in this disclosure to send to the network the beam report(s). For yet another example, if groupBasedBeamReportingMTRP-Opt1 is enabled and groupBasedBeamReportingMTRP-Opt2 is enabled, the UE would follow both Option-1 and Option-2 in this disclosure to send to the network the beam report(s).

In another example, the UE could be configured/indicated by the network a higher layer parameter, denoted by groupBasedBeamReportingMTRP, in CSI-ReportConfig (see TABLE 14) to enable/disable or/and turn on/off the group based beam reporting for the multi-TRP/inter-cell operation. If the groupBasedBeamReportingMTRP is configured as, e.g., 'groupReportMTRP-Option1', the UE would follow Option-1 discussed in the present disclosure to construct and send the group based beam report(s) to the network. If the groupBasedBeamReportMTRP is configured as, e.g., 'groupReportMTRP-Option2', the UE would follow Option-2 discussed in the present disclosure to construct and send the group based beam report(s) to the network.

instances. For instance, the UE could be configured/indicated by the network to use Option-2 for one reporting instance (R=1), followed by Option-1 for two consecutive reporting instances (R'=2), which is depicted in FIG. 22.

Figure 22:
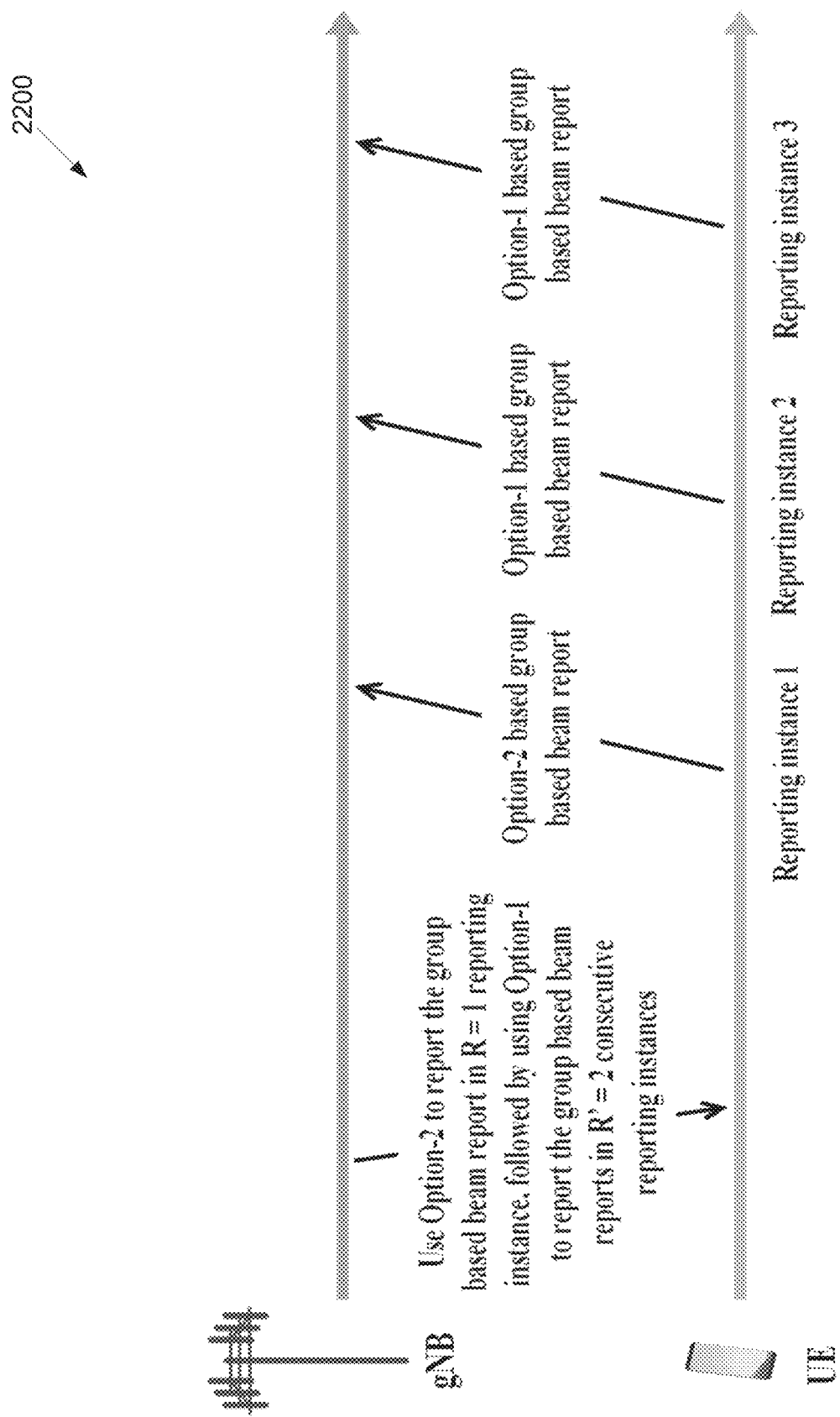
FIG. 22 illustrates an example of group-based beam reporting configuration according to embodiments of the present disclosure.

FIG. 22 illustrates an example of group-based beam reporting configuration 2200 according to embodiments of the present disclosure. An embodiment of the group-based beam reporting configuration 2200 shown in FIG. 22 is for illustration only.

In yet another example, the UE could send/attach an indicator along with each group-based beam report to the network to indicate which option (Option-1 or Option-2) the UE has applied to construct the corresponding group-based beam report. In another example, the UE could send an indicator to the network to indicate that the UE would send Option-2 based group-based beam report(s) for R consecutive reporting instance(s) or T time period, followed by Option-1 based group-based beam report(s) for R' consecutive reporting instance(s) or T' time period.

Alternatively, the UE could send an indicator to the network to indicate that the UE would send Option-1 based group-based beam report(s) for R' consecutive reporting instance(s) or T' time period, followed by Option-2 based group-based beam report(s) for R consecutive reporting instance(s) or T time period. The UE could be configured by the network via higher layer RRC signaling the number of consecutive reporting instances (R and R') and/or the time periods (T and T'), or the UE could indicate to the network the number of consecutive reporting instances (R and R') and/or the time periods (T and T').

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

TABLE 14

An example of higher layer parameter CSI-ReportConfig indicating various options for group-based (inter-cell) beam reporting

```
CSI-ReportConfig ::= SEQUENCE {
    reportConfigId                  CSI-ReportConfigId,
    carrier                         ServCellIndex              OPTIONAL, -- Need S
    resourceFor ChannelMeasurement  CSI-ResourceConfigId,
    csi-IM-ResourcesForInterference CSI-ResourceConfigId,      OPTIONAL, -- Need R
    nzp-CSI-RS-ResourcesForInterference CSI-ResourceConfigId,  OPTIONAL, -- Need R
    groupBasedBeamReportingMTRP ENUMERATED {groupReportMTRP-Option1, groupReportMTRP-Option2}
OPTIONAL, -- Need R
    reportConfigType                CHOICE {
```

In yet another example, the UE could be configured/indicated by the network to use Option-2 for R≥1 consecutive reporting instances or T time period, followed by Option-1 for R'≥1 consecutive reporting instances or T' time period. Alternatively, the UE could be configured/indicated by the network to use Option-1 for R' consecutive reporting instances or T' time period, followed by Option-2 for R consecutive reporting instances or T time period. The UE could be configured by the network via higher layer RRC signaling the number of consecutive reporting instances (R and R') and/or the time periods (T and T'). From the above discussions, the UE could receive from the network a single indicator/trigger but apply both options (Option-1 and Option-2) to construct and report the group-based beam reports through multiple (more than one) reporting Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to receive a first set of reference signals (RSs) through a first set of RS resources, wherein RS resources in the first set of RS resources are associated with first and second entity identities (IDs), respectively; and a processor operably coupled to the transceiver, the processor configured to:
 measure RSs in the first set of RSs;
 determine (i) a first resource indicator and a second resource indicator from a first group of two resource indicators based on the measured RSs and (ii) corresponding beam metrics associated with the first entity ID and the second entity ID, respectively,
wherein the transceiver is further configured to transmit, in a channel state information (CSI) report, the first group of two resource indicators and the corresponding beam metrics,
wherein the first group of two resource indicators are synchronization signal block (SSB) resource indicators (SSBRIs) or CSI reference signal (CSI-RS) resource indicators (CRIs) and the corresponding beam metrics are layer-1 reference signal received powers (L1-RSRPs) or layer-1 signal to interference and noise ratios (L1-SINRs),
wherein the first or second entity IDs correspond to at least one of:
 a physical cell identity (PCI) corresponding to a serving cell PCI or a PCI different from the serving cell PCI; and
 a PCI index pointing to a PCI corresponding to the serving cell PCI or a PCI different from the serving cell PCI in a list of PCIs that are higher layer configured to the UE, and
wherein the first set of RS resources corresponds to at least one of (i) a SSB resource set provided by a CSI-SSB-ResourceSet and (ii) a non-zero power (NZP) CSI-RS resource set provided by a NZP-CSI-RS-ResourceSet.

2. The UE of claim 1, wherein an indication is received in a CSI reporting setting provided by a higher layer parameter CSI-ReportConfig, which indicates at least one of:
 a number of groups of resource indicators to be reported in the CSI report;
 a maximum number of groups of resource indicators allowed to be reported in the CSI report;
 a number of resource indicators in each group of resource indicators to be reported in the CSI report; and
 a maximum number of resource indicators in each group of resource indicators allowed to be reported in the CSI report.

3. The UE of claim 1, wherein:
the transceiver is further configured to receive a second set of RSs through a second set of RS resources associated with the second entity ID,
the processor is further configured to measure one or more RSs in each of the first and second sets of RSs, and
the second set of RS resources corresponds to at least one of: (1) a SSB resource set provided by the CSI-SSB-ResourceSet and (2) a (NZP CSI-RS resource set provided by the NZP-CSI-RS-ResourceSet.

4. The UE of claim 3, wherein:
the transceiver is further configured to transmit, in the CSI report, an indicator associated with the first resource indicator in the first group of resource indicators, and the indicator corresponds to at least one of:
 a PCI;
 a PCI index pointing to a PCI in a list of PCIs that are higher layer configured to the UE; and
 a set index or ID of the first set of RS resources or the second set of RS resources.

5. The UE of claim 1, wherein:
the corresponding beam metrics include (i) a largest measured value of a L1-RSRP quantized to a 7-bit value in a range of [−140, −44] dBm with a 1 dB step size or (ii) one or more differential L1-RSRP values, each quantized to a 4-bit value with a 2 dB step size with a reference to the largest measured L1-RSRP value; and
a beam metric corresponding to the first resource indicator in the first group of resource indicators is the largest measured L1-RSRP value.

6. The UE of claim 1, wherein:
the transceiver is further configured to transmit, in the CSI report, a second group of two resource indicators and corresponding beam metrics associated with the first and second entity IDs, respectively,
a first resource indicator in the second group of two resource indicators is determined from a same set of RS resources used for determining a first resource indicator in the first group of two resource indicators, and
a second resource indicator in the second group of two resource indicators is determined from a same set of RS resources used for determining a second resource indicator in the first group of two resource indicators.

7. The UE of claim 1, wherein:
the first group of two resource indicators and at least a second group of two resource indicators are sent in a two-part CSI,
a part 1 of the two-part CSI (i) includes the first group of two resource indicators and the corresponding beam metrics associated with the first and second entity IDs, respectively, and (ii) indicates a payload size of a part 2 of the two-part CSI,
a part 2 of the two-part CSI includes at least the second group of two resource indicators, which are different from the first group of two resource indicators, and corresponding beam metrics associated with the first and second entity IDs, respectively, and
the payload size indicates a number of groups of resource indicators in the part 2 of the two-part CSI.

8. A base station (BS), comprising: a processor; and
a transceiver operably coupled to the processor, the transceiver configured to:
 transmit a first set of reference signals (RSs) through a first set of RS resources, wherein RS resources in the first set of RS resources are associated with first and second entity identities (IDs), respectively, and
 receive, in a channel state information (CSI) report, a first group of two resource indicators and corresponding beam metrics, wherein a first resource indicator and a second resource indicator in the first group of two resource indicators are based on the RS resources from the first set of RS resources,
wherein the first group of two resource indicators are synchronization signal block (SSB) resource indicators (SSBRIs) or CSI reference signal (CSI-RS) resource indicators (CRIs) and the corresponding beam metrics are layer-1 reference signal received powers (L1-RSRPs) or layer-1 signal to interference and noise ratios (L1-SINRs),
wherein the first or second entity IDs correspond to at least one of:
 a physical cell identity (PCI) corresponding to a serving cell PCI or a PCI different from the serving cell PCI; and a PCI index pointing to a PCI corresponding to the serving cell PCI or a PCI different from the serving cell PCI in a list of PCIs that are higher layer configured, and wherein the first set of RS resources corresponds to at least one of: (1) a SSB resource set provided by a CSI-SSB-ResourceSet and (2) a non-zero power (NZP) CSI-RS resource set provided by a NZP-CSI-RS-ResourceSet.

9. The BS of claim 8, wherein an indication is transmitted in a CSI reporting setting provided by a higher layer parameter CSI-ReportConfig, which indicates at least one of:
a number of groups of resource indicators to be reported in the CSI report;
a maximum number of groups of resource indicators allowed to be reported in the CSI report;
a number of resource indicators in each group of resource indicators to be reported in the CSI report; and
a maximum number of resource indicators in each group of resource indicators allowed to be reported in the CSI report.

10. The BS of claim 8, wherein:
the transceiver is further configured to transmit a second set of RSs through a second set of RS resources associated with the second entity ID,
the second set of RS resources corresponds to at least one of: (1) a SSB resource set provided by the CSI-SSB-ResourceSet and (2) a (NZP CSI-RS resource set provided by the NZP-CSI-RS-ResourceSet.

11. The BS of claim 10, wherein:
the transceiver is further configured to receive, in the CSI report, an indicator associated with the first resource indicator in the first group of resource indicators, and
the indicator corresponds to at least one of:
a PCI;
a PCI index pointing to a PCI in a list of PCIs that are higher layer configured; and
a set index or ID of the first set of RS resources or the second set of RS resources.

12. The BS of claim 8, wherein:
the corresponding beam metrics include (i) a largest measured value of a L1-RSRP quantized to a 7-bit value in a range of [−140, −44] dBm with a 1 dB step size or (ii) one or more differential L1-RSRP values, each quantized to a 4-bit value with a 2 dB step size with a reference to the largest measured L1-RSRP value; and
a beam metric corresponding to the first resource indicator in the first group of resource indicators is the largest measured L1-RSRP value.

13. The BS of claim 8, wherein:
the transceiver is further configured to receive, in the CSI report, a second group of two resource indicators and corresponding beam metrics associated with the first and second entity IDs, respectively,
a first resource indicator in the second group of two resource indicators is determined from a same RS resource used for determining a first resource indicator in the first group of two resource indicators, and
a second resource indicator in the second group of two resource indicators is determined from a same RS resource used for determining a second resource indicator in the first group of two resource indicators.

14. The BS of claim 8, wherein:
the first group of two resource indicators and at least a second group of two resource indicators are received in a two-part CSI,
a part 1 of the two-part CSI (i) includes the first group of two resource indicators and the corresponding beam metrics associated with the first and second entity IDs, respectively, and (ii) indicates a payload size of a part 2 of the two-part CSI,
a part 2 of the two-part CSI includes at least the second group of two resource indicators, which are different from the first group of two resource indicators, and corresponding beam metrics associated with the first and second entity IDs, respectively, and
the payload size indicates a number of groups of resource indicators in the part 2 of the two-part CSI.

15. A method of operating a user equipment (UE), the method comprising:
receiving a first set of reference signals (RSs) through a first set of RS resources, wherein RS resources in the first set of RS resources are associated with first and second entity identities (IDs), respectively;
measuring RSs in the first set of RSs;
determining (i) a first resource indicator and a second resource indicator from a first group of two resource indicators based on the measured RSs and (ii) corresponding beam metrics associated with the first entity (ID and the second entity ID, respectively; and
transmitting, in a channel state information (CSI) report, the first group of two resource indicators and the corresponding beam metrics, wherein the first group of two resource indicators are synchronization signal block (SSB) resource indicators (SSBRIs) or CSI reference signal (CSI-RS) resource indicators (CRIs) and the corresponding beam metrics are layer-1 reference signal received powers (L1-RSRPs) or layer-1 signal to interference and noise ratios (L1-SINRs),
wherein the first or second entity IDs correspond to at least one of:
a physical cell identity (PCI) corresponding to a serving cell PCI or a PCI different from the serving cell PCI; and
a PCI index pointing to a PCI corresponding to the serving cell PCI or a PCI different from the serving cell PCI in a list of PCIs that are higher layer configured to the UE, and
wherein the first set of RS resources corresponds to at least one of (i) a SSB resource set provided by a CSI-SSB-ResourceSet and (ii) a non-zero power (NZP) CSI-RS resource set provided by a NZP-CSI-RS-ResourceSet.

16. The method of claim 15, wherein an indication is received in a CSI reporting setting provided by a higher layer parameter CSI-ReportConfig, which indicates at least one of:
a number of groups of resource indicators to be reported in the CSI report;
a maximum number of groups of resource indicators allowed to be reported in the CSI report;
a number of resource indicators in each group of resource indicators to be reported in the CSI report; and
a maximum number of resource indicators in each group of resource indicators allowed to be reported in the CSI report.

17. The method of claim 15, further comprising:
receiving a second set of RSs through a second set of RS resources associated with the second entity ID; and measuring one or more RSs in each of the first and second sets of RSs; and wherein the second set of RS resources corresponds to at least one of: (1) a SSB resource set provided by the CSI-SSB-ResourceSet and (2) a NZP CSI-RS resource set provided by the NZP-CSI-RS-ResourceSet.

\* \* \* \* \*